US007395388B2

(12) United States Patent
Sugiura et al.

(10) Patent No.: US 7,395,388 B2
(45) Date of Patent: Jul. 1, 2008

(54) LOAD BALANCING SYSTEM AND METHOD

(75) Inventors: Yoko Sugiura, Yokohama (JP); Kyosuke Achiwa, Yamato (JP)

(73) Assignee: Hitachi, Ltd., Tokyo (JP)

( * ) Notice: Subject to any disclaimer, the term of this patent is extended or adjusted under 35 U.S.C. 154(b) by 243 days.

(21) Appl. No.: 11/302,221

(22) Filed: Dec. 14, 2005

(65) Prior Publication Data

US 2007/0101082 A1    May 3, 2007

(30) Foreign Application Priority Data

Oct. 31, 2005    (JP)    ............................. 2005-315634

(51) Int. Cl.
   *G06F 12/16* (2006.01)
(52) U.S. Cl. .................... 711/162; 711/147; 718/104
(58) Field of Classification Search ................. None
    See application file for complete search history.

(56) References Cited

U.S. PATENT DOCUMENTS

| | | | |
|---|---|---|---|
| 6,970,973 B2* | 11/2005 | Katsuragi et al. | 711/114 |
| 7,058,761 B2* | 6/2006 | Nakamura et al. | 711/114 |
| 7,127,716 B2* | 10/2006 | Jin et al. | 718/105 |
| 7,155,722 B1* | 12/2006 | Hilla et al. | 718/105 |
| 7,162,579 B2* | 1/2007 | Horn et al. | 711/114 |
| 2004/0103254 A1 | 5/2004 | Satoyama et al. | |

FOREIGN PATENT DOCUMENTS

JP    2004-145855 A    6/2003

* cited by examiner

*Primary Examiner*—Than Nguyen
(74) *Attorney, Agent, or Firm*—Reed Smith LLP; Stanley P. Fisher, Esq.; Juan Carlos A. Marquez, Esq.

(57) ABSTRACT

Provided is a load balancing system and method capable of balancing the load of an apparatus employing both the internal mirror copying function and external connection function. With this load balancing system and method for balancing the load of a first apparatus equipped with a first function that copies data of one logical device to another logical device paired among the logical devices set in itself, and a second function that virtualizes an external logical device and provides it to a host system, the first and second apparatuses are controlled for periodically detecting the load of the first apparatus, and the load of a second apparatus provided separately from the first apparatus and equipped with the first and second functions, respectively, and migrating the logical device that is not paired with the other logical device among the logical devices set in the first apparatus to the second apparatus when the load of the first apparatus is greater than the load of the second apparatus.

12 Claims, 38 Drawing Sheets

| | INTERNAL (VIRTUAL) LDEV | | | EXTERNAL LDEV | |
|---|---|---|---|---|---|
| LDEV# | CAPACITY (GB) | LUN | EXTERNAL CONNECTION PORT ADDRESS | PORT ADDRESS | LUN |
| 1 | 100 | 1 | - | - | - |
| 2 | 100 | - | - | - | - |
| 3 | 300 | 3 | 23.23.23.23.23.23 | 12.34.56.78.12.34.56.78 | 3 |
| 4 | 100 | 4 | - | - | - |
| 5 | 100 | - | - | - | - |
| ... | ... | ... | ... | ... | ... |
| n | 200 | n | 23.23.23.23.23.23 | 12.12.12.12.12.12.12.12 | n |

92  93  94  95  96  97   85

90 = INTERNAL (VIRTUAL) LDEV
91 = EXTERNAL LDEV (B)

| | LUN OF INTERNAL LDEV | |
|---|---|---|
| | PRESENT | NONE |
| LUN OF EXTERNAL LDEV — PRESENT | ACTUAL DATA IS ACCESSIBLE FROM HOST EXTERNAL LDEV | NOT ACCESSIBLE FROM UNUSED LDEV HOST |
| LUN OF EXTERNAL LDEV — NONE | ACCESSIBLE FROM NORMAL INTERNAL LDEV | |

| PAIR NUMBER | PRIMARY VOLUME LDEV# | SECONDARY VOLUME LDEV# | STATUS |
|---|---|---|---|
| 1 | 10 | 11 | Pair |
| 2 | 12 | 20 | Split |
| ... | ... | ... | ... |
| n | ... | ... | ... |
| 100 | 101 | 102 | 103 |

| # | COMMAND | ARGUMENT | RETURN VALUE | PROCESSING DESCRIPTION |
|---|---|---|---|---|
| 1 | assignLun | (1) LDEV# <br> (2) WWN OF STORAGE DEVICE PORT <br> (3) WWN OF ASSIGNMENT DESTINATION (SERVER/EXTERNAL CONNECTION PORT, ETC) | LUN# | GIVE LUN# TO DESIGNATED LDEV AND ASSIGN IT TO HBA OF HOST, AND REGISTER LUN# IN LDEV MANAGEMENT TABLE. AS A RESULT OF THIS PROCESSING, THE HOST WILL BE ABLE TO ACCESS THE LDEV. |
| 2 | createLdev | (1) LDEV# TO BE CREATED <br> (2) CAPACITY OF LDEV# TO BE CREATED | True(SUCCESS)/ False(FAILURE) | CREATE LDEV IN A DESIGNATED CAPACITY, AND REGISTER LDEV# AND CAPACITY IN LDEV MANAGEMENT TABLE. |
| 3 | createMapping | (1) LDEV# TO BE CREATED <br> (2) CAPACITY OF LDEV# TO BE CREATED <br> (3) WWN OF STORAGE DEVICE TO BE MAPPED <br> (4) LUN NUMBER TO BE MAPPED | True(SUCCESS)/ False(FAILURE) | CREATE VIRTUAL LDEV# IN THE SAME CAPACITY AS THE DESIGNATED LDEV#, AND MAP THE LUN ASSIGNED BELOW THE EXTERNAL CONNECTION PORT TO THE VIRTUAL LDEV. AS A RESULT OF THIS PROCESSING, THE EXTERNAL LDEV AND VIRTUAL LDEV WILL BE ASSOCIATED. |
| 4 | deleteLUN | (1) LUN# <br> (2) WWN OF STORAGE DEVICE PORT <br> (3) WWN OF ASSIGNMENT DESTINATION (SERVER/EXTERNAL CONNECTION PORT, ETC.) | True(SUCCESS)/ False(FAILURE) | DELETE THE ASSOCIATION OF THE PORT AND LDEV (ERASE THE LUN#) AND UPDATE THE LDEV MANAGEMENT TABLE. AS A RESULT OF THIS PROCESSING, THE HOST WILL NO LONGER BE ABLE TO ACCESS THE EXTERNAL LDEV. |
| 5 | deleteMapping | (1) LDEV# FROM WHICH MAPPING IS TO BE DELETED | True(SUCCESS)/ False(FAILURE) | DELETE THE MAPPING OF THE DESIGNATED LDEV#, AND DELETE THE MAPPED VIRTUAL LDEV. AS A RESULT OF THIS PROCESSING, THE EXTERNAL LDEV WILL BECOME INACCESSIBLE. |
| 6 | deletepair | (1) PAIR NUMBER | True(SUCCESS)/ False(FAILURE) | DELETE ENTRY OF PAIR NUMBER DESIGNATED FROM THE PAIR MANAGEMENT TABLE |
| 7 | getLdevTable | NONE | LDEV MANAGEMENT TABLE | ACQUIRE THE LDEV MANAGEMENT TABLE |

FIG.20

| # | COMMAND | ARGUMENT | RETURN VALUE | PROCESSING DESCRIPTION |
|---|---|---|---|---|
| 8 | getPairTable | NONE | PAIR MANAGEMENT TABLE | ACQUIRE THE PAIR MANAGEMENT TABLE |
| 9 | create pair | (1) COPY SOURCE LDEV#<br>(2) COPY DESTINATION LDEV#<br>(3) PAIR STATUS TO BE CREATED (-init,-pair,-split) | True(SUCCESS)/ False(FAILURE) | (1) IN THE CASE OF "-init", ADD ENTRY TO THE PAIR MANAGEMENT TABLE, SET ALL DIFFERENTIAL BIT INFORMATION TO 1 AND PERFORM COPY PROCESSING.<br>(2) IN THE CASE "-pair", SET "-pair" IN THE COPY STATUS OF THE PAIR MANAGEMENT TABLE AND, WITHOUT PERFORMING THE ACTUAL COPY PROCESSING, FORM THE PAIR RELATIONSHIP OF THE COPY STATUS "-pair". SET ALL DIFFERENTIAL BIT MAPS TO 0.<br>(3) IN THE CASE "-split", SET "-split" IN THE COPY STATUS OF THE PAIR MANAGEMENT TABLE. AND, WITHOUT PERFORMING THE ACTUAL COPY PROCESSING, FORM A PAIR OF THE COPY STATUS "-split". SET ALL DIFFERENTIAL BIT MAPS TO 1. |
| 10 | pair split | (1) PAIR NUMBER | True(SUCCESS)/ False(FAILURE) | CHANGE THE PAIR STATUS OF THE PAIR MANAGEMENT TABLE TO SPLIT. AS A RESULT OF THIS PROCESSING, UPDATING OF DATA WILL ONLY BE CONDUCTED FOR THE PRIMARY LDEV. WHEN A WRITE ORDER IS GIVEN FROM THE HOST, BY SETTING "1" TO THE RELEVANT PORTION OF THE DIFFERENTIAL BIT INFORMATION, DIFFERENTIAL OF DATA CAN BE MANAGED WITH THE PRIMARY LDEV AND SECONDARY LDEV. |
| 11 | resync | (1) PAIR NUMBER | True(SUCCESS)/ False(FAILURE) | AS A RESULT OF THIS PROCESSING, DATA OF THE PRIMARY LDEV CORRESPONDING TO THE PORTION TO WHICH DIFFERENTIAL BIT INFORMATION IS SET AS 1 IS COPIED TO THE SECONDARY LDEV, AND AFTER DESYNCHRONIZING THE PAIR DATA, THE COPY STATUS OF THE PAIR NUMBER OF THE PAIR MANAGEMENT TABLE IS CHANGED TO COPY |

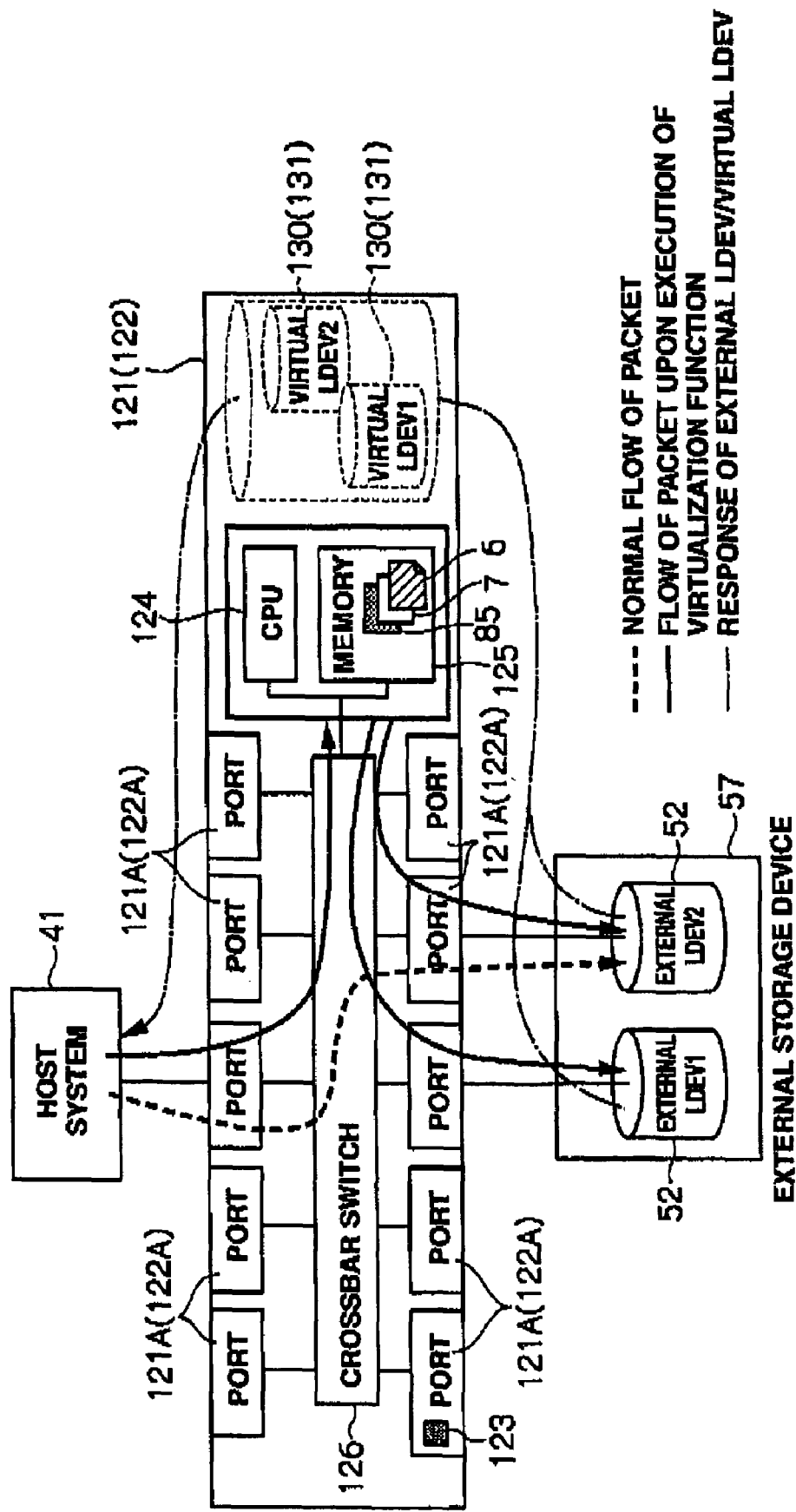

LOAD BALANCING SYSTEM AND METHOD

CROSS-REFERENCE TO RELATED APPLICATIONS

This application relates to and claims priority from Japanese Patent Application No. 2005-315634, filed on Oct. 31, 2005, the entire disclosure of which is incorporated herein by reference.

BACKGROUND

1. Field of the Invention

The present invention pertains to a load balancing system and method which, for instance, are suitably employed in a storage system.

2. Description of the Related Art

Conventionally, as one application function installed in a storage device, there is a copy function for creating a mirror of a logical device (this is hereinafter referred to as a "LDEV") in the same storage device without going through a host system as the higher-level device (this is hereinafter referred to as an "internal mirror copying function").

Further, as another application function installed in a storage device, there is a function of virtualizing the LDEV set in an external storage device (this is hereinafter referred to as an "external LDEV") and providing it to the host system while making it seem that it is a LDEV in its own storage device (this is hereinafter referred to as an "internal LDEV") (this hereinafter referred to as an "external connection function").

In order to balance the load of a storage device that is not using the external connection function, it is standard to adopt the method of migrating (copying) data to a separate storage device via the host system. Nevertheless, when the storage device is using the external connection function, since it will suffice to merely switch the mapping to the external LDEV to a LDEV in another storage device, the load of the storage device can be balanced relatively easily.

Incidentally, Japanese Patent Laid-Open Publication No. 2004-145855 discloses technology for balancing the load of a storage device equipped with a so-called remote copy function which overwrites data among a plurality of storage devices located in physically distant locations without the intervention of a host system.

SUMMARY

Nevertheless, as described later, in the case of a storage device that uses both the internal mirror copying function and external connection function, even if the switching processing for switching the mapping to the external LDEV is performed, it is practically impossible to migrate the copy status before migration, and, as a result, there is a problem in that the load of a storage device that uses both the internal mirror copying function and external connection function cannot be balanced.

The present invention was devised in view of the foregoing points, and an object thereof is to provide a load balancing system and method capable of balancing the load of an apparatus using both the internal mirror copying function and external connection function.

The present invention for achieving the foregoing object is a load balancing system for balancing the load of a first apparatus equipped with a first function that copies data of one logical device to another logical device paired among the logical devices set in itself, and a second function that virtualizes an external logical device and provides it to a host system, the load balancing system including: a second apparatus equipped with the first and second functions; and a management device that controls the first and second apparatuses for periodically detecting the load of the first apparatus and the load of the second apparatus, respectively, and migrating the logical device that is not paired with the other logical device among the logical devices set in the first apparatus to the second apparatus when the load of the first apparatus is greater than the load of the second apparatus.

As a result, with this load balancing system, when the load of the first apparatus becomes greater than the load of the second apparatus, the logical device set in the first apparatus is migrated to the second apparatus, and the load of the first apparatus can thereby be balanced with the second apparatus. Here, since the logical device to be migrated to the second apparatus is a logical device that is not paired with another logical device, migration processing of such logical device can be performed easily regardless of the current status of the respective copy pairs set in the first apparatus.

Further, in the present invention, the management device controls the first and second apparatuses for migrating the logical device that is not paired with the other logical device among the logical devices set in the first apparatus to the second apparatus when the load of the first apparatus is greater than the load of the second apparatus, and thereafter migrating the logical device that is paired with the other logical device among the logical devices set in the first apparatus to the second apparatus. Moreover, upon migrating a copy pair formed from one logical device and another logical device paired in the first apparatus to the second apparatus, the management device detects the current status of the copy pair and notifies the second apparatus of the control information according to the detection result; and the second apparatus sets the status of the copy pair migrated from the first apparatus to the second apparatus based on the control information notified from the management device.

As a result, with this load balancing system, the respective logical devices configuring a copy pair set in the first apparatus can be migrated to the second apparatus while maintaining the copy pair status at such time.

Further, the present invention also provides a load balancing method for balancing the load of a first apparatus equipped with a first function that copies data of one logical device to another logical device paired among the logical devices set in itself, and a second function that virtualizes an external logical device and provides it to a host system, the load balancing method including: a first step of periodically detecting the load of the first apparatus, and the load of a second apparatus provided separately from the first apparatus and equipped with the first and second functions, respectively; and a second step of controlling the first and second apparatuses for periodically detecting the load of the first apparatus and the load of the second apparatus, respectively, and migrating the logical device that is not paired with the other logical device among the logical devices set in the first apparatus to the second apparatus when the load of the first apparatus is greater than the load of the second apparatus.

As a result, with this load balancing method, when the load of the first apparatus becomes greater than the load of the second apparatus, the logical device set in the first apparatus is migrated to the second apparatus, and the load of the first apparatus can thereby be balanced with the second apparatus. Here, since the logical device to be migrated to the second apparatus is a logical device that is not paired with another logical device, migration processing of such logical device can be performed easily regardless of the current status of the respective copy pairs set in the first apparatus.

Further, in the present invention, at the second step, the first and second apparatuses are controlled for migrating the logical device that is not paired with the other logical device among the logical devices set in the first apparatus to the second apparatus when the load of the first apparatus is greater than the load of the second apparatus, and thereafter migrating the logical device that is paired with the other logical device among the logical devices set in the first apparatus to the second apparatus. Moreover, at the second step, upon migrating a copy pair formed from one logical device and another logical device paired in the first apparatus to the second apparatus, the current status of the copy pair is detected and the control information according to the detection result is notified to the second apparatus; and wherein second apparatus sets the status of the copy pair migrated from the first apparatus to the second apparatus based on the control information notified from the management device.

As a result, with this load balancing method, the respective logical devices configuring a copy pair set in the first apparatus can be migrated to the second apparatus while maintaining the copy pair status at such time.

According to the present invention, the load of an apparatus using both a first function that copies data of one logical device to another logical device paired among the logical devices set in itself, and a second function that virtualizes an external logical device and provides it to a host system can be easily balanced regardless of the current status of the respective copy pairs set in the first apparatus.

DESCRIPTION OF DRAWINGS

FIG. 16(A) is a conceptual diagram for explaining the LDEV management table, and FIG. 16(B) is a chart for explaining the LDEV management table;

FIG. 19 is a chart for explaining the various commands relating to load balancing processing FIG. 20 is a chart for explaining the various commands relating to load balancing processing;

FIG. 41 is a block diagram showing the configuration of the installed fibre channel switch and additional fibre channel switch.

DETAILED DESCRIPTION

An embodiment of the present invention is now described in detail with reference to the drawings.

Figure 1:
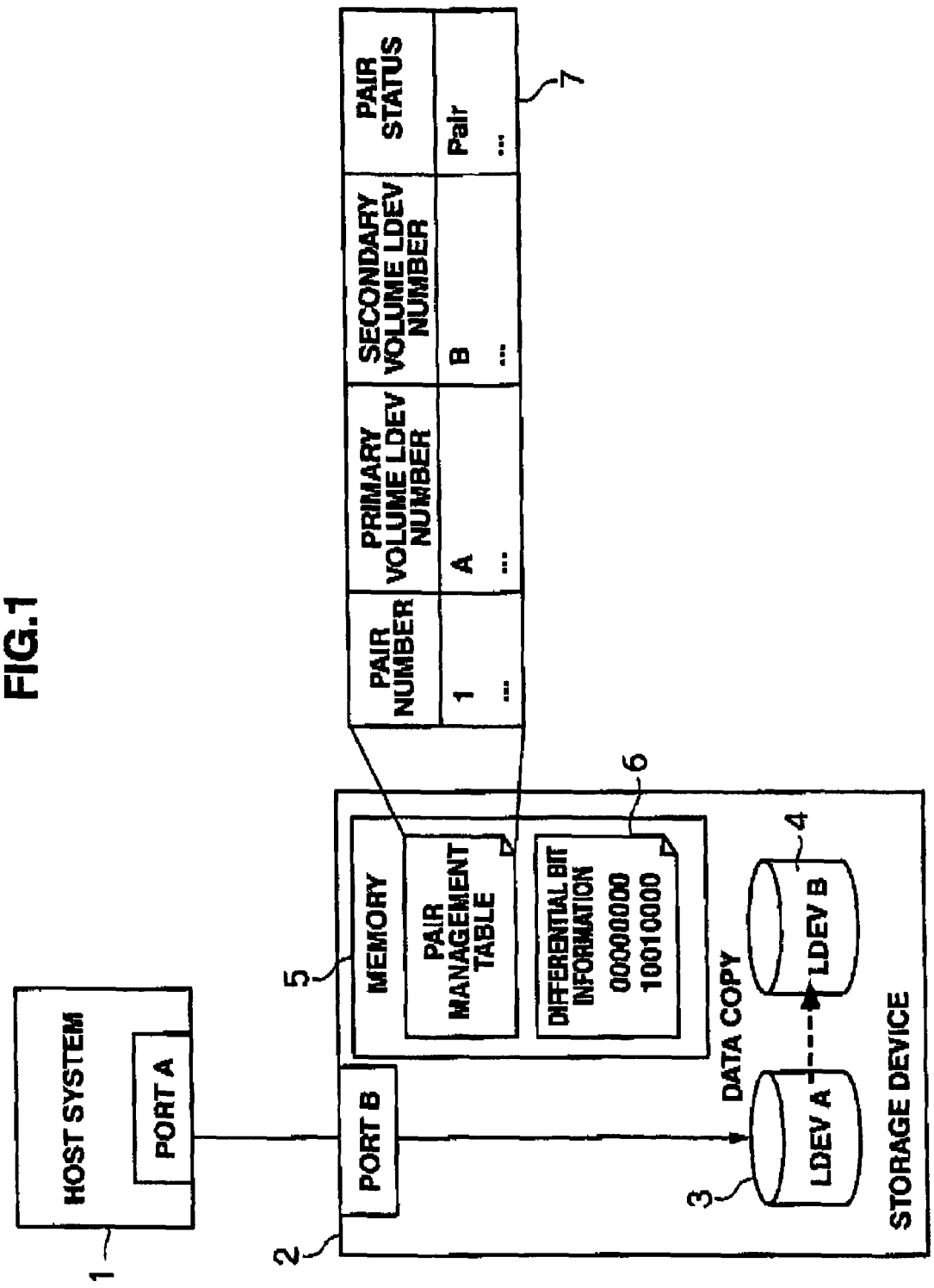
FIG. 1 is a conceptual diagram for explaining the internal mirror copying function in a storage device.

(1) Application Function in Storage Device (1-1) Internal Mirror Copying Function With a storage device 2 equipped with an internal mirror copying function, upon executing the internal mirror copying function, as shown in FIG. 1, by copying in advance the data stored in a LDEV (this is hereinafter referred to as a "primary volume") 3 to become the copy source to a LDEV (this is hereinafter referred to as a "secondary volume") 4 to become the copy destination among the two LDEVs 3, 4 set as a copy pair (this is hereinafter referred to as a "pair setting" or "paired"), contents of the primary volume 3 and secondary volume 4 are made to be the same.

And, when a host system 1 thereafter issues a data write request to the primary volume 3, the storage device 2 writes the data in a designated address of the primary volume 3 according to such write request, and further writes the same data in a corresponding address of the secondary volume 4 synchronously or asynchronously.

Further, when the host system 1 thereafter issues a data write request to the primary volume 3 in a state where the mirror of the primary volume 3 and secondary volume 4 is cancelled and a snapshot is created, the storage device 2 writes the data to be written in the primary volume 3, and concurrently stores the location thereof.

As a means for realizing the above, the storage device 2 retains in an internal memory 5 a bit string having the same number of bits as the number of blocks, which is the access unit of data in the primary volume 3, as differential bit information 6, and manages the difference between the primary volume 3 and secondary volume 4 by setting "0" as the value of the corresponding bit of the differential bit information 6 for blocks in which the contents of the primary volume 3 and secondary volume 4 are the same, and setting "1" as the value of the corresponding bit for blocks in which the contents of the primary volume 3 and secondary volume 4 are different.

Meanwhile, in this internal mirror copying function, as the status of the primary volume 3 and secondary volume 4 (this is hereinafter referred to as a "pair status"), there are three statuses; namely, "pair", "copy" and "split". And, with respect to the respective paired primary volumes 3 and secondary volumes 4, the storage device 2 equipped with the internal mirror copying function manages the LDEV number of the primary volume 3 and secondary volume 4 and the current pair status of the primary volume 3 and secondary volume 4 with a pair management table 7 stored in the internal memory 5.

Figure 2:
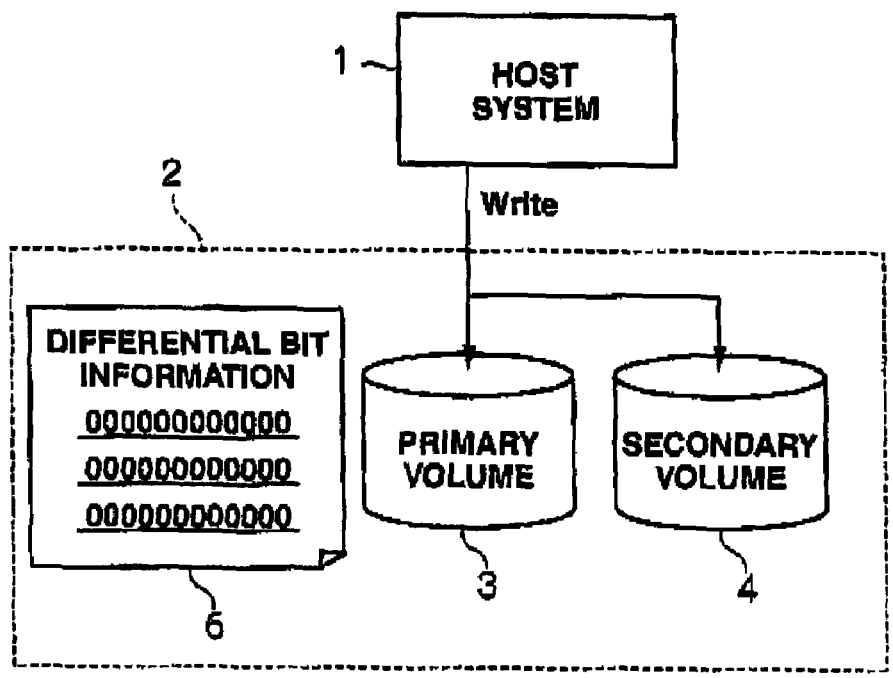
FIG. 2 is a conceptual diagram for explaining the internal mirror copying function in a storage device.

Here, the pair status of "pair", as shown in FIG. 2, indicates a status where the data copy from the primary volume 3 to the secondary volume 4 is complete and the primary volume 3 and secondary volume 4 are mirrored. During this pair status, when data is written in the primary volume 3, the same data is simultaneously written in the corresponding block of the secondary volume 4. Further, during this pair status, since the contents of the primary volume 3 and secondary volume 4 are the same, all bits of the differential bit information 6 are constantly "0".

Figure 3:
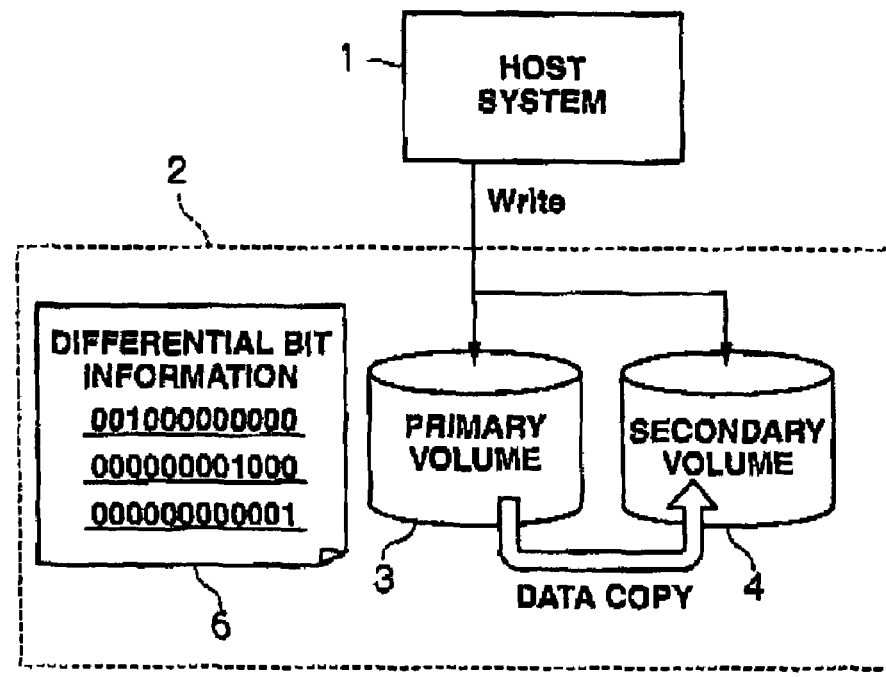
FIG. 3 is a conceptual diagram for explaining the internal mirror copying function in a storage device.

The pair status of "copy", as shown in FIG. 3, is a status there the data copy from the primary volume 3 to the secondary volume 4 is midway, and the primary volume 3 and secondary volume 4 are not yet mirrored. During this pair status, when data is written in the primary volume 3, the same data is simultaneously written in the corresponding location of the secondary volume 4, and, in parallel therewith, data copy of the block in which the differential bit information 6 is set to "1" is performed between the primary volume 3 and secondary volume 4.

Figure 4:
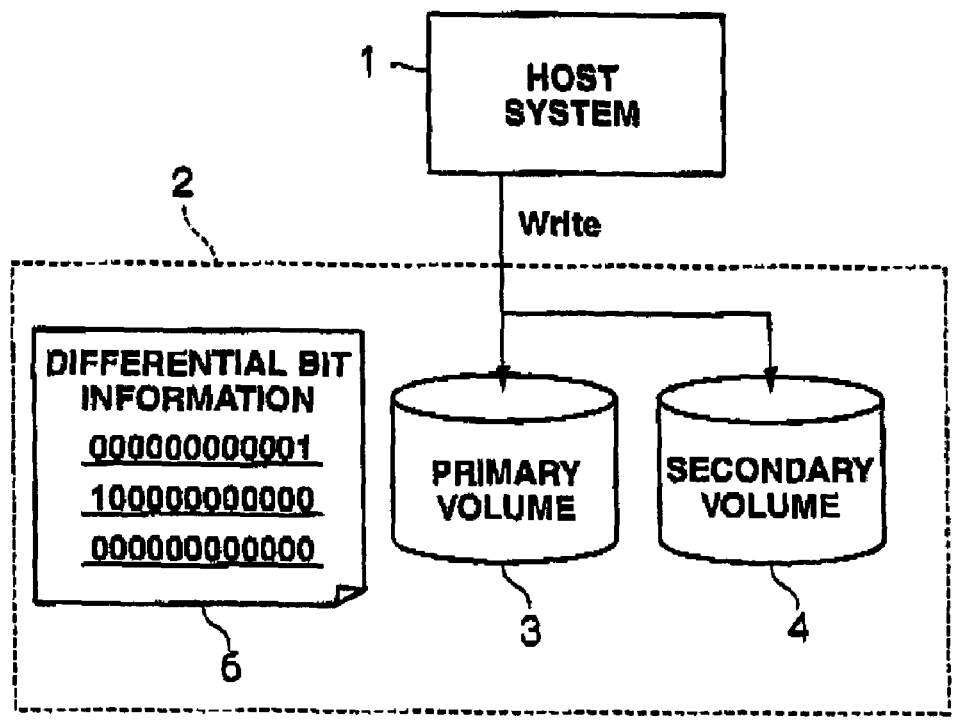
FIG. 4 is a conceptual diagram for explaining the internal mirror copying function in a storage device.

Further, the pair status of "split", as shown in FIG. 4, is a status where data is not written in the secondary volume 4, and this secondary volume 4 creates a snapshot at a certain point in time. During this pair status, even when data is written in the primary volume 3, data is not written in the secondary volume 4, and "1" is set to the corresponding bit of the differential bit information 6.

Figure 5:
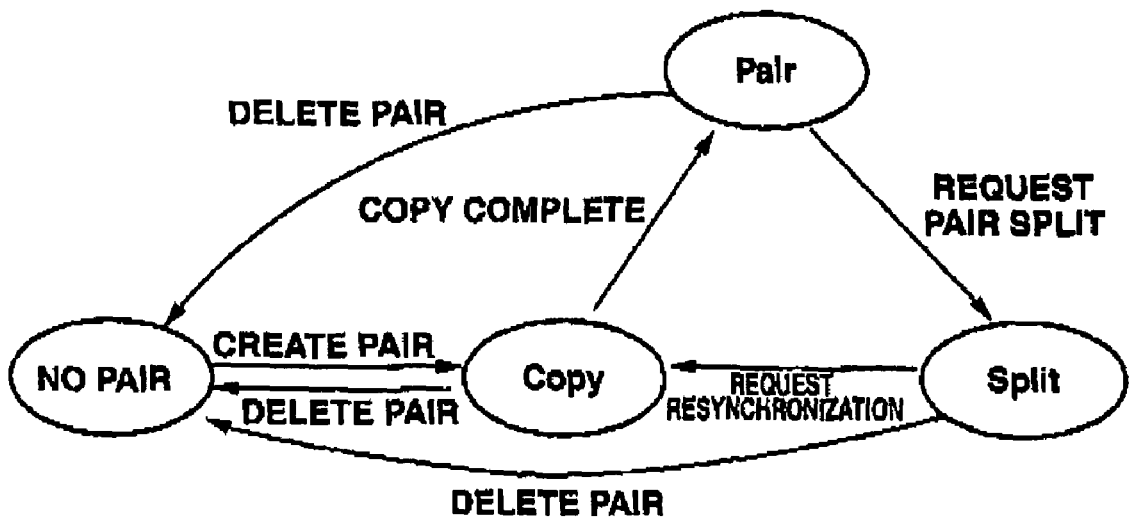
FIG. 5 is a transition diagram for explaining the internal mirror copying function in a storage device.

FIG. 5 shows the transition of the status between the respective pair statuses of "pair", "copy" and "split", and the pair status with no pair setting ("no pair"). As evident from FIG. 5, when two LDEVs are paired from the pair status of "no pair", the pair status of such pair changes to "copy", and, when the data copy from the primary volume 3 to the secondary volume 4 is completed thereafter, the pair status changes to "pair".

And, when a pair split request is issued to the storage device 2 from the pair status of "pair", the pair status of the primary volume 3 and secondary volume 4 becomes "split", and, by making a resynchronization request from the pair status of "split", the pair status can be changed once again to "copy". Incidentally, in each of the cases of "pair", "copy" and "split", the pair status can be changed to "no pair" by erasing the pair.

Figure 6:
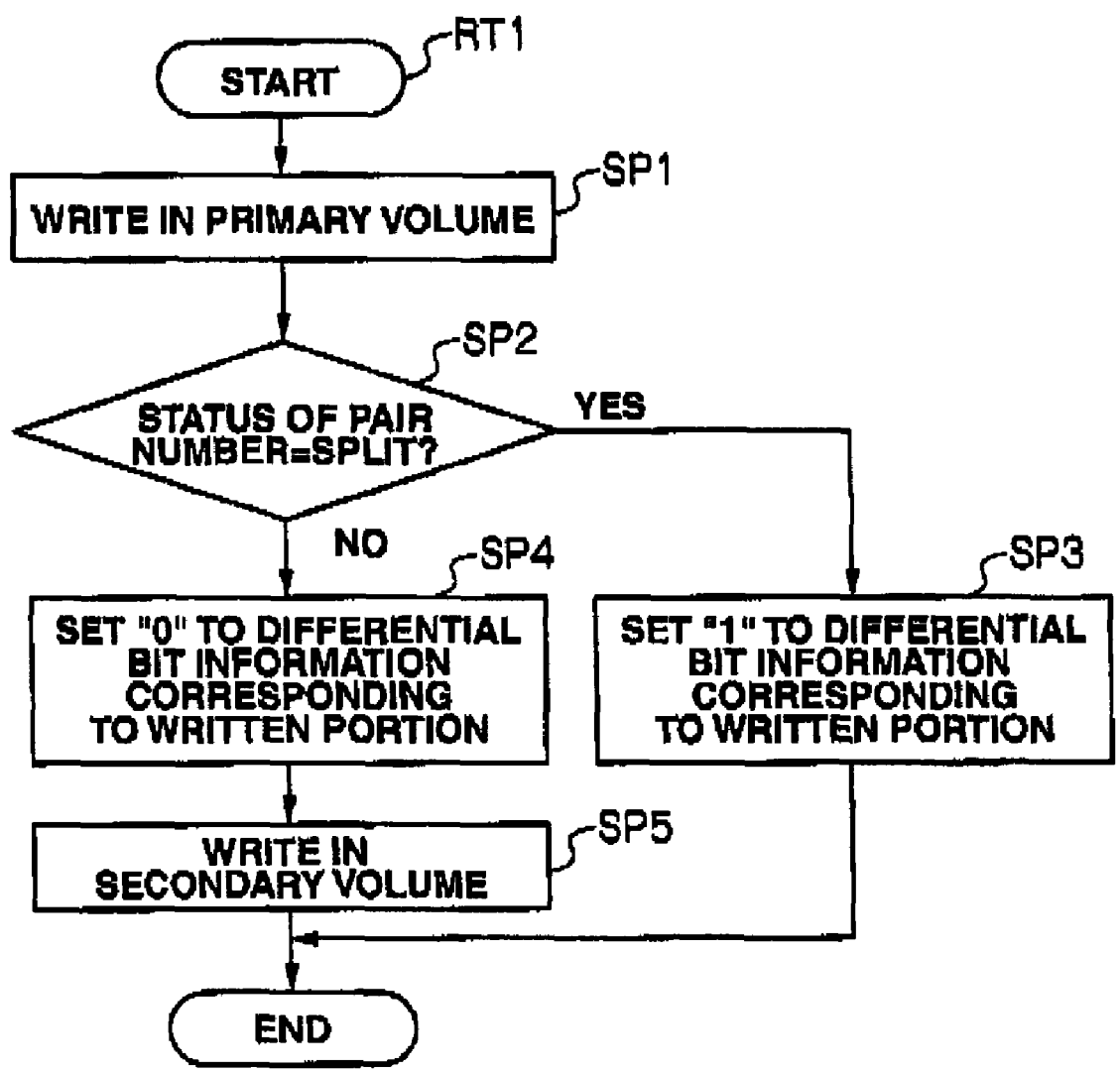
FIG. 6 is a flowchart for explaining the internal mirror copying function in a storage device.

FIG. 6 is a flowchart representing the processing to be performed by the storage device 2 in relation to the data write processing to the primary volume 3 upon executing the internal mirror copying function.

When the host system 1 issues a data write request to the primary volume 3, the storage device 2 foremost writes the data to be written provided from the host system 1 together with the write request in a designated block of the primary volume 3 (SP1).

Further, the storage device 2 thereafter refers to the pair management table 7 (FIG. 1), and sets "1" to the corresponding bit of the differential bit information 7 (FIG. 1) (SP3) when the pair status of the pair number given to the copy pair formed from the primary volume 3 and the corresponding secondary volume 4 is "split" (SP2: YES).

Contrarily, when the pair status of the pair of the primary volume 3 and the secondary volume 4 is not "split" (SP2: NO), the storage device 2 sets "0" to the corresponding bit of the differential bit information 7 (SP4), and writes the same data as the data written in the primary volume 3 in the corresponding block of the secondary volume 4 (SP5).

Figure 7:
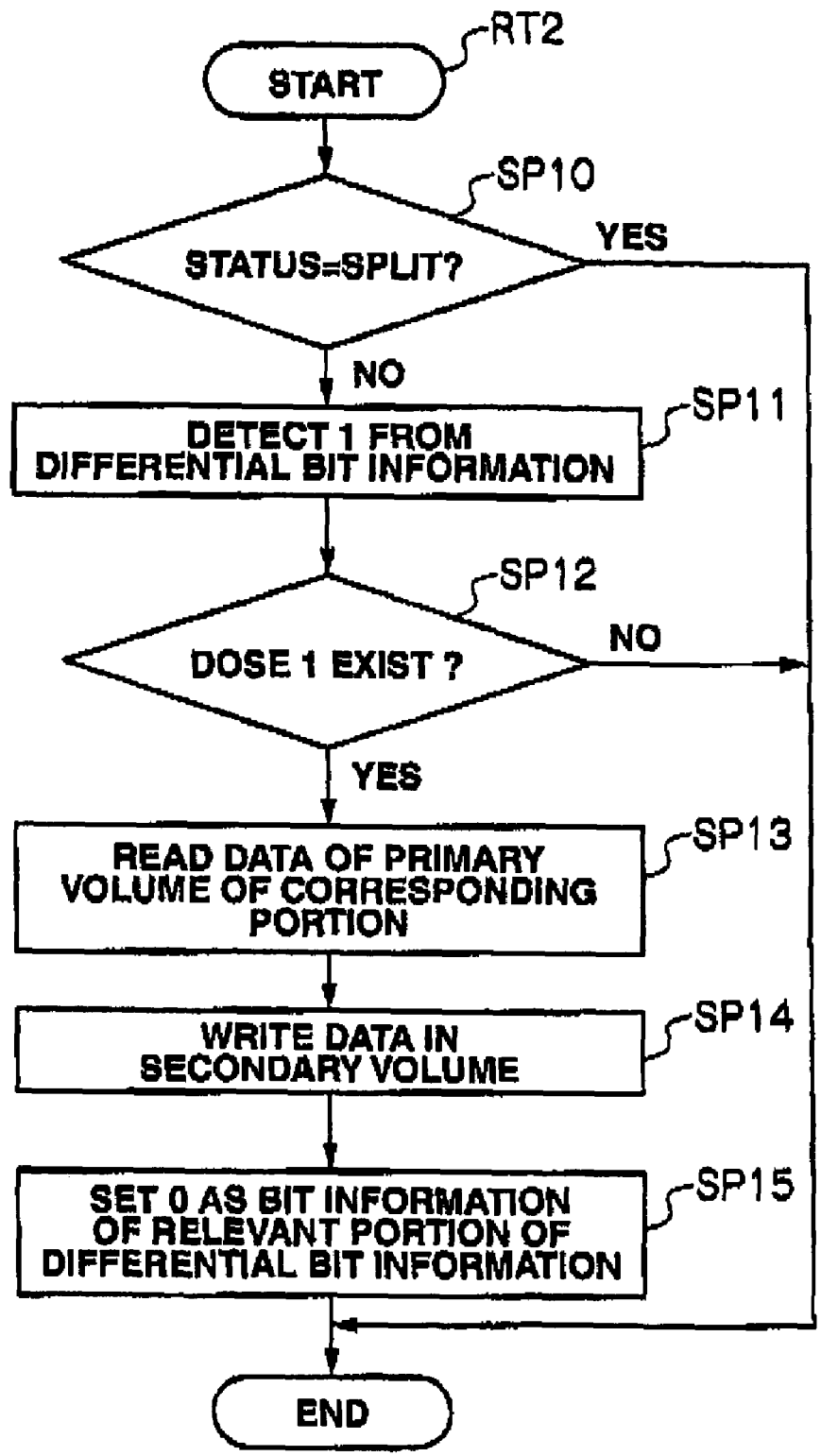
FIG. 7 is a flowchart for explaining the internal mirror copying function in a storage device.
Figure 8:
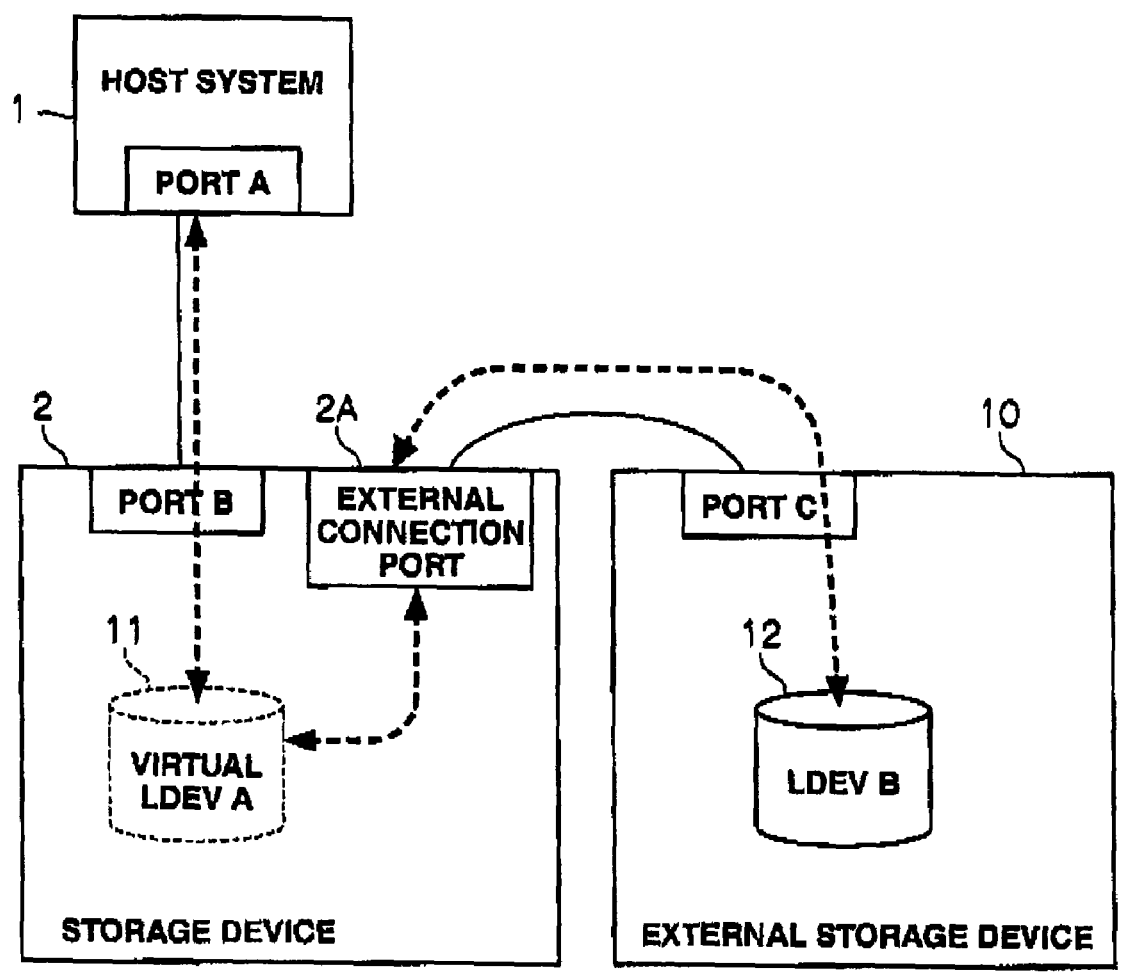
FIG. 8 is a conceptual diagram for explaining the external connection function in a storage device.

Meanwhile, FIG. 7 is a flowchart representing the processing to be performed by the storage device 2 in relation to the data write processing (this is hereinafter referred to as "data copy processing") to the secondary volume 4. The storage device 2 executes, in prescribed intervals, the data copy processing to the secondary volume 4 asynchronously with the data write processing to the primary volume 3 according to this flowchart regarding the pairs formed by the primary volume 3 and secondary volume 4 having a pair status of "pair" or "copy".

In other words, when the storage device 2 starts the data copy processing, it foremost selects one pair of the primary volume 3 and secondary volume 4 registered in the pair management table 5 (FIG. 1), and determines whether or not the pair status of this copy pair is "split" based on the pair management table 7 (SP10).

When the pair status of this pair is "split" (SP10: YES), the storage device 2 ends this data copy processing, and, when the pair status of this pair is not "split" (SP10: NO), it searches a bit having a value of "1" from the corresponding differential bit information (SP11).

When the storage device 2 is not able to detect a bit of "1" in this search (SP12: NO), it ends this data copy processing, and, when the storage device 2 is able to detect a bit of "1" (SP12: YES), it reads the block data corresponding to this bit in the primary volume 3 (SP13), and writes this in the corresponding block of the secondary volume 4 (SP14).

Thereafter, the storage device 2 changes the value of the bit determined to be "1" at step SP12 in the corresponding differential bit information to "0", and then ends this data copy processing thereafter (SP16).

(1-2) External Connection Function

Meanwhile, the storage device 2 equipped with the external connection function, upon executing this external connection function, maps a LDEV 12 in an external storage device 10 connected to an external connection port 2A to a virtual LDEV 11 set in itself. And, when the host system 1 accesses the virtual LDEV 11, the storage device 2 issues a corresponding data I/O request to the external storage device 10 via the external connection port 2A. As a result, the corresponding data is input and output to and from the corresponding block in the LDEV 12 of the external storage device 10. Accordingly, the access from the host system 1 to the virtual LDEV 11 is actually made to the LDEV 12 of the external storage device 10.

Figure 9:
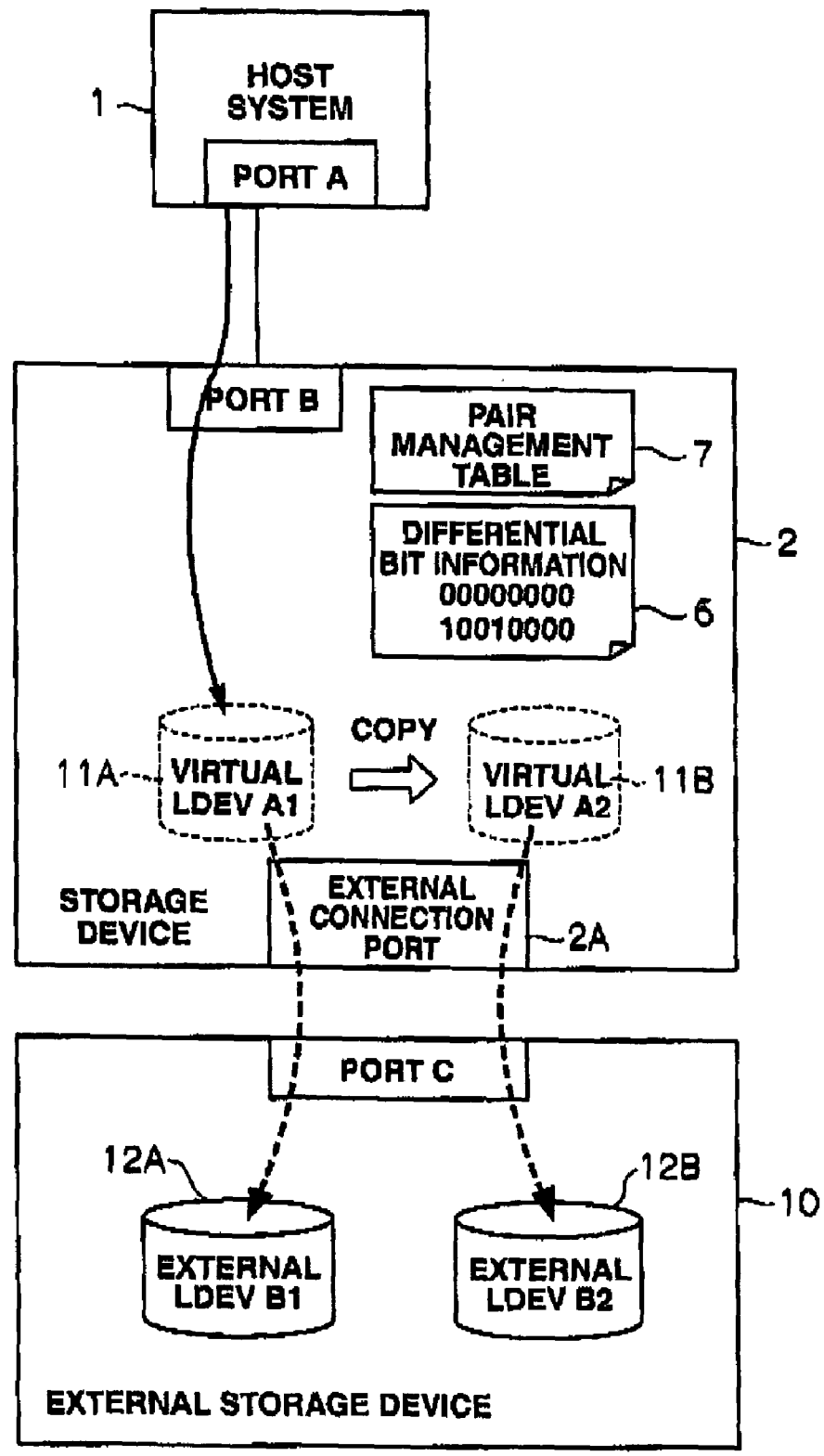
FIG. 9 is a conceptual diagram for explaining the interaction of the internal mirror copying function and external connection function.

Further, it is also possible to coordinate this kind of external connection function and the foregoing internal mirror copying function. Here, as shown in FIG. 9, the external connection function of the storage device 2 is used to respectively map the first and second LDEVs 12A, 12B of the external storage device 10 to the first and second virtual LDEVs 11A, 11B of the storage device, and the internal mirror copying function is used to copy data between these first and second virtual LDEVs 11A, 11B.

However, since the first and second virtual volumes 12A, 12B have no materiality, access from the host system 1 to the first virtual LDEV 11A is made to the first LDEV 12A via the first virtual LDEV 11A, and the data copy from the first virtual LDEV 11A to the second virtual LDEV 12A is executed as the data copy from the first LDEV 12A to the second LDEV 12B.

(1-3) Load Balancing Processing

Meanwhile, when a LDEV set in a certain first storage device is accessed frequently and the load of the first storage device is significant, considered may be a case of balancing the load of the first storage device by migrating the data stored in the LDEV of such first storage device to a LDEV of another second storage device.

Figure 10:
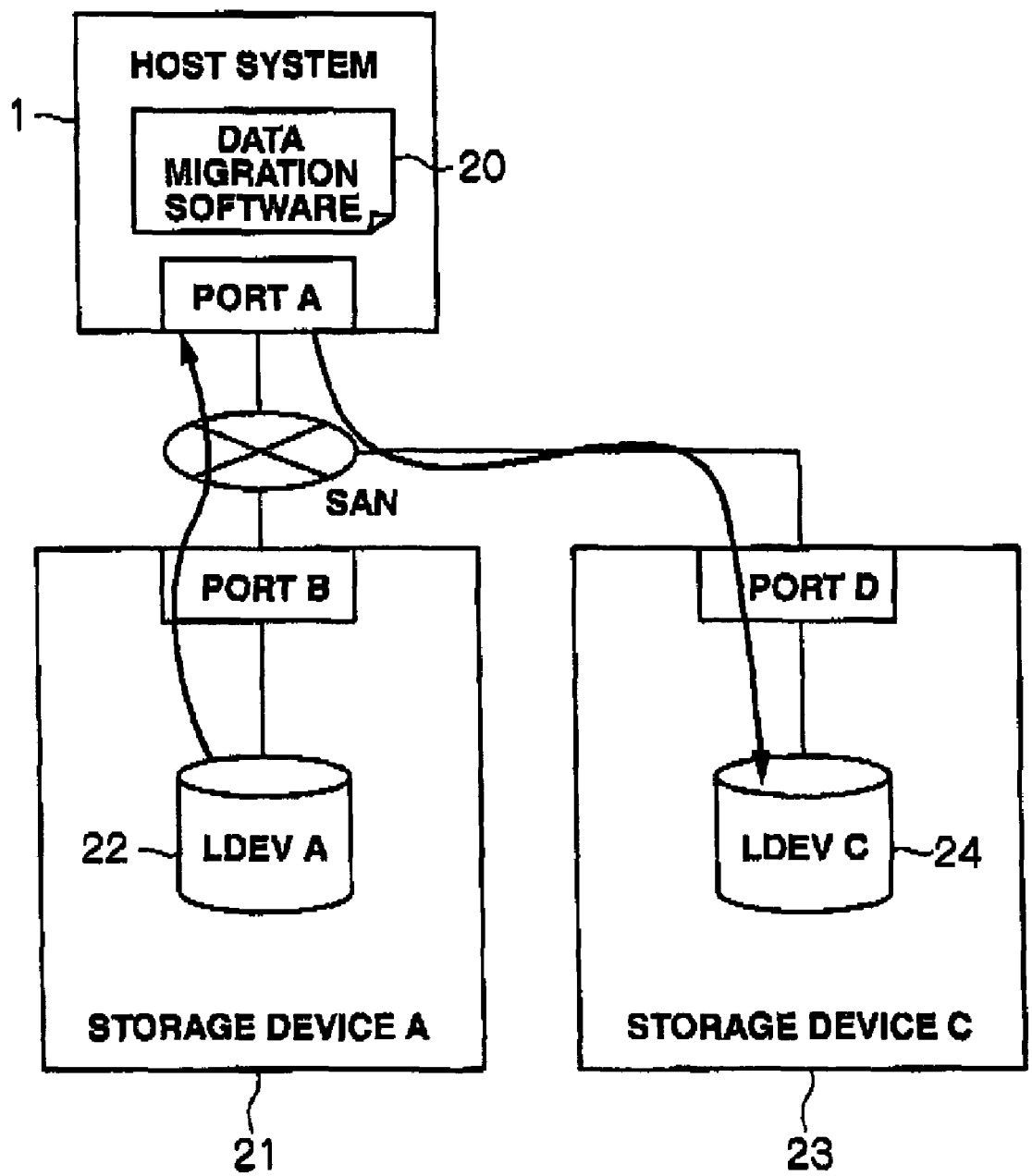
FIG. 10 is a conceptual diagram for explaining the migration processing of LDEV via a host system.

In the foregoing case, as shown in FIG. 10, data migration in a case when the first storage device 20 is not using the external connection function can be performed by reading data from a target LDEV 22 in the first storage device 11 and writing this in a target LDEV 24 of the second storage device 23 via the host system 1 based on the control of data migration software 20 loaded in the host system 1. Nevertheless, with this method, there is a problem in that the host system 1, as well as the first and second storage devices 21, 23, will be burdened since this involves the actual migration of data.

Figure 11:
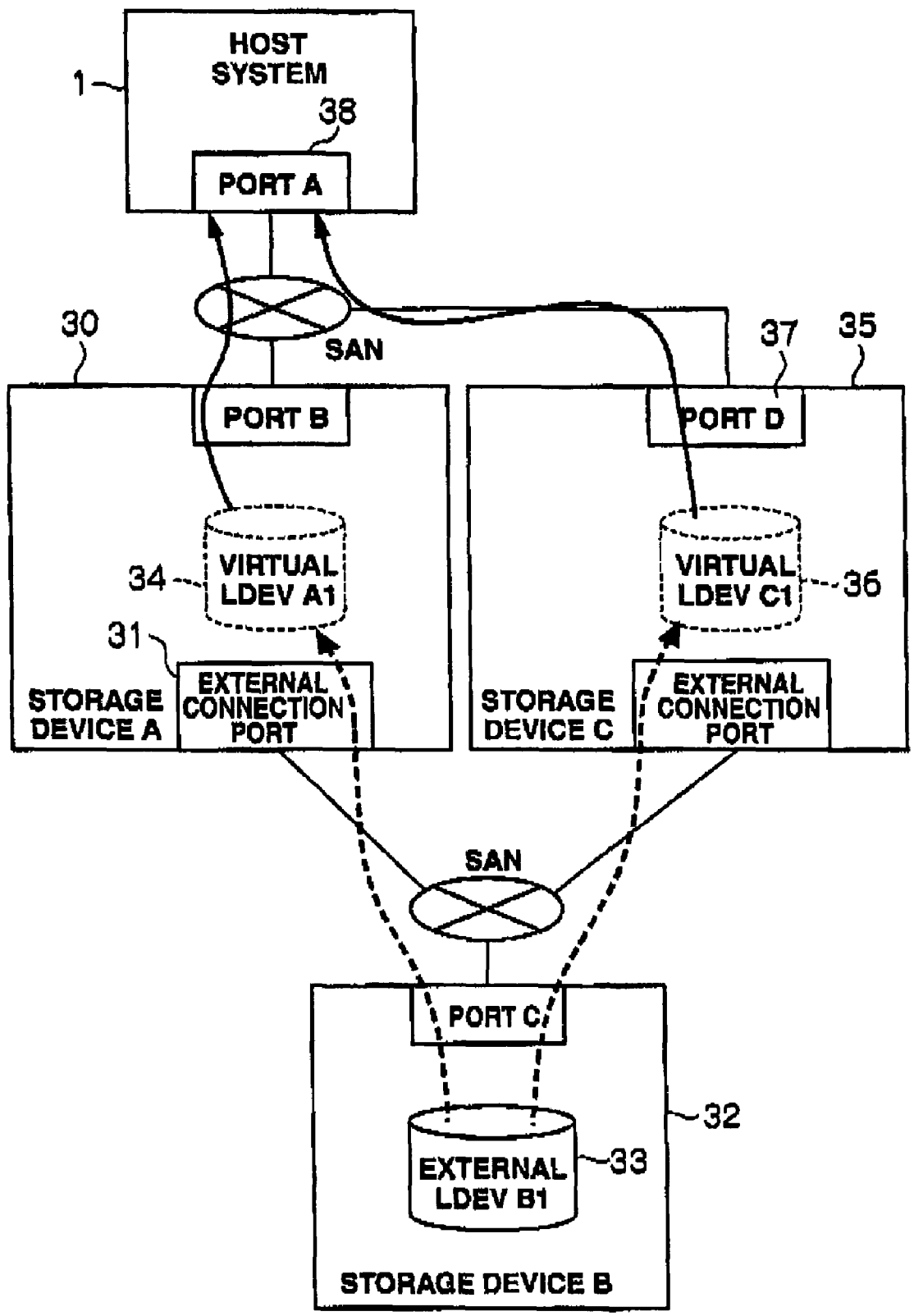
FIG. 11 is a conceptual diagram for explaining the load balancing processing when using the external connection function.

Contrarily, as shown in FIG. 11, when the first storage device 30 is using the external connection function; that is, with the data migration in a case where a LDEV (this kind of LDEV is hereinafter referred to as an "external LDEV") 33 set in the second storage device 32 connected to the external connection port 31 of the first storage device 30 is mapped to the first virtual LDEV 34 set in the first storage device 30, the load of the first storage device 30 can be balanced with the third storage device 35 merely by re-mapping the external LDEV 33 to the external LDEV 33 and the second virtual LDEV 36 set in the third storage device 35. Here, by assigning the virtual LDEV 36 of the third storage device 35 from a port 37 in the third storage device 35 to a port 38 of the host system 1 with a prescribed LUN number, the host system 1 will be able to access the external LDEV 33 via the second virtual volume 36.

And, since this method does not involve the actual migration of data, there is an advantage in that the load of the first storage device 30 can be balanced without burdening the host system 1 as well as the first and second storage devices 30, 33 with the load caused by the data migration.

Nevertheless, with the storage device 2 using both the external connection function and internal mirror copying function as described with reference to FIG. 9, the pair management table 7 and the differential bit information 6 of each copy pair exist in the first storage device 2. Thus, for instance, as shown in FIG. 12, in a case where the first and second external LDEVs 33A, 33B set in the second storage device 32, which is an external storage device, are respectively mapped to the first and second virtual LDEVs 34A, 34B of the first storage device 30, a third storage device 35 will not be able to succeed the pair management table 7 and differential bit information 11B by merely mapping these first and second external LDEVs 33A, 33B to the third or fourth virtual LDEV 36A, 36B of the third storage device 35.

Figure 12:
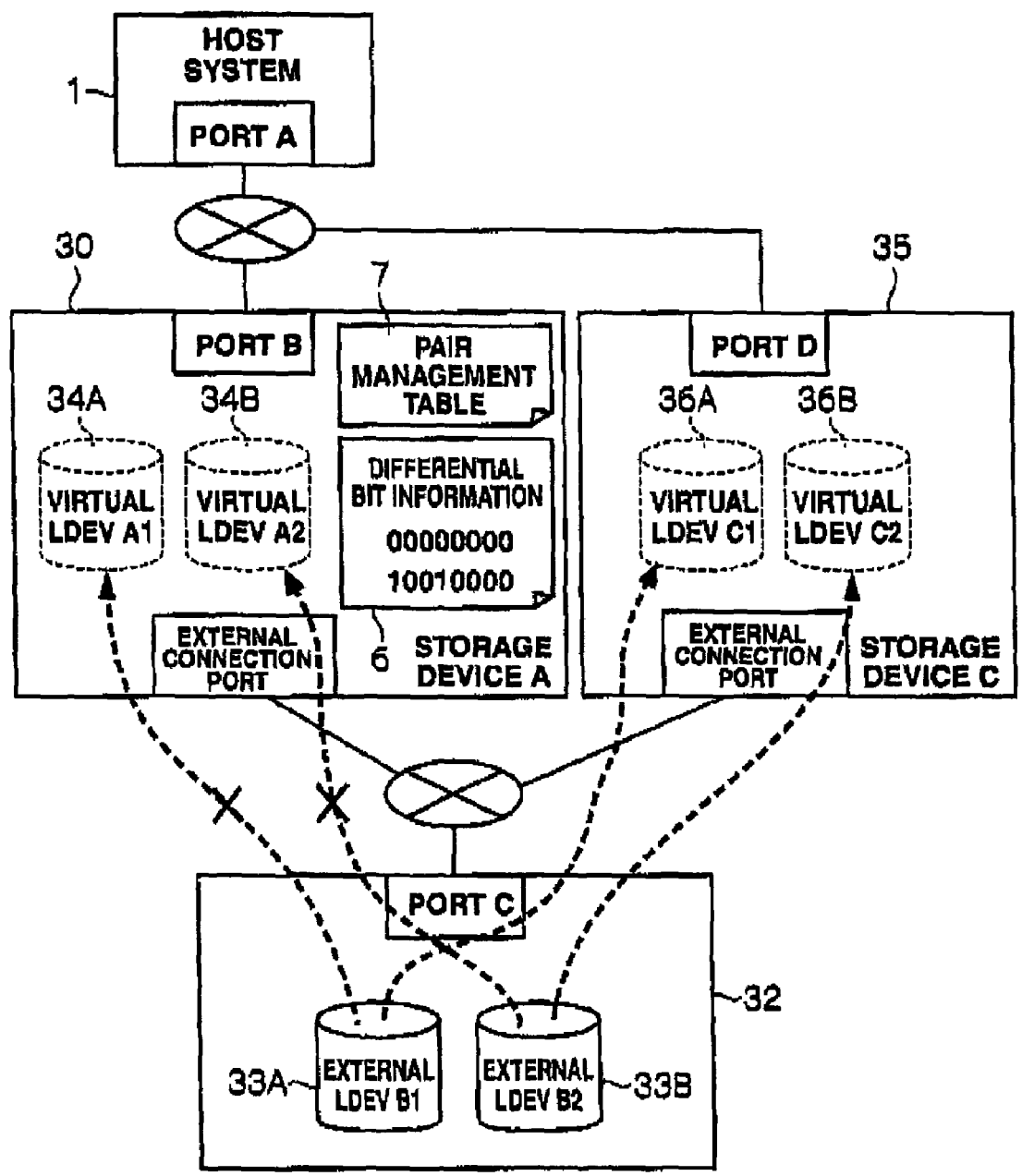
FIG. 12 is a conceptual diagram for explaining the problems of load balancing processing when using the internal mirror copying function and external connection function.

In other words, with the system configured as illustrated in FIG. 12, by merely performing processing for switching the mapping to the external LDEVs 33A, 33B in the second storage device 32 to the mapping from the first and second virtual LDEVs 34A, 34B in the first storage device 30 to the first and second virtual LDEVs 36A, 36B in the third storage device 35, there is a problem in that the volume cannot be migrated from the first storage device 30 to the third storage device 35, and, as a result, the load of the first storage device 30 cannot be balanced.

In particular, when the first and second virtual volumes 34A, 34B in the first storage device 30 have a pair status of "pair", the load of the first storage device 30 cannot be balanced with the third storage device 35 while maintaining the mirrored status.

Figure 13:
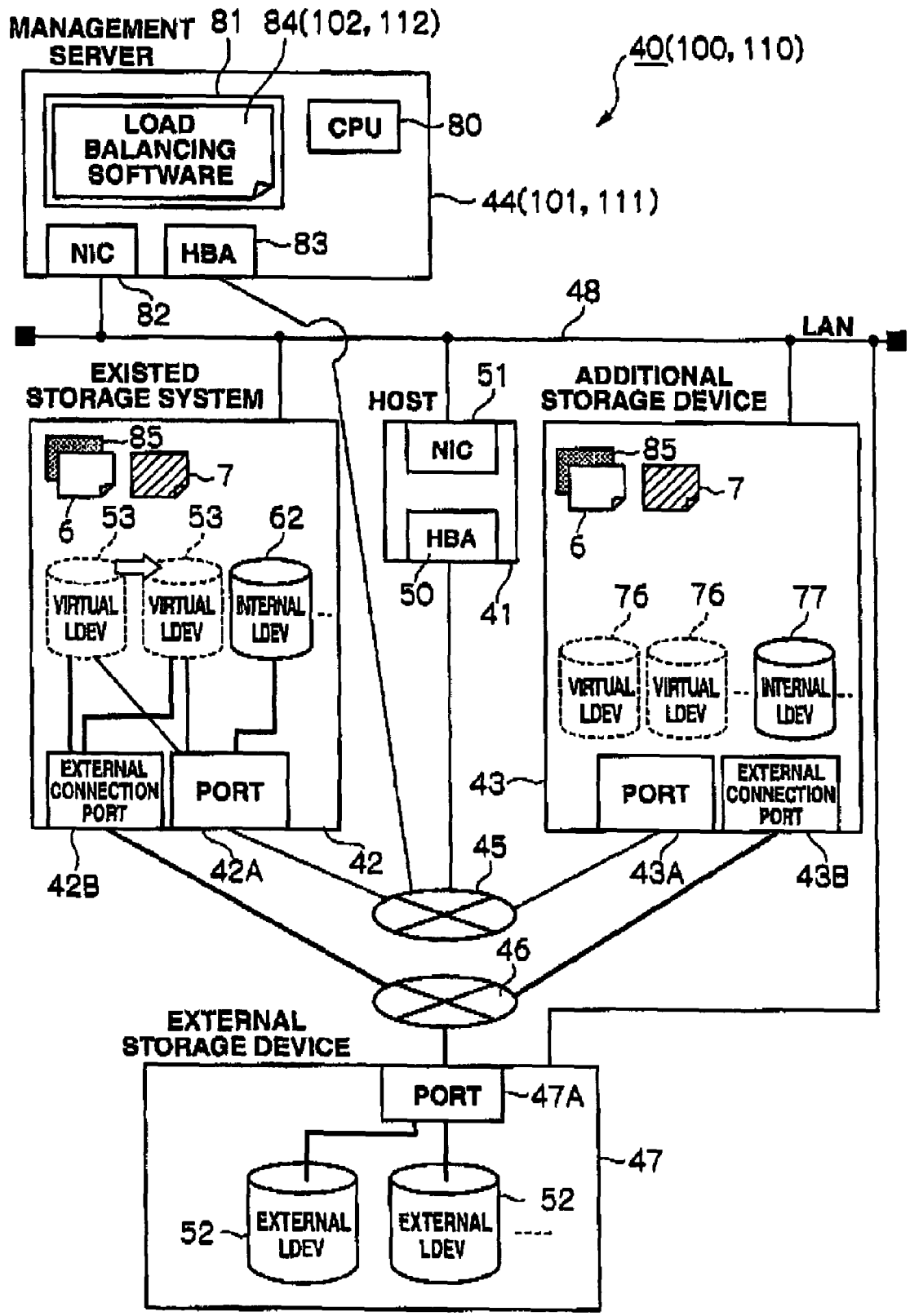
FIG. 13 is a block diagram showing the configuration of the storage system according to the first to third embodiments.

The storage system according to the first to fourth embodiments described below, as shown in FIG. 13, has one characteristic in that it is able to balance the load of an existing storage device (this is hereinafter referred to as an "existed storage system") executing the internal mirror copy with the internal mirror copying function between two virtual LDEVs respectively mapped to the external LDEV with the external connection function with another storage device (this is hereinafter referred to as an "additional storage device") while maintaining the current status of the copy pair (data consistency between the pair status and primary/secondary volume).

The storage system according to the first to fourth embodiments equipped with this kind of function (this is hereinafter referred to as a "load balancing function") is now explained.

(2) First Embodiment (2-1) Configuration of Storage System According to First Embodiment In FIG. 13, reference numeral 40 represents the overall storage system according to the first embodiment. This storage system 40 is configured by a host system 41, an existed storage system 42, an additional storage device 43 and a management server 44 being connected via a first network 45; the existed storage system 42 and additional storage device 43 being connected to an external storage device 47 via a second network 46; and the host system 41, existed storage system 42, additional storage device 43, management server 44 and external storage device 47 being connected via a LAN (Local Area Network) 48.

The host system 41 as the higher-level device is a computer device having information processing resources such as a CPU (Central Processing Unit) and memory, and, for instance, is configured from a personal computer, workstation, mainframe or the like. The host system 41 has an information input device (not shown) such as a keyboard, switch or pointing device, and an information output device (not shown) such as a monitor device or a speaker. Further, the host system 41 is also provided with an HBA (Host Bus Adapter) 50 that functions as an interface for accessing the existed storage system 42 or the like via the first network 45, and an NIC (Network Interface Card) 51 for communicating with the management server 44 or the like via the LAN 48.

Figure 14:
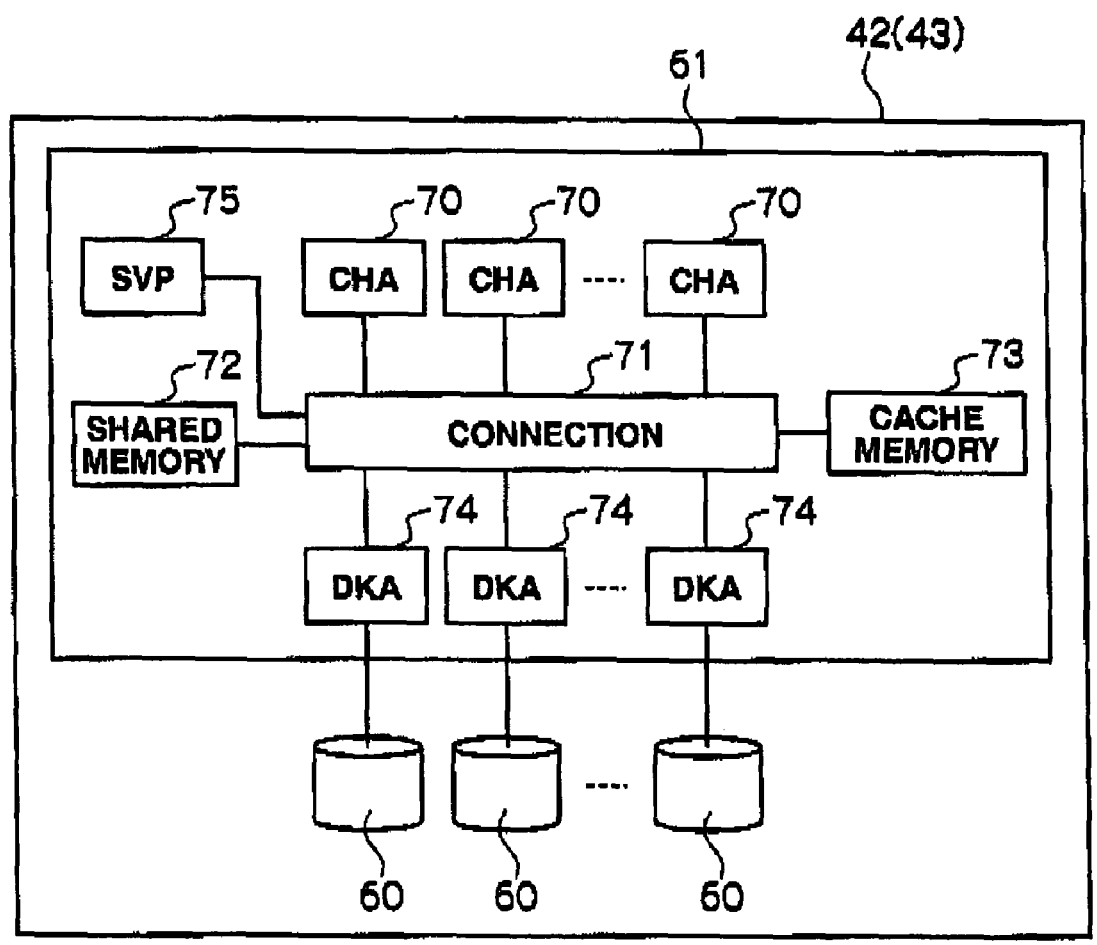
FIG. 14 is a block diagram showing the configuration of the existed storage system, additional storage device and external storage device.

The existed storage system 42 has an external connection function which virtualizes a LDEV (this is hereinafter referred to as an "external LDEV") 52 provided to the host system 41 by the external storage device 47 and provides this to the virtual LDEV 53, and an internal mirror copying function which performs the copy processing between the LDEVs (virtual LDEV 53 and internal LDEV 62 described later) set in itself, and, as shown in FIG. 14, is configured by having a plurality of physical storage devices 60 and a control unit 61.

Among the above, as the physical storage devices 60, for example, an expensive disk such as a SCSI (Small Computer System Interface) disk or an inexpensive disk such as a SATA (Serial AT Attachment) disk or an optical disk may be used.

These physical storage disks 60 are operated with the control unit 61 according to the RAID system. One or more LDEVs (these are hereinafter referred to as "internal LDEVs") 62 (FIG. 13) are set on a physical storage area provided by one or more physical storage disks 60. And data is stored in block (this is hereinafter referred to as a "logical block") units of a prescribed size in these internal LDEVs 62 and virtual LDEVs 53.

Each internal LDEV 62 and each virtual LDEV 53 is given a unique identifier (this is hereinafter referred to as a "LDEV number"). In the case of this embodiment, the input and output of data is conducted by designating an address which is a combination of this LDEV number and a unique number given to each block (LBA: Logical Block Address).

Meanwhile, the control unit 61 is configured by including a plurality of channel adapters 70, a connection 71, a shared memory 72, a cache memory 73, a plurality of disk adapters 74 and a management terminal 75.

Each channel adapter 70 is configured as a microcomputer system having a microprocessor, memory and communication interface, and interprets the various commands transmitted from the host system 41 (FIG. 13) via the first network 45 and executes the corresponding processing.

Further, each channel adapter 70, as shown in FIG. 13, has a normal port 42A for connecting with the first network 45, and an external connection port 42B having an initiator function and capable of issuing a SCSI command. The port 42A and external connection port 42B are assigned a port address such as an IP (Internet Protocol) address or WWN (World Wide Address) for identifying the respective ports, and each channel adapter 70 is thereby able to independently behave as a NAS (Network Attached Storage).

The connection 71 is connected to each channel adapter 70, shared memory 72, cache memory 73 and each disk adapter 74. The transfer of data and commands among the channel adapters 70, shared memory 72, cache memory 73 and disk adapters 74 is conducted via this connection 71. The connection 71, for instance, is configured from a switch such as an ultra-speed crossbar switch or bus for transferring data via high-speed switching.

The shared memory 72 and cache memory 73 are memories to be shared by the channel adapters 70 and disk adapters 74. The shared memory 72 is mainly used for storing system configuration information relating to the configuration of the overall storage device and commands. The LDEV management table 85 described later, pair management table 7 and differential bit information 6 of each copy pair are also stored in the shared memory 72. Further, the cache memory 73 is mainly used for temporarily storing data to be input and output to and from the physical storage devices 60.

Each disk adapter 74 is configured as a microcomputer system having a microprocessor, memory and the like, and functions as an interface for controlling the protocol upon communicating with the physical storage devices 60. These disk adapters 74, for example, are connected to the corresponding physical storage devices 60 via a fibre channel cable, and the transfer of data with such physical storage devices 60 is conducted according to a fibre channel protocol.

The management terminal 75 is a terminal device for controlling the overall operation of the storage device and, for instance, is configured from a node-type personal computer. The management terminal 75 is connected to each channel adapter 70 and each disk adapter 74 via a LAN not shown. The management terminal 75 monitors the occurrence of failure in the storage device, and indicates the occurrence of a failure on its display and performs the close processing of the corresponding physical storage devices according to the operator's operations. The operator is able to define the system configuration information with the management terminal 75, and store this defined system configuration information in the shared memory 72 via the channel adapters 70 or the disk adapters 74 and connection 71.

Similarly, the additional storage device 43 has an external connection function for virtualizing the LDEV 52 provided to the host system 41 by the external storage device 47 and providing this to the virtual LDEV 76 (FIG. 13), and an internal mirror copying function for performing copy processing between the virtual LDEV 76 and internal LDEV 77 set in itself (FIG. 13), and, as shown in FIG. 13, is configured by having a plurality of physical storage devices 60 and a control unit 61.

This additional storage device 43 has the same configuration as the existed storage system 42 described above with reference to FIG. 14, and is connected to the first network 4 via the port 43A and connected to the second network 46 via the external connection port 43B.

The management server 44 is configured by comprising a CPU 80 for executing the various operations, a ROM (Read Only Memory) not shown storing various control programs, a RAM (Random Access Memory) not shown as the work memory of the CPU 80, a physical storage devices 81 configured from a hard disk or the like, an NIC 82 for connecting to the LAN, and an HBA 83 for accessing the host system 41 or existed storage system 42 or additional storage device 43 via the first network 45.

The physical storage devices 81 store load balancing software 84 prescribing the processing for controlling the load balancing of the existed storage system 42 in relation to the data I/O processing and data copy processing, and the CPU 80 checks the load balance of the existed storage system 42 and additional storage device 43 according to this load balancing software 84 as described later, and controls the existed storage system 42, additional storage device 43 and external storage device 47 when the load of the existed storage system 42 is higher, and balances the load of the existed storage system 42 with the additional storage device 43.

The first and second networks 45, 46, for instance, are configured from a SAN (Storage Area Network), LAN, Internet, public line or dedicated line. Communication via such first or second network 45, 46 is conducted according to a fibre channel protocol when the first or second network 45, 46 is a SAN, and conducted according to a TCP/IP (Transmission Control Protocol/Internet Protocol) when the first or second network 45, 46 is a LAN. Incidentally, in this embodiment, although the first and second networks 45, 46 are configured separately for facilitating the understanding of the connection relationship among the existed storage system 42, additional storage device 43 and external storage device 47, these may also be configured from a single network.

Further, the external storage device 47 is configured the same as the existed storage system 42 described above with reference to FIG. 14 excluding the point that it does not have the external connection function and internal mirror copying function, and is connected to the external connection port 42B of the existed storage system 42 and the external connection port 43B of the additional storage device 43 via the second network 46.

(2-2) Load Balancing Processing Function in Storage System (2-2-1) Configuration of Various Tables and Differential Bit Information Next, before explaining the load balancing processing function in the storage system 40 of this embodiment, the configuration of the various tables and differential bit information to be used upon executing the load balancing processing function is explained.

Figure 15:
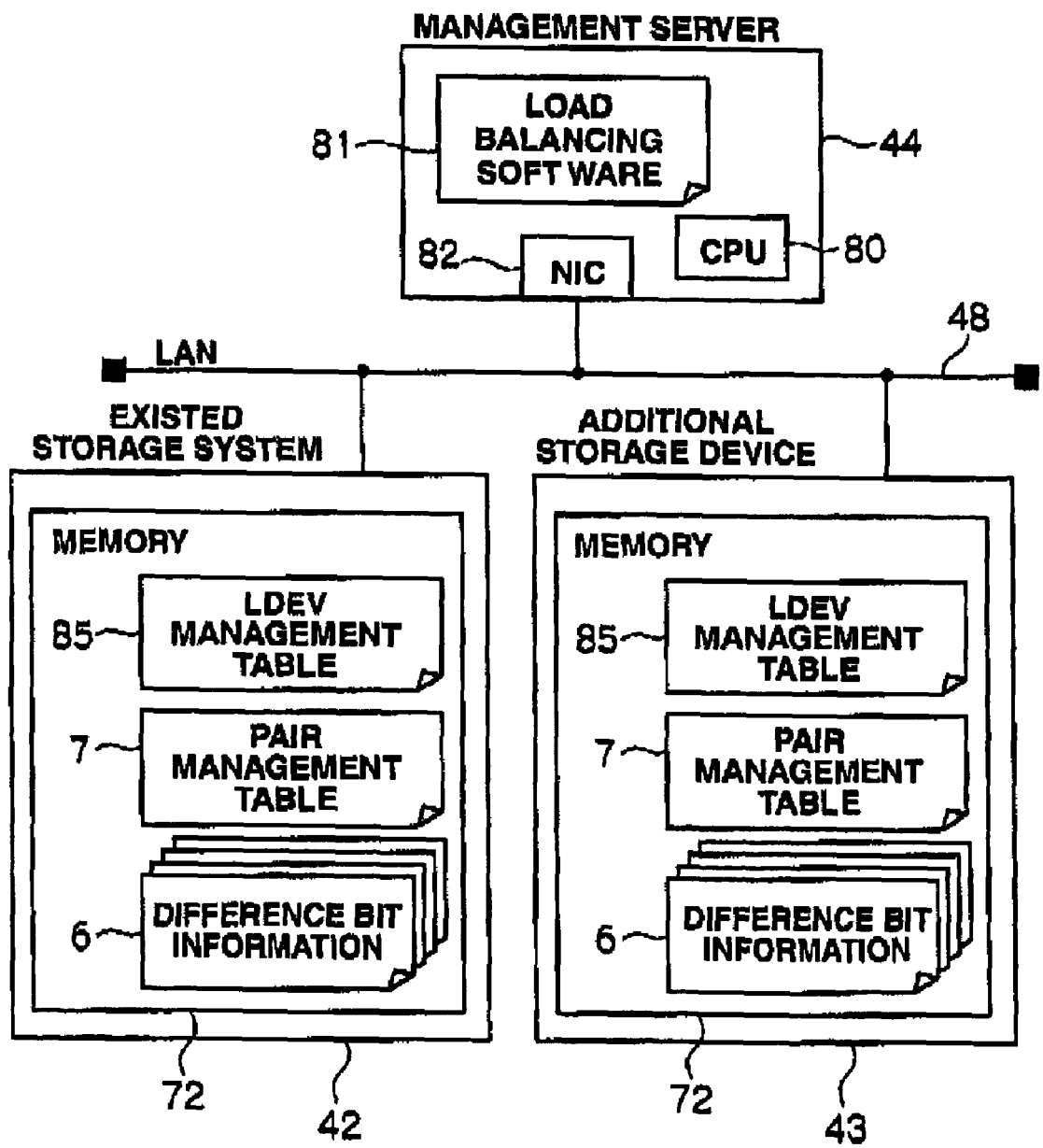
FIG. 15 is a conceptual diagram showing the connection relationship of the load balancing software, LDEV management table, pair management table and differential bit information.

As shown in FIG. 15, the respective shared memories 72 of the existed storage system 42 and additional storage device 43 retain the LDEV management table 85, pair management table 7 and differential bit information 6. And, the CPU 80 of the management server 44, upon load balancing processing, acquires the data of the LDEV management table 85, pair management table 7 and differential bit information 6 from the existed storage system 42 and additional storage device 43 via the NIC 82 and LAN 48.

Here, the LDEV management table 85 is a table for retaining information relating to all internal LDEVs 62, 77 and virtual LDEVs 53, 76 existing on the existed storage system 42 or additional storage device 43, and, as shown in FIG. 16(A), is configured from an internal (virtual) LDEV field 90 and an external LDEV field 91.

Among the above, the internal (virtual) LDEV field 90 is configured from an LDEV number column 92, a capacity column 93, a LUN column 94 and an external connection port address column 95. And, the LDEV number column 92 stores the serial number respectively given to each internal LDEV 62, 77 or virtual LDEV 53, 76, and the capacity column 93 stores the capacity of the corresponding internal LDEVs 62, 77 or virtual LDEVs 53, 76. Moreover, the LUN column 94 stores the LUN of the corresponding internal LDEVs 62, 77 or virtual LDEVs 53, 76, and the external connection port address column 95 stores the port address of the external connection ports 42A, 43A (FIG. 13) in the existed storage system 42 or additional storage device 43.

Further, the external LDEV field 91 is configured from a port address column 96 and a LUN column 97. And, when the corresponding LDEV on the existed storage system 42 or additional storage device 43 is a virtual LDEV 53, 76, the LUN of the external LDEV 52 (FIG. 13) in an external storage device 47 (FIG. 13) mapped to the virtual LDEV 53, 76 is stored in the LUN column 97, and, for instance, the port address of the port 47A (FIG. 13) in the external storage device 47 connected to the external LDEV 52 is stored in the port address column 96.

Accordingly, as shown in FIG. 16(B), with respect to an entry storing LUN in both the LUN column 94 of the internal (virtual) LDEV field 90 and the LUN column 97 of the external LDEV field 91 in the LDEV management table 85, the actual data exists in the external LDEV 52 (FIG. 13), and is accessible from the host system 41 (FIG. 13). With respect to an entry storing LUN in the LUN column 94 of the internal LDEV field 90, but not storing LUN in the LUN column 97 of the external LDEV field 91, the actual data exists in the internal LDEVs 62, 77 of the existed storage system 42 or additional storage device 43, and is accessible from the host system 41. Incidentally, an entry not storing LUN in both the LUN column 94 of the internal (virtual) LDEV field 90 and the LUN column 97 of the external LDEV field 91 is an unused LDEV set on the existed storage system 42 or additional storage device 43, and is inaccessible from the host system 41.

Figures 17, 18:
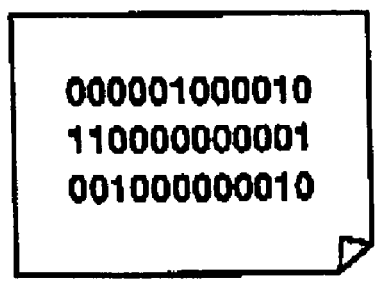
FIG. 17 is a conceptual diagram for explaining the pair management table.
FIG. 18 is a conceptual diagram for explaining the differential bit information.

Meanwhile, the pair management table 7 is a table for retaining configuration information of the copy pair paired for the copy processing in the internal mirror using the internal mirror copying function, and, as shown in FIG. 17, is configured from a pair number column 100, a primary volume LDEV number column 101, a secondary volume LDEV number column 102 and a pair status column 103.

Here, the pair number column 100 stores a pair number which is a unique number given to the corresponding copy pair, and the primary volume LDEV number column 101 stores a LDEV number of the LDEV forming a primary volume of such copy pair. Further, the secondary volume LDEV number column 102 stores a LDEV number of the LDEV forming a secondary volume of such copy pair, and the pair status column 103 stores the current pair status ("pair", "copy" or "split") of the copy pair.

Meanwhile, the differential bit information 6, as shown in FIG. 18, is a bit string configured from the same number of bits as the number of LDEV blocks forming the primary volume and secondary volume of the corresponding copy pair, and "1" is set to a bit corresponding to a block in which the data of the primary volume and secondary volume are different, and "0" is set to a bit corresponding to a block in which the data of the primary volume and secondary volume are the same. This difference bit row 6 exists in the same number as the number of copy pairs by respectively corresponding to the copy pairs registered in the pair management table 7.

(2-2-2) Various Commands Relating to Load Balancing Processing

Next, the command used by the CPU 80 (FIG. 13) of the management server 44 upon executing the load balancing processing is explained.

In the foregoing storage system 40, the CPU 80 of the management server 44, upon executing the load balancing function, causes the existed storage system 42 or additional storage device 43 or external storage device 47 to execute required processing by transmitting a corresponding command among the various commands shown in FIG. 19 and FIG. 20 to the existed storage system 42 or additional storage device 43 or external storage device 47 via the LAN 48 (FIG. 13) based on the load balancing software 84 (FIG. 13).

FIG. 19 and FIG. 20 show an example of the various commands transmitted from the management server 44 to the existed storage system 42 or additional storage device 43 or external storage device 47 upon the execution of the load balancing function described above.

For example, a "createMapping" command is used for instructing the existed storage system 42 or additional storage device 43 to designate the LDEV number, LDEV capacity, port address of the storage device to be mapped and LUN of the external LDEV 52 to be mapped, create virtual LDEVs 53, 76 having the same capacity as the LDEV of the LDEV number, and map the external LDEV 52 of the LUN assigned under the port of the port address connected to its external connection ports 42B, 43B to the created virtual LDEVs 53, 76. As a result of this processing, a single external LDEV 52 and a single virtual volume 53, 76 will be associated.

Figure 21:
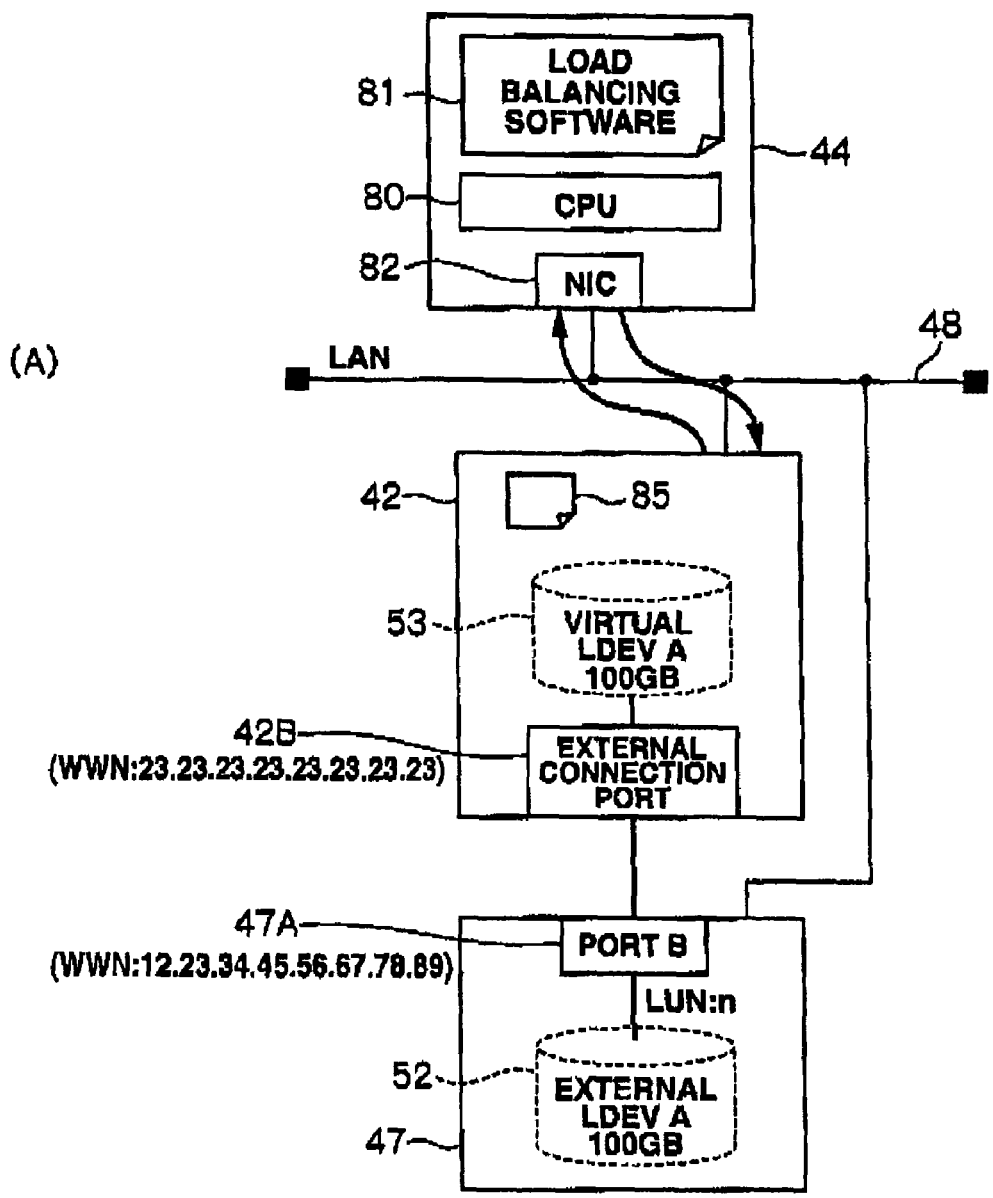
FIG. 21(A)-(B) are conceptual diagrams for explaining the "createMapping" command.

Specifically, the CPU 80 of the management server 44, as shown in FIG. 21(A), creates a virtual LDEV 53 in which the LDEV number is "A" and the capacity is "100 (GB)" in the existed storage system 42, and transmits a command of "createmapping A 100 12.23.34.45.56.67.78.89 n" when such virtual LDEV 53 is to be mapped to the external LDEV 52 in which the LUN in the external storage device 47 is "n" and the network address of the port 47A connected to the external connection port 42B of the existed storage system 42 is "12.23.34.45.56.67.78.89".

As a result, the existed storage system 42 given this command, as shown in FIG. 21(B), creates the virtual LDEV 53 of the designated LDEV number and capacity by registering the designated LDEV number and capacity, and the network address of the external connection port 42B in the internal (virtual) LDEV field 90 of the LDEV management table 85 according to this command. Further, the existed storage system 42 maps the designated external LDEV 52 to the virtual LDEV 53 by storing the designated network address and designated LUN in the external LDEV field 91 of the entry in the LDEV management table 85. The existed storage system 42 at such time transmits a command of "True" when the processing is a success and a command of "Failure" when the processing is a failure to the management server 44 via the LAN 48.

Meanwhile, a "deleteMapping" command is used for instructing the existed storage system 42 or additional storage device 43 to delete the association of the external LDEV 52 and virtual LDEVs 53, 76, and delete the entry of the corresponding LUN from the LDEV management table 85. As a result of this processing, the host system 41 will not be able to access the virtual LDEVs 53, 76.

Figure 22:
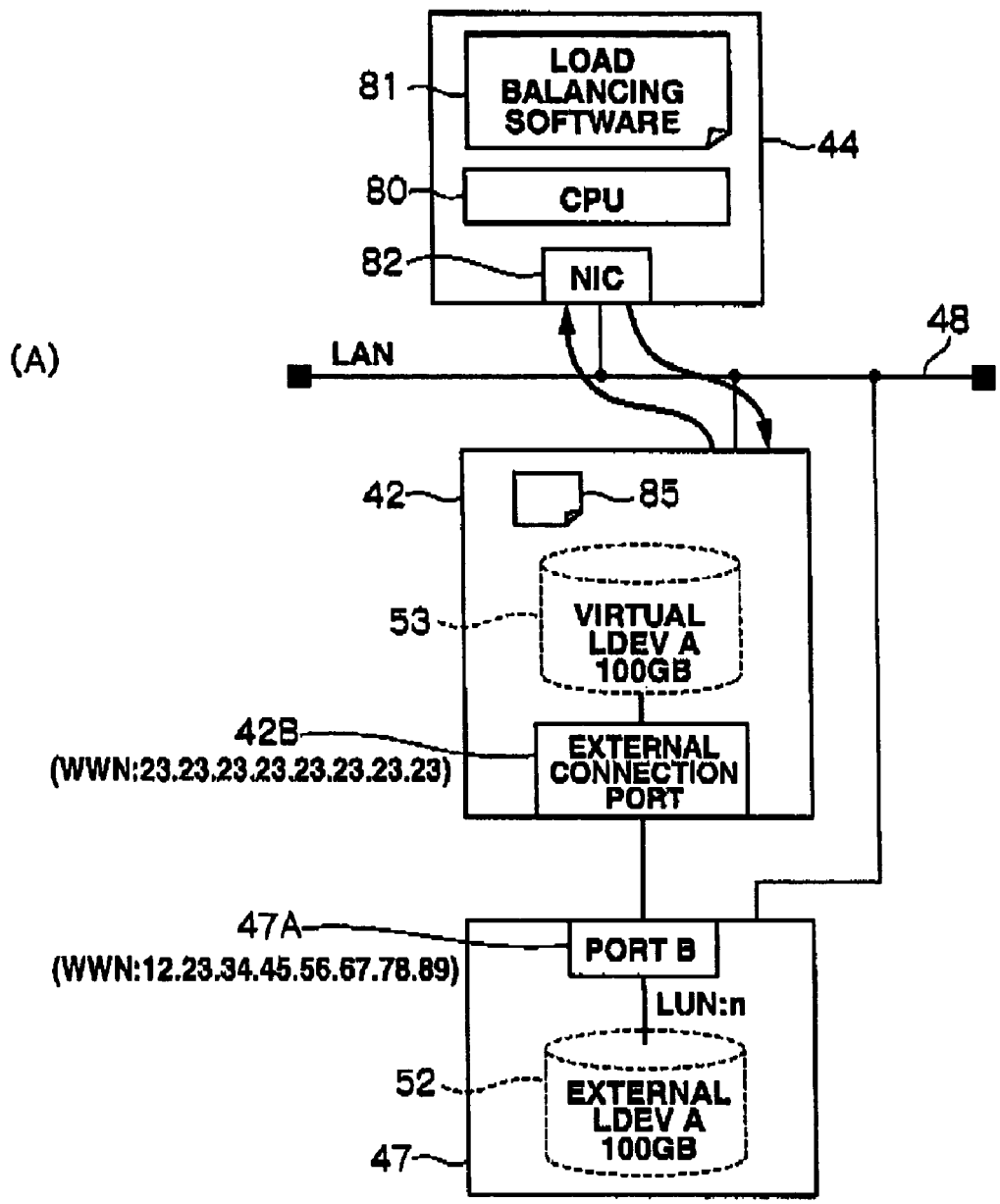
FIG. 22(A)-(B) are conceptual diagrams for explaining the "deleteMapping" command.

For example, the CPU 80 of the management server 44, as shown in FIG. 22(A), transmits a command of "deleteMapping A" to the existed storage system 42 when it wishes to delete the virtual LDEV 53 in which the LDEV number in the existed storage system 42 is "A".

As a result, the existed storage system 42 given this command delete the mapping of the external storage device 47 mapped to the external connection port 42B according to this command, deletes the virtual LDEV 53 in which the LDEV number is "A", and, as shown in FIG. 22(B), deletes the entry of this virtual LDEV 53 from this LDEV management table 85. Here, this existed storage system 42 transmits a command of "True" when the processing is a success and a command of "Failure" when the processing is a failure to the management server 44 via the LAN 48.

Meanwhile, a "createpair" command is used for designating the LDEV number of the copy source, LDEV number of the copy destination and the pair status ("copy", "pair" or "split") of the copy pair to be created, and used for creating a copy pair in the existed storage system 42 or additional storage device 43. Here, as the argument corresponding to the respective pair statuses of "copy", "pair" or "split", "-init", "-pair" or "-split" is used, respectively.

For example, the CPU 80 of the management server 44 transmits a command of "createpair A B -pair" to the existed storage system 42 or additional storage device 43 when it wishes to create a copy pair in which the pair status is "pair" with the virtual LDEVs 53, 76 or internal LDEVs 62, 77 having "A" as the LDEV number in the existed storage system 42 or additional storage device 43 being the copy source (primary volume), and the virtual LDEVs 53, 76 or internal LDEVs 62, 77 having "B" as the LDEV number being the copy destination (secondary volume).

Figure 23:
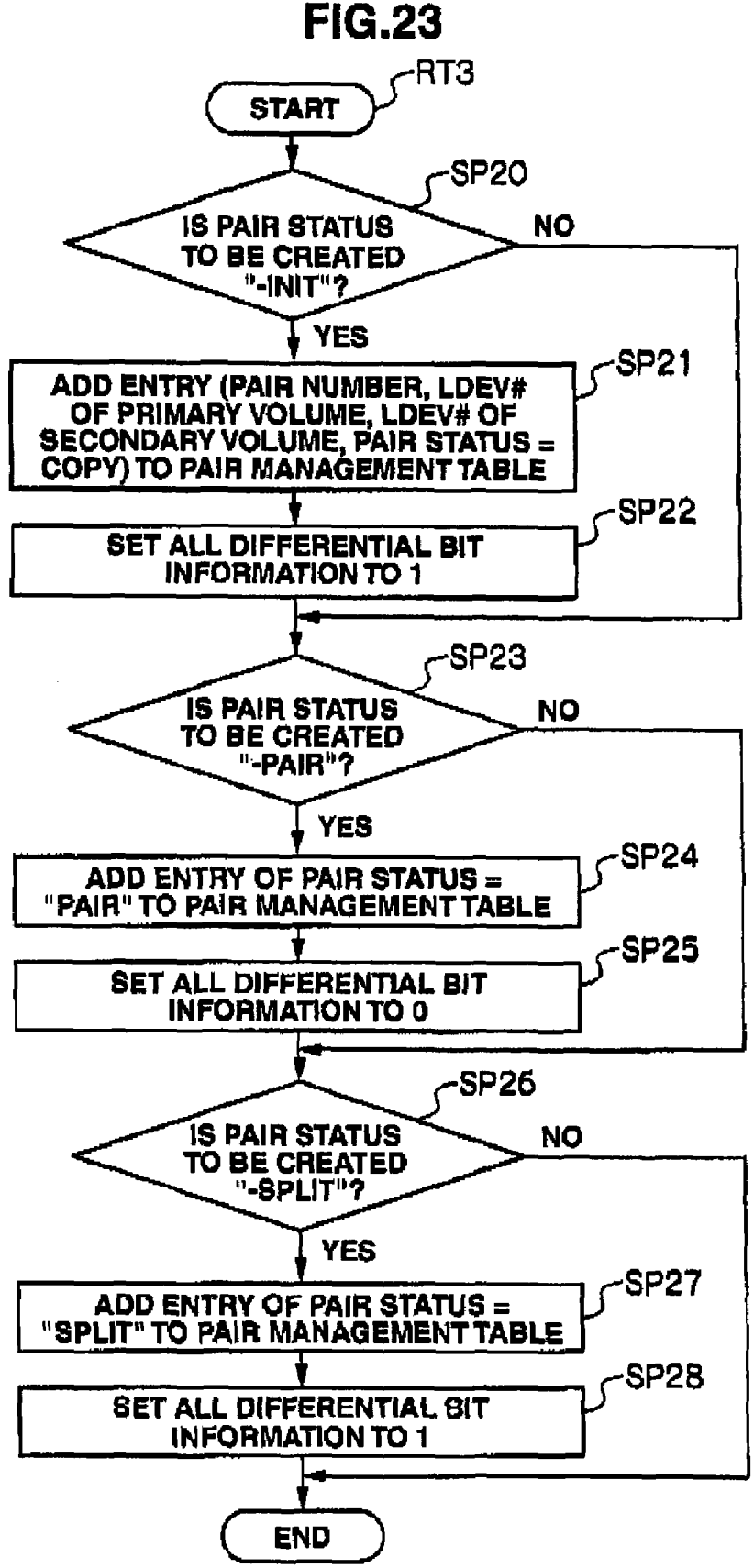
FIG. 23 is a flowchart for explaining the "createpair" command.

FIG. 23 is a flowchart showing the processing to be performed by the channel adapter 70 in the existed storage system 42 or additional storage device 43 that received this "createpair" command. The channel adapter 70 creates a designated copy pair according to this flowchart.

In other words, when the channel adapter 70 receives the "createpair" command, it foremost determines whether or not the argument regarding the pair status contained in this "createpair" command is "-init" (SP20), and proceeds to step SP23 when it obtains a negative result (SP20: NO).

Meanwhile, when the channel adapter 70 obtains a positive result in the determination at step SP20 (SP20: YES), it newly registers the designated copy pair in the pair management table 7. Specifically, the pair number of this copy pair, LDEV number of the virtual LDEVs 53, 76 or internal LDEVs 62, 77 to become the primary volume (LDEV number of the copy source LDEV designated in the command), LDEV number of the virtual LDEVs 53, 76 or internal LDEVs 62, 77 to become the secondary volume (LDEV number of the copy destination LDEV designated in the command) and the pair status ("copy") are respectively added to the pair management table 7 (SP21). And, the channel adapter 70 thereafter creates differential bit information 6 associated with this copy pair, and sets "1" to all bits in this differential bit information 6 (SP22).

Next, the channel adapter 70 determines whether or not the argument regarding the pair status contained in the "createpair" command is "-pair" (SP23), and proceeds to step SP26 when it obtains a negative result (SP23: NO).

Meanwhile, when the channel adapter 70 obtains a positive result in the determination at step SP23 (SP23: YES), it newly registers the designated copy pair in the pair management table 7. Specifically, as in the case at step SP21, the pair number of this copy pair, LDEV number of the virtual LDEVs 53, 76 or internal LDEVs 62, 77 to become the primary volume, LDEV number of the virtual LDEVs 53, 76 or internal LDEVs 62, 77 to become the secondary volume and the pair status ("pair") are respectively added to the pair management table 7 (SP24). And, the channel adapter 70 thereafter creates differential bit information 6 associated with this copy pair, and sets "0" to all bits in this differential bit information 6 (SP25).

Next, the channel adapter 70 determines whether or not the argument regarding the pair status contained in the "createpair" command is "-split" (SP26), and ends the series of processing steps when it obtains a negative result (SP26: NO).

Meanwhile, when the channel adapter 70 obtains a positive result in the determination at step SP26 (SP26: YES), it newly registers the designated copy pair in the pair management table 7. Specifically, as in the case at step SP24, the pair number of this copy pair, LDEV number of the virtual LDEVs 53, 76 or internal LDEVs 62, 77 to become the primary volume, LDEV number of the virtual LDEVs 53, 76 or internal LDEVs 62, 77 to become the secondary volume and the pair status ("split") are respectively added to the pair management table 7 (SP27). And, the channel adapter 70 thereafter creates differential bit information 6 associated with this copy pair, and sets "1" to all bits in this differential bit information 6 (SP28). The channel adapter 70 thereafter ends the series of processing steps.

(2-2-3) Flow of Load Balancing Processing

Next, the sequential flow of the load balancing processing performed with this storage system 40 is explained with reference to FIG. 24 to FIG. 35.

Figure 24:
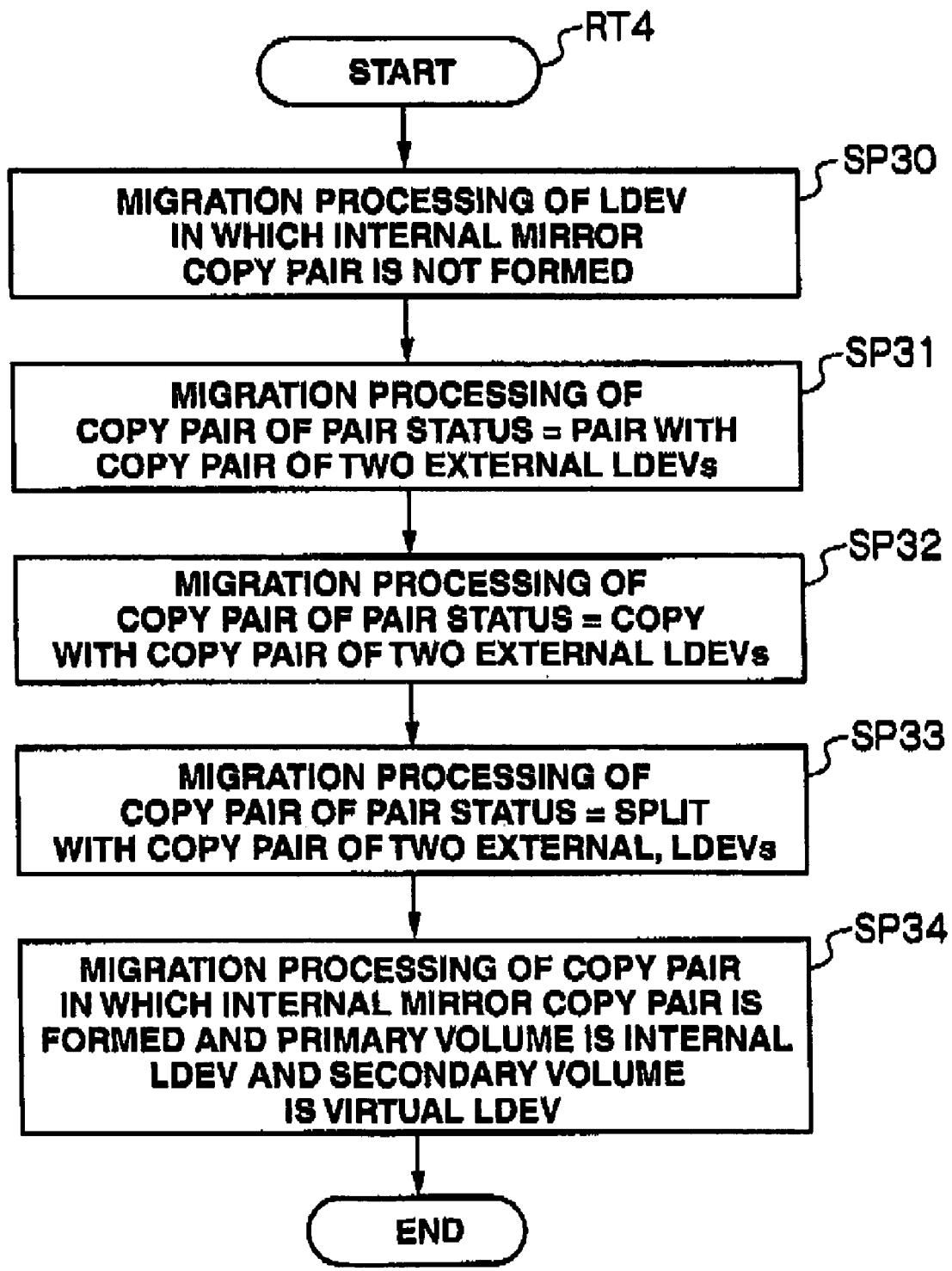
FIG. 24 is a flowchart showing the first load balancing processing sequence.

The CPU 80 of the management server 44, based on the load balancing software 84, periodically executes the first load balancing processing sequence RT4 shown in FIG. 24, checks the load balance between the existed storage system 42 and additional storage device 43 relating to the input and output of data to and from the host system 41, and executes processing (load balancing processing) for migrating the LDEV in the existed storage system 42 to the additional storage device 43 to an extent that the load balance of the existed storage system 42 and additional storage device 43 will not collapse when the load of the existed storage system 42 is significant.

Here, as the LDEV to be migrated, a LDEV that can be easily migrated is preferentially used. Specifically, the CPU 80 of the management server 44 controls the existed storage system 42, additional storage device 43 and external storage device 47 so as to migrate LDEVs in the order of a copy pair which is a virtual LDEV 53 where a copy pair is not formed in the existed storage system 42 (SP30), a copy pair which is a virtual LDEV 53 where the primary volume and secondary volume are both mapped to the external LDEV 52 and the pair status is "pair" (SP31), a copy pair which is a virtual LDEV 53 where the primary volume and secondary volume are both mapped to the external LDEV 52 and the pair status is "copy" (SP32), a copy pair which is a virtual LDEV 53 where the primary volume and secondary volume are both mapped to the external LDEV 52 and the pair status is "split" (SP33), and a copy pair where the primary volume is the internal LDEV 62 and the secondary volume is the virtual LDEV 53 mapped to the external LDEV 52 (SP34).

This kind of load balancing processing is now explained in detail.

(2-2-4) Processing at Step SP30 of First Load Balancing Processing Sequence RT4

Foremost, the processing contents of the data migration processing for migrating a virtual LDEV 53, in which a pair is not formed in the existed storage system 42, to the additional storage device 53 to be performed at step SP30 of the first load balancing processing sequence RT4 (FIG. 24) are explained. This data migration processing is performed according to the first LDEV migration processing sequence RT5 shown in FIG. 25 based on the load balancing software 84.

Figure 25:
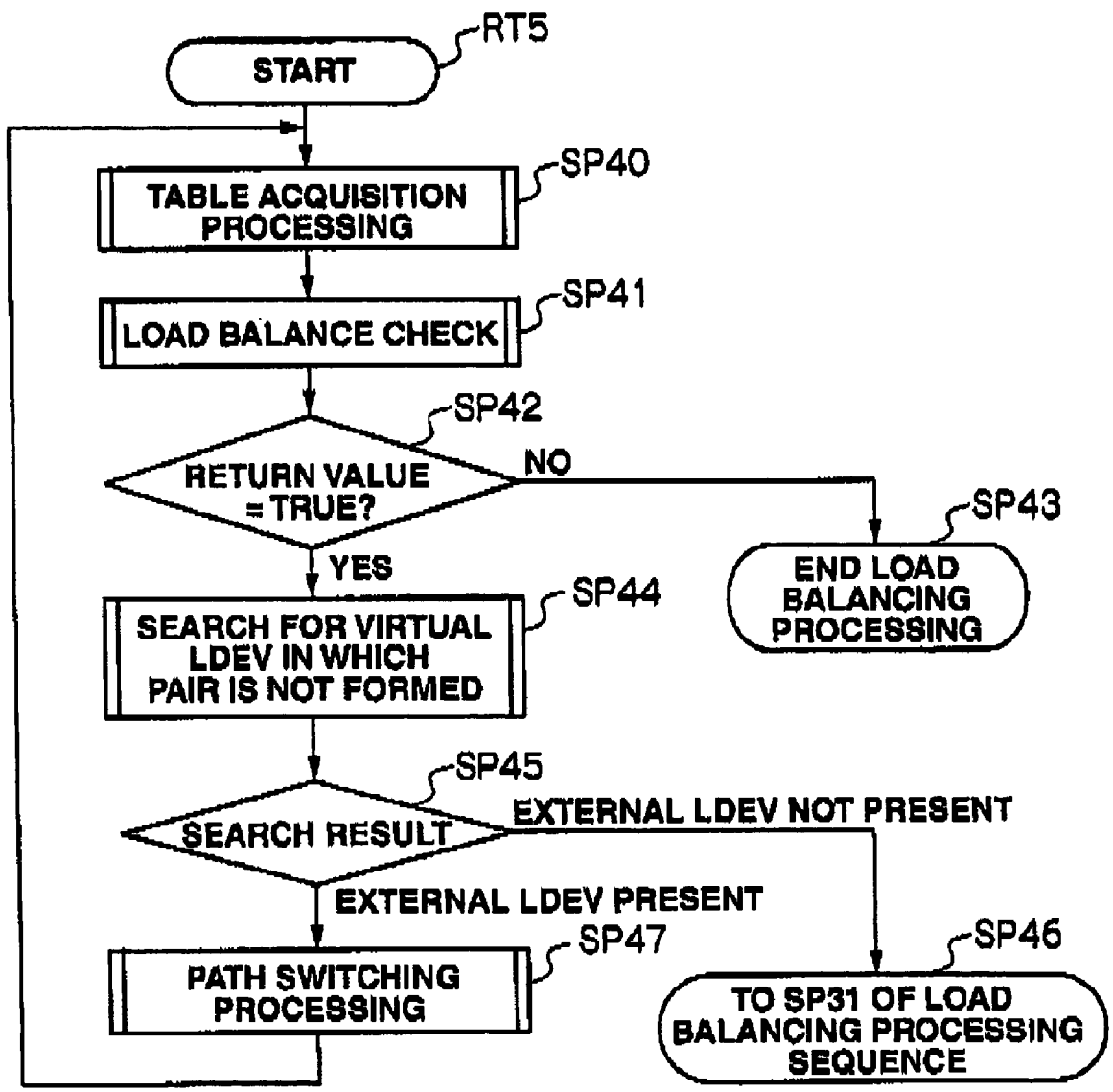
FIG. 25 is a flowchart showing the first LDEV migration processing sequence.

In other words, when the CPU 80 of the management server 44 proceeds to step SP30 of the first load balancing processing sequence RT4 shown in FIG. 24, it starts the first LDEV migration processing sequence RT5 shown in FIG. 25, foremost accesses the existed storage system 42 and additional storage device 43 via the LAN 48 (FIG. 13), and acquires the LDEV management table 85 (FIG. 15) and pair management table 7 (FIG. 15) stored in the respective shared memories (FIG. 14) of the existed storage system 42 and additional storage device 43 (SP40).

Next, the CPU 80 checks the current load balance between the existed storage system 42 and additional storage device 43 (SP41). Thereupon, when the load of the existed storage system 42 is smaller than the load of the additional storage device 43 (SP42: NO), there is no need to migrate the internal LDEV 62 or virtual LDEV 53 of the existed storage system 42 to the additional storage device 43. Thus, here, the CPU 80 ends this load balancing processing (SP43).

Meanwhile, when the load of the existed storage system 42 is greater than the load of the additional storage device 43 (SP42: YES), it is necessary to migrate the data in the existed storage system 42 to the additional storage device 43. Thus, here, the CPU 80 searches for the virtual LDEV 53 that is not paired with another internal LDEV 62 or virtual LDEV 53 and mapped to the external LDEV 52 set in the external storage device 47 among the virtual LDEVs 53 set in the existed storage system 42 based on the LDEV management table 85 and pair management table 7 of the existed storage system 42 acquired at step SP40 (SP44).

And, when the CPU 80 is not able to detect a virtual LDEV 53 satisfying the foregoing conditions as a result of the search (SP45: External LDEV Not Present), it proceeds to step SP31 of the first load balancing processing sequence RT4 described above with reference to FIG. 24, and, when it detects a virtual LDEV 53 satisfying the foregoing conditions (SP45: External LDEV Present), it controls the additional storage device 43 and creates a virtual LDEV (this is hereinafter referred to as a "substitute virtual LDEV") 76 having the same capacity as the virtual LDEV (this is hereinafter referred to as a "detected virtual LDEV") 53 detected at step SP44. Further, the CPU 80 switches the mapping destination of the external LDEV 52 mapped to the detected virtual LDEV 53 theretofore to the substitute virtual LDEV 76 (SP47).

And, the CPU 80 thereafter similarly repeats the routine from the table acquisition processing of step SP40 to the path switching processing of the step SP47 (SP40 to SP47), and sequentially migrates the virtual LDEVs 53 not paired with another internal LDEV 62 or virtual LDEV 53 and mapped to the external LDEV 52 among the virtual LDEVs 53 set in the existed storage system 42 to the additional storage device 43 in LDEV units to the extent where the load of the additional storage device 43 does not exceed the load of the existed storage system 42.

Figure 26:
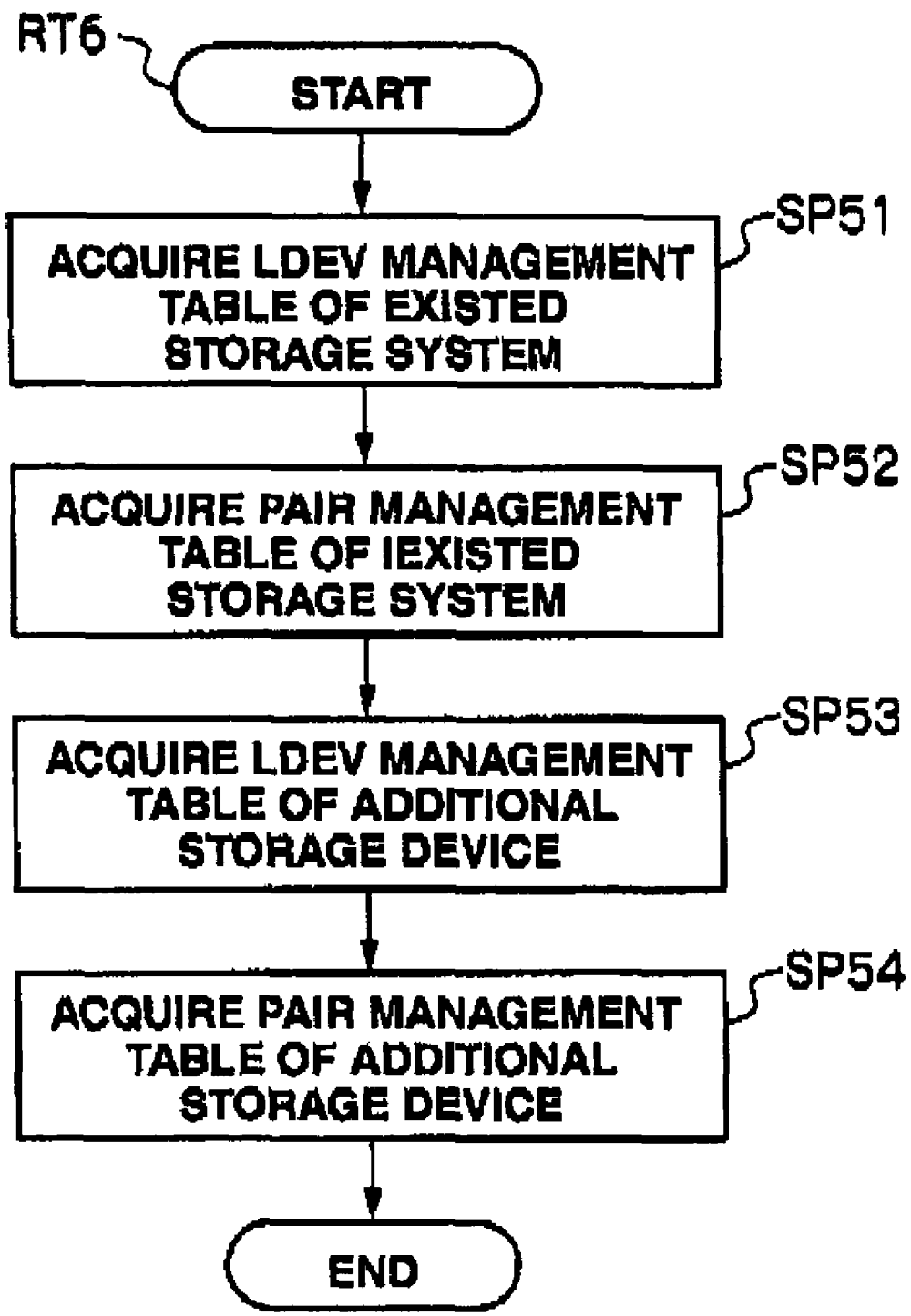
FIG. 26 is a flowchart showing the table acquisition processing sequence.

Here, FIG. 26 is a flowchart showing the specific processing contents of the CPU 80 in relation to the table acquisition processing described above regarding step SP40 of the first LDEV migration processing sequence RT40. The CPU 80 acquires the LDEV management table 85 and pair management table 7 from the existed storage system 42 and additional storage device 43 according to the table acquisition processing sequence RT6 shown in FIG. 26.

In other words, when the CPU 80 proceeds to step SP40 of the first LDEV migration processing sequence RT5, it starts the table acquisition processing sequence RT6, and foremost transmits a "getLdevTable" command (c.f. FIG. 19) to the existed storage system 42 via the LAN 48 (FIG. 13). As a result, data of the LDEV management table 85 is transmitted from the existed storage system 42 to the management server 44 according to the "getLdevTable" command. When the CPU 80 receives this data, it stores the data in an internal memory not shown (SP51).

Further, the CPU 80 thereafter transmits a "getPairTable" command (c.f. FIG. 20) to the existed storage system 42 via the LAN 48. As a result, data of the pair management table 7 is transmitted from the existed storage system 42 to the management server 44 according to this "getPairTable" command. And, when the CPU 80 receives this data, it stores the data in the foregoing internal memory (SP52).

Similarly, the CPU 80 thereafter sequentially transmits a "getLdevTable" command and "getPairTable" command to the additional storage device 43 via the LAN 48. As a result, data of the management table 85 and data of the pair management table 7 are sequentially transmitted to the management server 44 according to the "getLdevTable" command and "getPairTable" command. And, when the CPU 80 receives such data, it sequentially stores the data in the foregoing internal memory (SP53, SP54).

Figure 27:
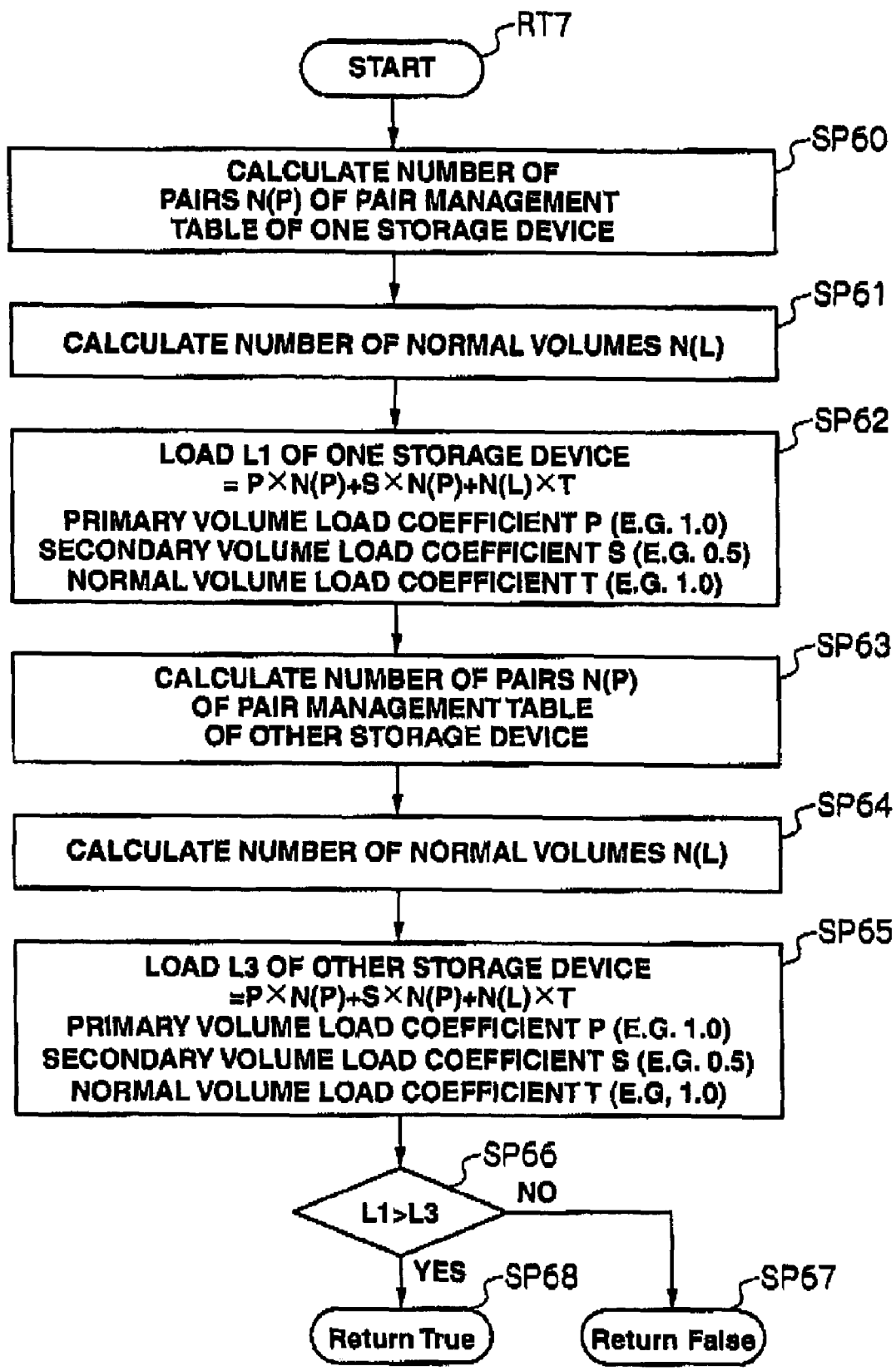
FIG. 27 is a flowchart showing the load balance check processing sequence.

Further, FIG. 27 is a flowchart showing the specific processing contents of the CPU 80 in relation to the load balance check processing regarding step SP41 of the first LDEV migration processing sequence RT5 (FIG. 25). The CPU 80 quantifies the respective loads of the existed storage system 42 and additional storage device 43 (decrease in processing speed accompanying the increase in the input and output of data) according to the load balance check processing sequence RT7 shown in FIG. 27, and determines which load is higher by comparing these values.

In other words, when the CPU 80 proceeds to step SP41 of the first LDEV migration processing sequence RT5 (FIG. 25), it starts the load balance check processing sequence RT7, and foremost detects the number of copy pairs N(P) set in the existed storage system 42 by counting the number of copy pairs registered in the pair management table 7 of either the existed storage system 42 or additional storage device 43 (existed storage system 42 will be used here) (SP60).

Further, the CPU 80 thereafter calculates the number of LDEVs (this is hereinafter referred to as a "normal volume") N(L) not forming a copy pair among the internal LDEVs 62 and virtual LDEVs 53 in the existed storage system 42 (SP61). Specifically, the CPU 80 counts the number of entries N(L) in which the LUN is stored in the LUN column 94 of the internal (virtual) LDEV field 90 (FIG. 16) in the LDEV management table 85 of the existed storage system 42, and calculates the difference between such count value and twice the number of copy pairs N(P) detected at step SP60.

Next, the CPU 80 separates the internal LDEV 62 and virtual LDEV 53 set in the existed storage system 42 into three types; namely, a LDEV forming a primary volume of a copy pair, a LDEV forming a secondary volume of a copy pair, and a normal volume, and quantifies the load L1 of the existed storage system 42 by seeking the total value obtained by multiplying to the number of LDEVs of the respective types a loading coefficient predetermined in relation to such types (SP62).

This operation can be calculated with the following formula where the loading coefficient to the primary volume of the copy pair is P, the loading coefficient to the secondary volume of the copy pair is S, and the loading coefficient to the normal volume is T:

$$L1 = N(P) \times P + N(P) \times S + N(L) \qquad \text{Formula 1}$$

For example, the loading coefficient P to the primary volume of the copy pair is set to 1.0, the loading coefficient S to the secondary volume of the copy pair is set to 0.5, and the loading coefficient T to the normal volume is set to 1.0. Incidentally, when the pair status of the copy pair is "split", there is no processing for writing data in the secondary volume, and the load of the secondary volume will be alleviated. Thus, although the loading coefficient S to the secondary volume of the copy pair may be set to be around 0.2 in comparison to the loading coefficient P to the primary volume of the copy pair being set to 1.0, if the primary volume and secondary volume are to be resynchronized, processing for writing data in the secondary volume will become required and this could become a high load. This is why the loading coefficient to the secondary volume is set to 0.5 as described above.

And, when the number of copy pairs in the existed storage system 42 is 400, and the number of normal volumes is 200, the load L1 of the overall existed storage system 42 can be calculated with the following formula:

$$L1 = 400 \times 1.0 + 400 \times 0.5 + 200 \times 1.0 = 800 \qquad \text{Formula 2}$$

After the operation of the load L1 of this existed storage system 42, the CPU 80 detects the number of copy pairs N(P)' set in the additional storage device 43 by counting the number of copy pairs registered in the pair management table 7 of the additional storage device 43, which is the data migration destination (SP63).

Next, the CPU 80 calculates the number of normal volumes N(L)' among the internal LDEVs 77 and virtual LDEVs 76 set in the additional storage device 43 according to the operation method described above at step SP61 (SP64), and thereafter quantifies the load L3 of the additional storage device 43 according to the operation method described above at step SP62 (SP65).

Next, the CPU 80 determines whether or not the load L1 quantified with the existed storage system 42 is greater than the load L3 quantified with the additional storage device 43 (SP66), and, when it obtains a negative result (SP66: NO), it obtains a check result of "False (Incorrect)" (SP67), and, when it obtains a positive result (SP66: YES), it obtains a check result of "True (Correct)" (SP68).

As a result, when the CPU 80 obtains a check result of "False (Incorrect)", it ends the subsequent load balancing processing upon obtaining a negative result in the determination at step SP42 of the first LDEV migration processing sequence RT5 shown in FIG. 25 (SP43). Meanwhile, when the CPU 80 obtains a check result of "True (Correct)", it thereafter proceeds to step SP44 upon obtaining a positive result in the determination at step SP42 of the first LDEV migration processing sequence RT5.

Figure 28:
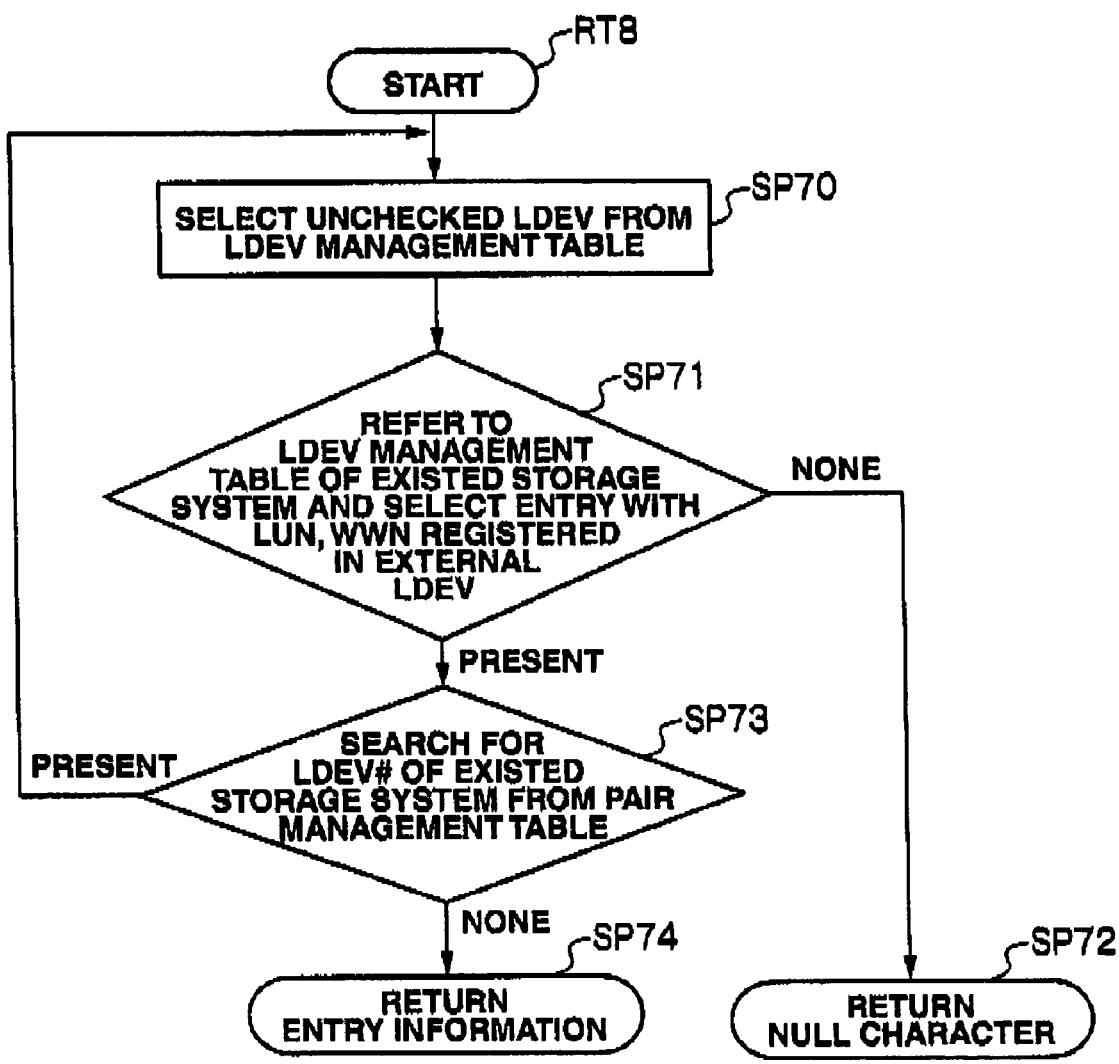
FIG. 28 is a flowchart showing the first LDEV search processing sequence.

Meanwhile, FIG. 28 is a flowchart showing the specific processing contents of step SP44 of the first LDEV migration processing sequence RT5 (FIG. 25). The CPU 80 searches for a virtual LDEV 53 that is not forming a copy pair and which is mapped to the external LDEV 52 according to the first LDEV search processing sequence RT8 shown in FIG. 28.

In other words, when the CPU 80 proceeds to step SP44 of the first LDEV migration processing sequence RT5, it starts this first LDEV search processing sequence RT8, and foremost searches for the internal LDEV 62 or virtual LDEV 53 not yet subject to the processing of step SP71 and step SP73 described later from the LDEV management table 85 of the existed storage system 42 (SP70).

Next, the CPU 80 refers to the LDEV management table 85 of the existed storage system 42, and selects an entry from the unchecked internal LDEV 62 or virtual LDEV 53 detected at step SP70 in which the port address and LUN are respectively registered in the port address column 96 and LUN column 97 of the external LDEV field 91 (FIG. 16); that is, it selects one entry of the virtual LDEV 53 mapped to the external LDEV 52 in the external storage device 47 (SP71).

When the CPU 80 is not able to select a corresponding entry (SP71: None), it returns to the first LDEV migration processing sequence RT5 (SP72), and thereafter proceeds to step SP46 via step SP45 of the first LDEV migration processing sequence RT5.

Meanwhile, when the CPU 80 is able to select a corresponding entry at step SP71 (SP71: Present), it searches whether the LDEV number of the internal LDEV 62 or virtual LDEV 53 associated with such entry is registered in the pair management table 7 of the existed storage system 42 as the LDEV number of the primary volume or the LDEV number of the secondary volume (SP73).

And, when the CPU 80 is able to detect the LDEV number of the internal LDEV 62 or virtual LDEV 53 associated with the entry selected at step SP71 in the pair management table 7 of the existed storage system 42 as a result of the foregoing search (SP73: Present), it returns to step SP70 and repeats the same processing steps (SP70 to SP73-SP70).

Contrarily, when the CPU 80 is not able to detect the LDEV number of the internal LDEV 62 or virtual LDEV 53 associated with the entry selected at step SP71 in the pair management table 7 of the existed storage system 42 as a result of the foregoing search (SP73: None), it returns to the first LDEV migration processing sequence RT5 (SP74), and thereafter proceeds to step SP47 via step SP45 of the first LDEV migration processing sequence RT5.

Figure 29:
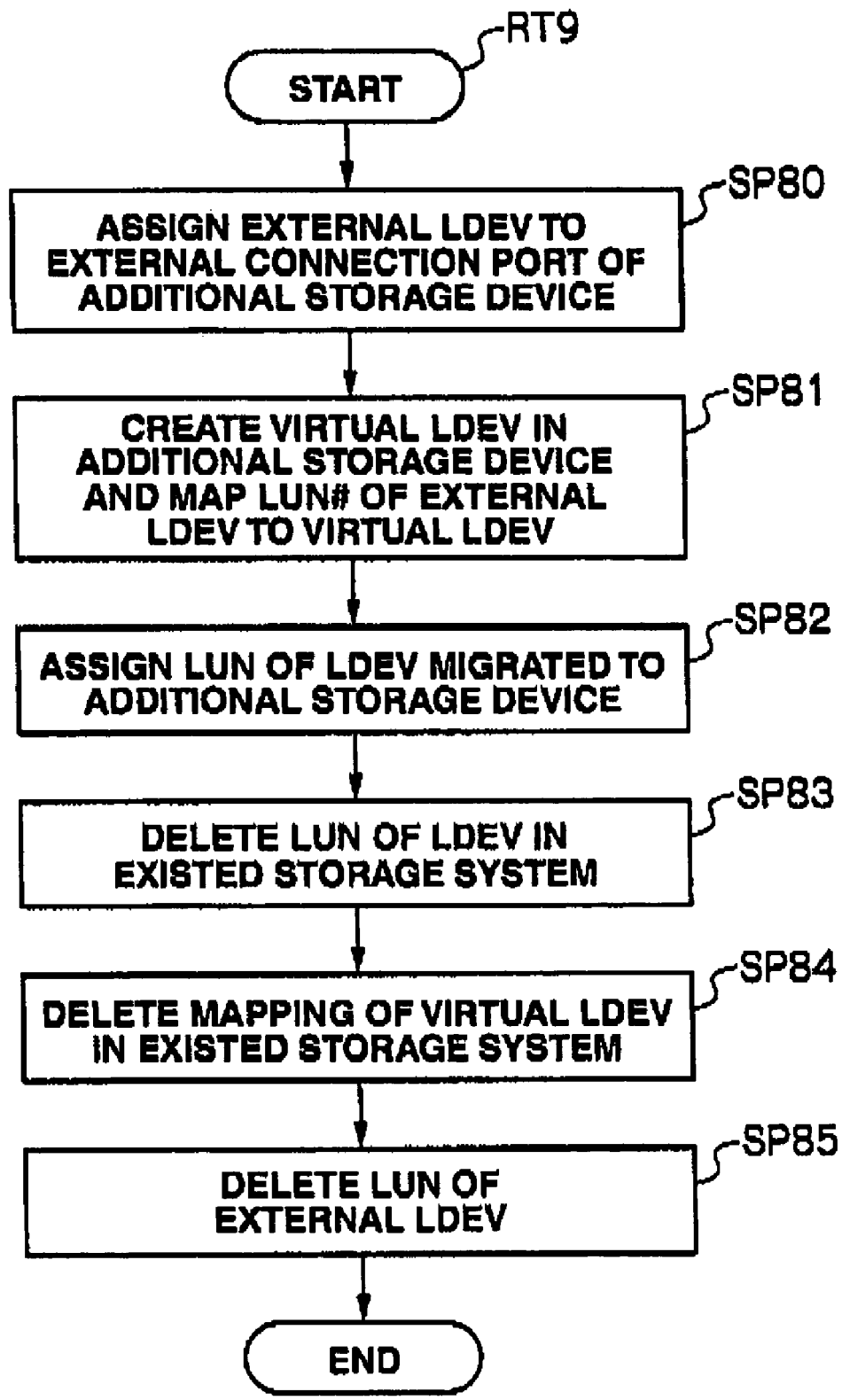
FIG. 29 is a flowchart showing the path switching processing sequence.

Meanwhile, FIG. 29 is a flowchart showing the specific processing contents of the CPU 80 in relation to the path switching processing described above with reference to step SP47 of the first data migration processing (FIG. 25). The CPU 80 executes the foregoing path switching processing according to the path switching processing sequence RT9 shown in FIG. 29.

In other words, when the CPU 80 proceeds to step SP47 of the first LDEV migration processing sequence RT5, it starts the path switching processing sequence RT9, and foremost transmits an "assignLUN" command (c.f. FIG. 19) to the external storage device 47 (FIG. 13) (SP80). This "assignLUN" command is a command for instructing the destination of the command to assign the LDEV of the designated LDEV number to the assignment destination designated via the designated port, and includes the LDEV number, port address of the destination of the command to be assigned to the assignment destination, and the port address of the assignment destination as arguments.

As a result, when the external storage device 47 receives this "assignLUN" command, it assigns the external LDEV 52 of the designated LDEV number to the designated external connection port 43B (FIG. 13) of the additional storage device 43 via the designated port 47A (FIG. 13). Thereby, the additional storage device 43 will be able to access the external LDEV 52. Further, the external storage device 47 notifies the LUN number of this external LDEV 52 to the management server 44 via the LAN 48.

Next, the CPU 80 transmits a "createMapping" command to the additional storage device (SP81). Here, the CPU 80 designates the entry information (LDEV number, capacity, port address and LUN of the external storage device) registered in the LDEV management table 85 of the internal LDEV 62 and virtual LDEV 53 subject to data migration in the existed storage system 42 as arguments.

When the additional storage device 43 receives this "createmapping" command, it creates a virtual LDEV 76 (this is hereinafter referred to as a "migration destination LDEV") having the designated LDEV number and designated capacity (same capacity as the internal LDEV 62 or virtual LDEV 53 subject to data migration (this is hereinafter referred to as a "migration source LDEV"), and respectively stores the LDEV number and capacity of the migration destination LDEV, port address of the external connection port 42B (FIG. 13), port address of the external storage device acquires at step SP and LUN number of the corresponding external LDEV 52 in the corresponding columns of the LDEV management table 85. Thereby, the newly created migration destination virtual LDEV is registered in the LDEV management table 85, and, simultaneously therewith, the external LDEV 52 is mapped to the migration destination virtual LDEV.

Thereafter, the CPU 80 transmits an "assignLUN" command to the additional storage device 43. As a result, the additional storage device 43 assigns the LUN number of the migration destination virtual LDEV to the port (HBA 50) of the designated host system 41 via the designated port 43A. Further, the additional storage device 43 stores this LUN number in the LUN column 94 of the internal (virtual) LDEV field 90 (FIG. 16) in an entry corresponding to the migration destination virtual LDEV in the LDEV management table 85 (SP82). Thereby, the host system 41 will be able to access the migration destination virtual LDEV.

Next, the CPU 80 transmits a deleteLUN" command (c.f. FIG. 19) targeting the migration source virtual volume to the existed storage system 42. When the existed storage system 42 receives this "deleteLUN" command, it delete the association between the external LDEV 52 and migration source virtual LDEV by deleting the LUN stored in the LUN column 94 of the internal (virtual) LDEV field 90 in an entry corresponding to the migration source virtual LDEV among the entries registered in the LDEV management table 85. As a result, the external LDEV 52 will become inaccessible via the existed storage system 43.

Thereafter, the CPU 80 transmits a "deletemapping" command to the existed storage system 42. And, the existed storage system 42 deletes the association between the external LDEV 52 and migration source virtual LDEV by erasing the data stored in the port address column 96 (FIG. 16) and LUN column 97 (FIG. 16) of the external LDEV field 91 (FIG. 16) in an entry corresponding to the migration source virtual LDEV in the LDEV management table 85 based on this "deleteMapping" command, and thereafter deletes the migration source virtual LDEV by erasing the entry corresponding to the migration source virtual LDEV in the LDEV management table 85.

Incidentally, in the foregoing case, the LUN number of the external LDEV 52 in which the mapping was deleted, port address of the port 47A (FIG. 13) of the external storage device 47, and port address of the external connection port 42B (FIG. 13) in the existed storage system 42 will still be retained by the load balancing software 84 (FIG. 13).

Next, the CPU 80 transmits a "deleteLUN" command for designating the LUN number of the external LDEV 52, port address of the port 47A of the external storage device 47, and port address of the external connection port 42B to the external storage device 47. And, when the external storage device 47 receives this "deleteLUN" command, it deletes the assignment of the external LDEV 52 to the existed storage system 42 according to this "deleteLUN" command.

(2-2-5) Processing at Step SP31 of First Load Balancing Processing Sequence RT4

Next, the processing of migrating the copy pair in which the primary volume and secondary volume are both mapped to the external LDEV 52 (FIG. 13) and in which the pair status is "pair" to the additional storage device 43 to be performed at step SP31 of the first load balancing processing sequence RT4 (FIG. 24) is explained. This migration processing is performed according to the second LDEV migration processing sequence RT10 shown in FIG. 30 based on the load balancing software 84 (FIG. 13).

Figure 30:
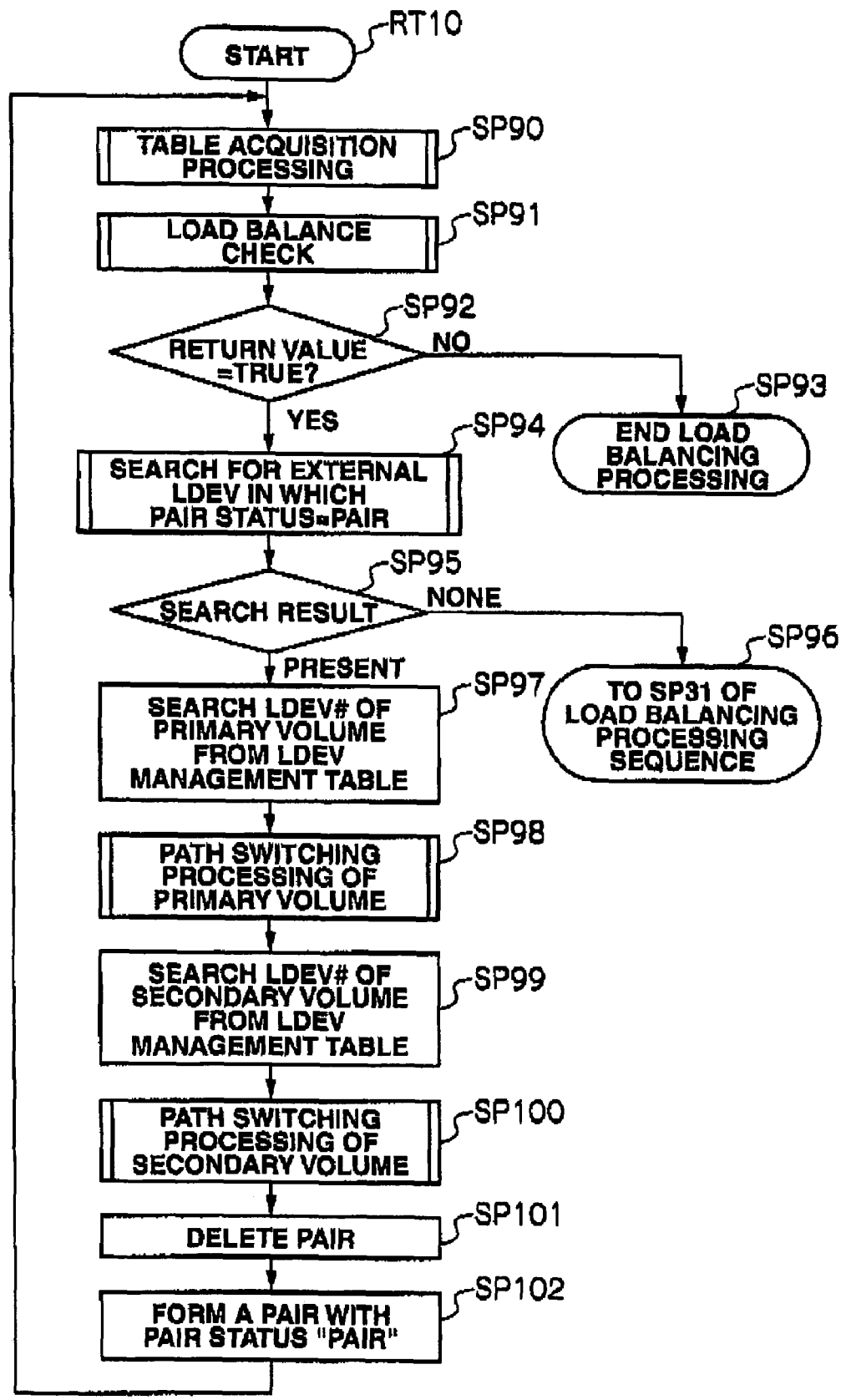
FIG. 30 is a flowchart showing the second LDEV migration processing.

In other words, when the CPU 80 of the management server 44 proceeds to step SP31 of the first load balancing processing sequence RT4 described above with reference to FIG. 24, it starts the second LDEV migration processing sequence RT10 shown in FIG. 30, and foremost acquires the LDEV management table 85 and pair management table 7 of the existed storage system 42 and additional storage device 43 according to the table acquisition processing sequence RT6 described above with reference to FIG. 26 (SP90).

Next, the CPU 80 checks the current load balance between the existed storage system 42 and additional storage device 43 according to the load balance check processing sequence RT7 described above with reference to FIG. 27 (SP91). As a result, when the load of the existed storage system 42 is smaller than the load of the additional storage device 43 (SP92: NO), the CPU 80 ends this load balancing processing (SP93).

Meanwhile, when the load of the existed storage system 42 is greater than the load of the additional storage device 43 (SP92: YES), the CPU 80 searches for the copy pair in which the primary volume and secondary volume are both mapped to the external LDEV 52 in the external storage device 47 and in which the pair status is "pair" based on the LDEV management table 85 and pair management table 7 of the existed storage system 42 acquired at step SP90 (SP94).

When the CPU 80 does not detect a copy pair satisfying the foregoing conditions as a result of the foregoing search (SP95: NO), it proceeds to step SP32 of the first load balancing processing sequence RT4 (FIG. 24) (SP96), and, contrarily, when the CPU 80 detects a copy pair satisfying the foregoing conditions (SP95: YES), it searches for a LDEV number of the primary volume configuring this copy pair from the LDEV management table 85 of the existed storage system 42 (SP97).

And, the CPU 80 thereafter migrates the primary volume of the copy pair detected at step SP94 to the additional storage device 43 according to the path switching processing sequence RT9 described above with reference to FIG. 29 based on the foregoing search result (SP98).

Further, the CPU 80 searches for a LDEV number of the secondary volume configuring the copy pair detected at step SP94 from the LDEV management table 85 of the existed storage system 42 (SP99), and thereafter migrates the secondary volume to the additional storage device 43 according to the path switching processing sequence RT9 described above with reference to FIG. 29 based on the foregoing search result (SP100).

Next, the CPU 80 transmits a "deletepair" command to the existed storage system 42, and deletes the copy pair from the existed storage system 42 by deleting the entry of the pair number corresponding to the copy pair detected at step SP94 registered in the pair management table 7 of the existed storage system 42 (SP101).

Further, the CPU 80 thereafter transmits a "createpair" command for making the pair status of the copy pair to be created "pair"; that is, it transmits a "createpair -pair" to the additional storage device 43, and sets "pair" as the pair status of the copy pair migrated to the additional storage device 43, and sets "0" as the value of all bits of the differential bit information 6 of the copy pair (SP102). Thereby, since the pair status differential bit information that is the same as the pair status and differential bit information 6 of the copy pair set in the existed storage system 42 before being migrated to the additional storage device 43 will be set in the additional storage device 43, the copy status of the copy pair before migration will be consequently succeed by the additional storage device 43 together with the migration of the copy pair.

And, the CPU 80 thereafter repeats the same processing steps (SP90 to SP102), and thereby sequentially migrates the copy pairs in which the primary volume and secondary volume are both mapped to the external LDEV 52 and the pair status is "pair" to the additional storage device 43.

Figure 31:
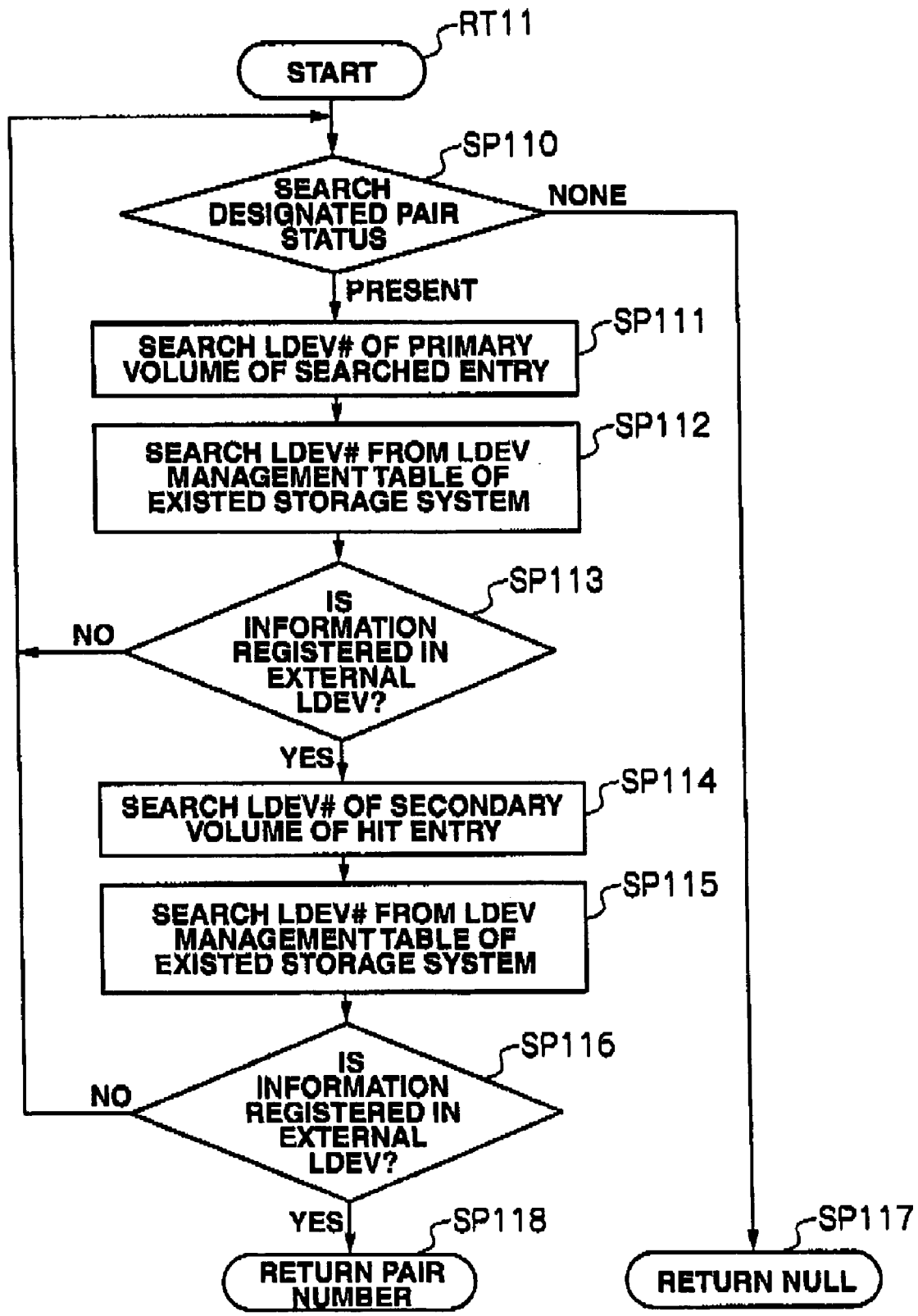
FIG. 31 is a flowchart showing the first copy pair search processing sequence.

Here, FIG. 31 is a flowchart showing the processing contents for searching the copy pair in which the primary volume and secondary volume are both mapped to the external LDEV 52 and the pair status is "pair" described with reference to step SP94 of the second data migration processing sequence RT10 (FIG. 30).

When the CPU 80 proceeds to step SP94 of the second LDEV migration processing sequence RT10, it starts the first copy pair search processing sequence RT11 shown in FIG. 31, and foremost searches an entry of the copy pair of the designated pair status ("pair") from the pair status column 103 (FIG. 17) in the pair management table 7 of the existed storage system 42 (SP110).

And, when the CPU 80 is not able detect an entry of the designated pair status as a result of the foregoing search (SP110: None), it returns to the second LDEV migration processing sequence RT10 (SP117), and thereafter proceeds to step SP32 of the first load balancing processing sequence RT4 via step SP95 of the second LDEV migration processing sequence RT10.

Meanwhile, when the CPU 80 is able to an entry of the designated pair status as a result of the foregoing search (SP110: Present), it acquires the LDEV number of the primary volume of the detected entry from the pair management table 7 of the existed storage system 42 (SP111), and thereafter searches for an entry storing the LDEV number acquired at step SP111 from the LDEV number stored in the respective LDEV number columns 92 (FIG. 16) of the internal (virtual) LDEV field 90 (FIG. 16) in the LDEV management table 85 (FIG. 16) of the existed storage system 42 (SP112).

And, when the CPU 80 detects this entry, it confirms whether or not the corresponding port address and the LUN of the external LDEV 52 are stored in the port address column 96 (FIG. 16) and LUN column 97 (FIG. 16) of the external LDEV field 91 (FIG. 16) of the entry; that is, whether the external LDEV 52 is mapped to the virtual LDEV 53 in the existed storage system 42 corresponding to such entry (SP113).

And, when the CPU 80 obtains a negative result in the confirmation at step SP113 (SP113: NO), it returns to step SP110, and, contrarily, when the CPU 80 obtains a positive result (SP113: YES), it acquires the LDEV number of the secondary volume of the entry detected at step SP110 from the pair management table 7 of the existed storage system 42 (SP114).

Further, the CPU 80 thereafter searches for an entry storing the LDEV number acquired at step SP114 from the LDEV number column 92 (FIG. 16) of the internal (virtual) LDEV field 90 (FIG. 16) in the LDEV management table 85 of the existed storage system 42 (SP115).

Further, when the CPU 80 detects a corresponding entry as a result of the search at step SP115, it confirms whether the corresponding port address and LUN of the external LDEV 52 are stored in the port address column 96 (FIG. 16) and LUN column 97 (FIG. 16) in the external LDEV field 91 (FIG. 16) of the entry; that is, whether the external LDEV 52 is mapped to the LDEV in the existed storage system 42 corresponding to this entry (SP116).

And, when the CPU 80 obtains a negative result in the confirmation at step SP116 (SP116: NO), it returns to step SP110, and, contrarily, when the CPU 80 obtains a positive result (SP116: YES), it returns to the second LDEV migration processing sequence RT10 (SP118), and thereafter proceeds to step SP97 of the second LDEV migration processing sequence RT10.

(2-2-6) Processing at Step SP32 of First Load Balancing Processing Sequence RT4

Next, the processing of migrating the copy pair in which the primary volume and secondary volume are both mapped to the external LDEV 52 and in which the pair status is "copy" to the additional storage device 43 to be performed at step SP32 of the first load balancing processing sequence RT4 (FIG. 24) is explained. This migration processing is performed according to the third LDEV migration processing sequence RT12 shown in FIG. 32 based on the load balancing software 84 (FIG. 13).

Figure 32:
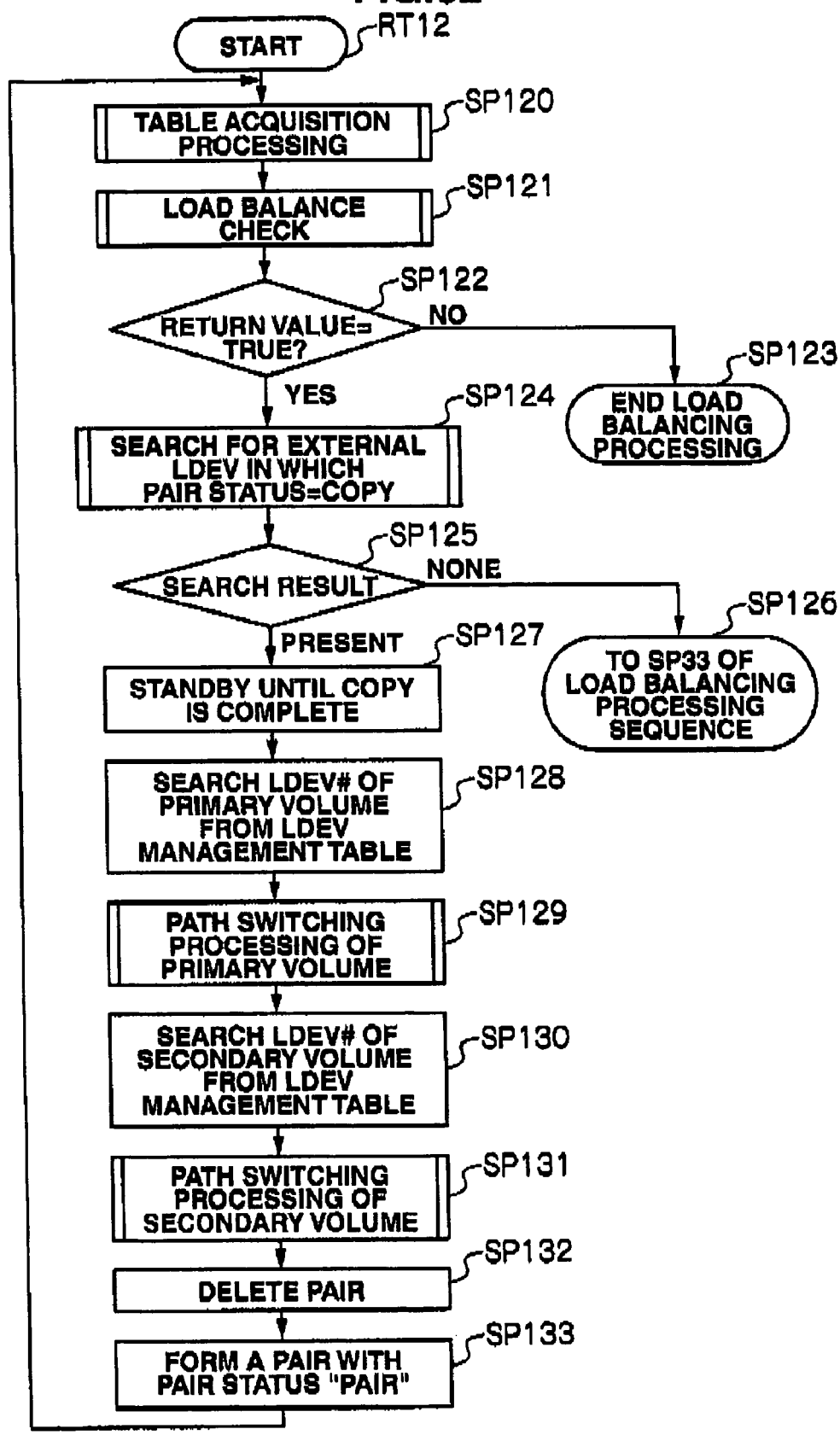
FIG. 32 is a flowchart showing the third LDEV migration processing sequence.

In other words, when the CPU 80 of the management server 44 proceeds to step SP32 of the first load balancing processing sequence RT4 described above with reference to FIG. 24, it starts the third LDEV migration processing sequence RT12 shown in FIG. 32, and foremost acquires the LDEV management table 85 and pair management table 7 of the existed storage system 42 and additional storage device 43 according to the table acquisition processing sequence RT6 described above with reference to FIG. 26 (SP120).

Next, the CPU 80 checks the current load balance between the existed storage system 42 and additional storage device 43 according to the load balance check processing sequence RT7 described above with reference to FIG. 27 (SP121). As a result, when the load of the existed storage system 42 is smaller than the load of the additional storage device 43 (SP122: NO), the CPU 80 ends this load balancing processing (SP123).

Meanwhile, when the load of the existed storage system 42 is greater than the load of the additional storage device 43 (SP92: YES), the CPU 80 searches for the copy pair in which the primary volume and secondary volume are both mapped to the external LDEV 52 in the external storage device 47 and in which the pair status is "copy" based on the LDEV management table 85 and pair management table 7 of the existed storage system 42 acquired at step SP120 (SP124). Incidentally, the processing at step SP124 may be performed according to the first copy pair search processing sequence RT11 in which the designated pair status at step SP110 of the first copy pair search processing sequence RT11 described above with reference to FIG. 31 is "copy".

When the CPU 80 does not detect a copy pair satisfying the foregoing conditions as a result of the foregoing search (SP125: NO), it proceeds to step SP33 of the first load balancing processing sequence RT4 (SP126), and, contrarily, when the CPU 80 detects a copy pair satisfying the foregoing conditions (SP125: YES), it stands by until the copy processing of this copy pair is complete. Specifically, the CPU 80 issues a "getLdevTable" command periodically (e.g. once per minute) to the existed storage system 42 until the pair status of this copy pair becomes "pair", and repeats the processing for confirming the pair status of the copy pair.

And, when the pair status of the copy pair eventually becomes "pair", the CPU 80 executes the processing of step SP128 to SP133 as with the processing of step SP97 to SP102 of the second LDEV migration processing sequence RT10 described above with reference to FIG. 30, and thereby migrates such copy pair to the additional storage device 43, and makes the copy pair migrated to the additional storage device 43 succeed the management information (pair status and differential bit information 6) of the copy pair.

And, the CPU 80 thereafter repeats the same processing steps (SP120 to SP133), and thereby sequentially migrates the copy pairs in which the primary volume and secondary volume are both mapped to the external LDEV 52 and the pair status is "copy" to the additional storage device 43.

Incidentally, although the foregoing description explained a case where the CPU 80 stood by until the copy processing of the copy pair was completed (SP127), and thereafter switch paths to form a copy pair where the pair status is "pair" (SP128 to SP133), the CPU 80 may also discontinue the copy processing being performed without waiting for the copy processing of the copy pair to be completed, switching the path of the primary volume and secondary volume, and thereafter (after executing the processing at step SP128 to SP131) adding an entry to the pair management table 85 of the additional storage device 43, and set "1" to all bits of the corresponding differential bit information 6 in order to implement copying (making the pair status "copy").

(2-2-7) Processing at Step SP33 of First Load Balancing Processing Sequence RT4

Next, the processing of migrating the copy pair in which the primary volume and secondary volume are both mapped to the external LDEV 52 (FIG. 13) and in which the pair status is "split" to the additional storage device 43 to be performed at step SP33 of the first load balancing processing sequence RT4 (FIG. 24) is explained. This migration processing is performed according to the fourth LDEV migration processing sequence RT13 shown in FIG. 33 based on the load balancing software 84 (FIG. 13).

Figure 33:
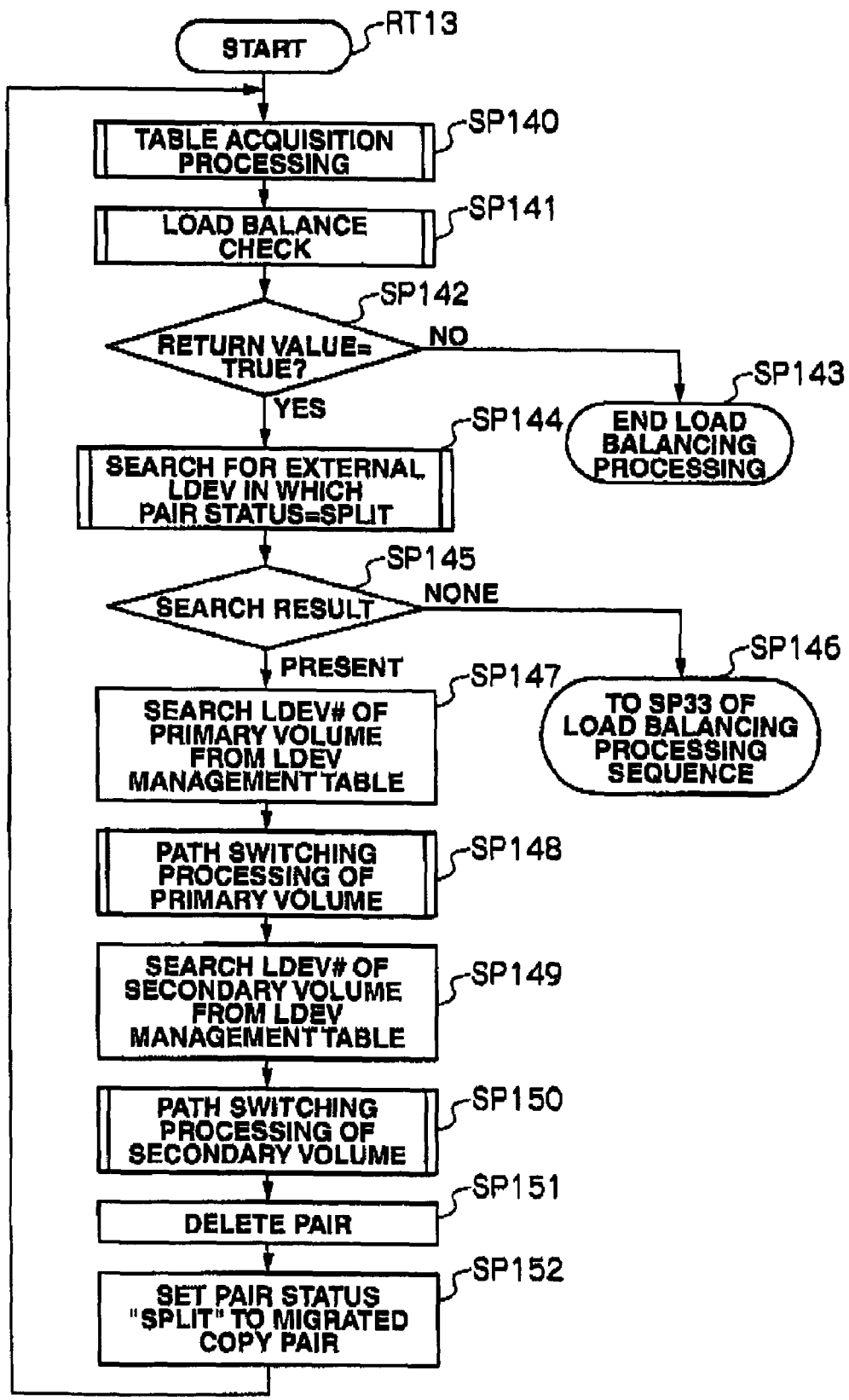
FIG. 33 is a flowchart showing the fourth LDEV migration processing sequence.

In other words, when the CPU 80 of the management server 44 proceeds to step SP33 of the first load balancing processing sequence RT4 described above with reference to FIG. 24, it starts the fourth LDEV migration processing sequence RT13 shown in FIG. 33, and foremost acquires the LDEV management table 85 and pair management table 7 of the existed storage system 42 and additional storage device 43 according to the table acquisition processing sequence RT6 described above with reference to FIG. 26 (SP140).

Next, the CPU 80 checks the current load balance between the existed storage system 42 and additional storage device 43 according to the load balance check processing sequence RT7 described above with reference to FIG. 27 (SP141). As a result, when the load of the existed storage system 42 is smaller than the load of the additional storage device 43 (SP142: NO), the CPU 80 ends this load balancing processing (SP143).

Meanwhile, when the load of the existed storage system 42 is greater than the load of the additional storage device 43 (SP142: YES), the CPU 80 searches for the copy pair in which the primary volume and secondary volume are both mapped to the external LDEV 52 in the external storage device 47 and in which the pair status is "split" based on the LDEV management table 85 and pair management table 7 of the existed storage system 42 acquired at step SP140 (SP144).

When the CPU 80 does not detect a copy pair satisfying the foregoing conditions as a result of the foregoing search (SP145: NO), it proceeds to step SP34 of the first load balancing processing sequence RT4 (FIG. 24) (SP146), and, contrarily, when the CPU 80 detects a copy pair satisfying the foregoing conditions (SP145: YES), it thereafter executes the processing of step SP146 to SP150 as with the processing of step SP97 to SP101 of the second LDEV migration processing sequence RT10 described above with reference to FIG. 30, and thereby migrates the copy pair and the management information (pair status, etc.) thereof to the additional storage device 43.

Further, the CPU 80 thereafter transmits a "createpair" command for making the pair status of the copy pair to be created "split"; that is, it transmits a "createpair-split" to the additional storage device 43, and sets "split" as the pair status of the copy pair migrated to the additional storage device 43, and sets "1" as the value of all bits of the differential bit information 6 of the copy pair (SP151). Thereby, the pair status that is the same as the pair status of the copy pair set in the existed storage system 42 before being migrated to the additional storage device 43 will be set in the additional storage device 43. Further, although the differential bit information 6 storing the difference location of the primary volume and secondary volume before the copy pair was migrated to the additional storage device 43 exists in the existed storage system 42, since "1" is set to all bits of the differential bit information 6 of the additional storage device 43, even if there is no differential bit information 6 before the migration (even if the differential bit information is not succeeded by the additional storage device 43), loss of data in the logical device will not occur when synchronizing the copy pair ("resyn" command, etc.) after migrating such copy pair to the additional storage device 43.

And, the CPU 80 thereafter repeats the same processing steps (SP140 to SP151), and thereby sequentially migrates the copy pairs in which the primary volume and secondary volume are both mapped to the external LDEV 52 and the pair status is "split" to the additional storage device 43.

(2-2-8) Processing at Step SP34 of First Load Balancing Processing Sequence RT4

Next, the processing performed at step SP34 of the first load balancing processing sequence RT4 (FIG. 24) is explained. At step SP34, an internal mirror copy pair is formed, and processing for migrating a copy pair in which the primary volume is an internal LDEV 62 and the secondary volume is a virtual LDEV 53 mapped to the external LDEV 52 to the additional storage device 43 is explained. And, this migration processing is performed according to the fifth LDEV migration processing sequence RT14 shown in FIG. 35 based on the load balancing software 84 (FIG. 13).

Figure 34:
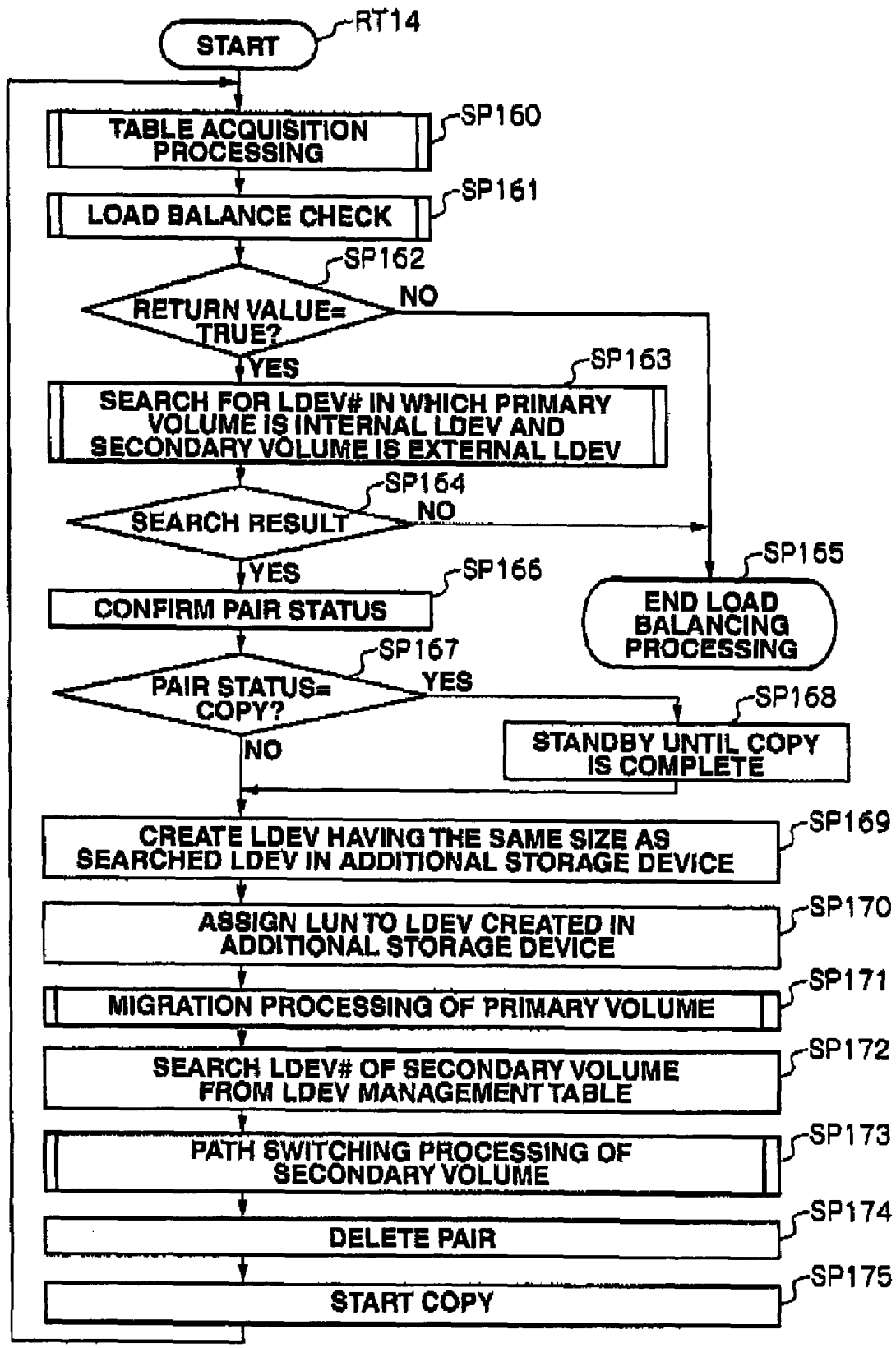
FIG. 34 is a flowchart showing the fifth LDEV migration processing sequence.

In other words, when the CPU 80 of the management server 44 proceeds to step SP34 of the first load balancing processing sequence RT4 described above with reference to FIG. 24, it starts the fifth LDEV migration processing sequence RT14 shown in FIG. 34, and foremost acquires the LDEV management table 85 and pair management table 7 of the existed storage system 42 and additional storage device 43 according to the table acquisition processing sequence RT6 described above with reference to FIG. 26 (SP160).

Next, the CPU 80 checks the current load balance between the existed storage system 42 and additional storage device 43 according to the load balance check processing sequence RT7 described above with reference to FIG. 27 (SP161). As a result, when the load of the existed storage system 42 is smaller than the load of the additional storage device 43 (SP162: NO), the CPU 80 ends this load balancing processing (SP163).

Meanwhile, when the load of the existed storage system 42 is greater than the load of the additional storage device 43 (SP162: YES), the CPU 80 searches for the copy pair which is a virtual LDEV 53 formed in an internal mirror copy pair and in which the primary volume is an internal LDEV 62 and the secondary volume is a virtual LDEV 53 mapped to the external LDEV 52 (SP163).

When the CPU 80 does not detect a copy pair satisfying the foregoing conditions as a result of the foregoing search (SP164: NO), it end this load balancing processing (SP165), and, contrarily, when the CPU 80 detects a copy pair satisfying the foregoing conditions (SP164: YES), it searches the LDEV management table 85 of the existed storage system 42 and confirms the current pair status ("pair", "copy" or "split") of the copy pair (SP166).

The CPU 80 proceeds to step SP169 when the pair status of the copy pair is not "copy" (SP167: NO), and, contrarily, when the pair status of the copy pair is "copy" (SP167: YES), it stands by until the copy processing of the copy pair is complete (SP168). Specifically, as with step SP127 of the third LDEV migration processing sequence RT12 described with reference to FIG. 32, the CPU 80 issues a "getLdevTable" command periodically (e.g. once per minute) to the existed storage system 42 until the pair status of this copy pair becomes "pair", and repeats the processing for confirming the pair status of the copy pair.

And, when the copy processing of the copy pair is eventually completed and the pair status of the copy pair becomes "pair", the CPU 80 creates an internal LDEV 77 (FIG. 13) having the same capacity as the primary volume of the copy pair detected at step SP163 in the additional storage device 43 by issuing a "createLdev" command to the additional storage device 43 (SP170).

Further, the CPU 80 assigns the internal LDEV 77 created in the additional storage device 43 at step SP169 to the host system 41 (FIG. 13) by issuing an "assignLUN" command to the additional storage device 43. As a result of this processing, the host system 41 will be able to access the internal LDEV 77.

Thereafter, the CPU 80 uses a SCSI (Small Computer System Interface) command or the like and copies the data of the primary volume in the existed storage system 42 in block units to the internal LDEV 77 in the additional storage device 43 created at step SP169 (SP171).

Further, the CPU 80 migrates the secondary volume to the additional storage device 43 and thereafter deletes the copy pair detected at step SP163 from the existed storage system 42 by executing the same processing as step SP99 to step SP101 of the second LDEV migration processing sequence RT10 of FIG. 30 (SP172 to SP174).

Further, the CPU 80 thereafter creates a copy pair formed from a primary volume migrated to the additional storage device 43 with the processing of step SP169 to step SP172 and a secondary volume migrated to the additional storage device 43 with the processing of step SP172 and step SP173 in the additional storage device 43 by issuing a "createpair -init" to the additional storage device 43. Thereby, the pair status and differential bit information 6 of the copy pair before being migrated to the additional storage device 43 are succeeded by the migrated copy pair (strictly speaking, the same pair status and differential bit information before migration are set), and the data copy between the primary volume and secondary volume is commenced thereafter (SP175).

Figure 35:
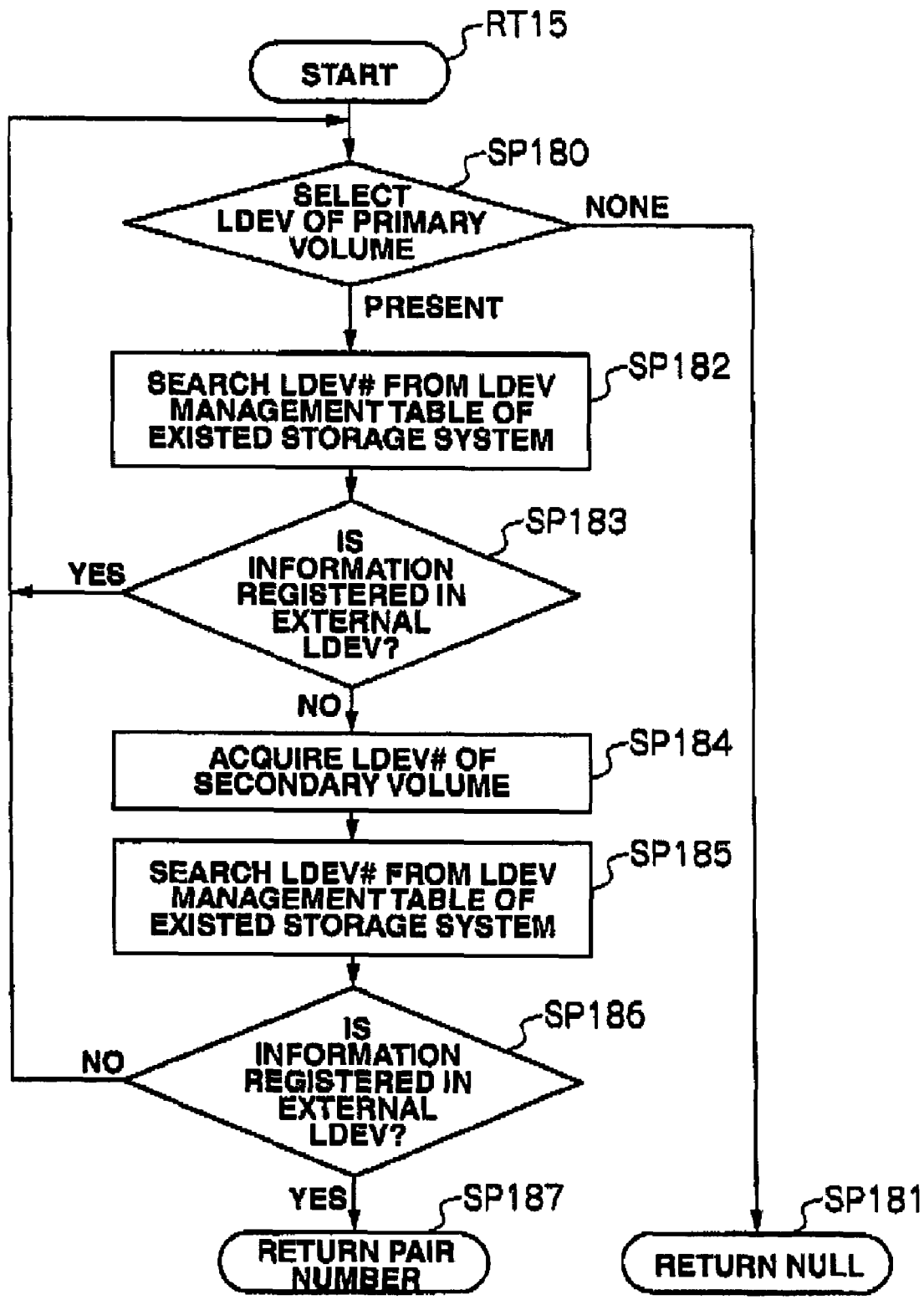
FIG. 35 is a flowchart showing the second copy pair search processing sequence.

Here, FIG. 35 is a flowchart showing the processing contents for searching the copy pair forming an internal mirror copy pair and in which the primary volume is an internal LDEV 62 and the secondary volume is an external LDEV 52 mapped to the virtual LDEV 53 as described with reference to step SP163 of the fifth LDEV migration processing sequence RT14 (FIG. 34).

When the CPU 80 proceeds to step SP163 of the fifth LDEV migration processing sequence RT14, it starts the second copy pair search processing sequence RT15 shown in FIG. 35, and foremost selects one primary volume from the primary volume LDEV number column 101 (FIG. 17) in the pair management table 7 of the existed storage system 42 (SP180).

And, when the CPU 80 is not able to select a primary volume; that is, when a copy pair is not registered in the pair management table 7 of the existed storage system 42 (SP180: None), it returns to the fifth LDEV migration processing sequence RT14 described with reference to FIG. 34 (SP181), and thereafter proceeds to step SP165 via step SP164 of the fifth LDEV migration processing sequence RT14 so as to end this load balancing processing (SP165).

Meanwhile, when the CPU 80 is able to select a LDEV number of a primary volume at step SP180 (SP180: Present), it searches for a LDEV# in the LDEV management table 85 (FIG. 16) of the existed storage system 42, and detects the entry of the LDEV number of such selected primary volume (SP182).

Next, the CPU 80 confirms whether the corresponding port address and LUN of the external LDEV 52 are stored in the port address column 96 (FIG. 16) and LUN column 97 (FIG. 16) of the external LDEV field 91 (FIG. 16) of the entry detected at step SP182 in the LDEV management table 85 of the existed storage. system 42; that is, whether the external LDEV 52 is mapped to the virtual LDEV 53 in the existed storage system 42 corresponding to such entry (SP183).

And, when the CPU 80 obtains a positive result in the foregoing confirmation (SP183: YES), it returns to step SP180, and, contrarily, when the CPU 80 obtains a negative result (SP183: NO), it acquires the LDEV number of the secondary volume of the copy pair that selected the LDEV number of the primary volume at step SP181 from the pair management table 7 (FIG. 15) of the existed storage system 42 (SP184).

Next, the CPU 80 searches for the LDEV# in the LDEV management table 85 (FIG. 16) of the existed storage system 42, and detects the entry of the LDEV number of the secondary volume acquired at step SP184 (SP185).

Further, the CPU 80 thereafter confirms whether the corresponding port address and LUN of the external LDEV 52 are stored in the port address column 96 (FIG. 16) and LUN column 97 (FIG. 16) in the external LDEV field 91 (FIG. 16) of the entry detected at step SP185 in the LDEV management table 85 of the existed storage system 42; that is, whether the external LDEV 52 is mapped to the virtual LDEV 62 in the existed storage system 42 corresponding to such entry (SP186).

And, when the CPU 80 obtains a negative result in the foregoing confirmation (SP186: NO), it returns to step SP180, and, contrarily, when the CPU 80 obtains a positive result (SP186: YES), it returns to the fifth LDEV migration processing sequence RT14 described above with reference to FIG. 34 (SP187), and thereafter proceeds to step SP166 via step SP164 of this fifth LDEV migration processing sequence RT14.

(2-3) Effect of Present Embodiment

In the foregoing configuration, with the storage system 40 of this embodiment, the management server 44 periodically detects the respective loads of the existed storage system 42 and additional storage device 43, and preferentially migrates the internal LDEV 62 or virtual LDEV 53 in which a copy pair is not formed in the existed storage system 42 to the additional storage device 43 when the load of the existed storage system 42 is greater than the load of the additional storage device 43. Thus, if the load balancing processing of the existed storage system 43 can be ended at this stage, the load balancing processing of the existed storage system 42 can be performed regardless of the current status of the copy pair set in the existed storage system 42.

Meanwhile, if it is not possible to end the load balancing processing of the existed storage system 42 at this stage, the storage system 40 migrates the virtual LDEVs 53 to the additional storage device 43 by switching the paths of the respective virtual LDEVs 53 forming the copy pair of the primary volume and secondary volume set in the existed storage system 42 based on the control of the management server 44. Further, the management server 44 thereafter issues a "createpair" command, with an argument ("-init", "-pair" or "-split") according to the pair status before the migration of the primary volume and secondary volume added thereto, to the additional storage device 43 based on the LDEV management table 85 and pair management table 7 read from the existed storage system 42, and the additional storage device 43 sets the pair status and differential bit information 6 of the migrated primary volume and secondary volume according to this "createpair" command as the same pair status and differential bit information of the corresponding primary volume and secondary volume before migration.

Accordingly, with this storage system 40, even when migrating the primary volume and secondary volume, which are respectively mapped to the external LDEV 52 of the external storage device 47 based on the external connection function and subject to internal mirror copying based on the internal mirror copying function, to the additional storage device 43, the pair status and differential bit information 6 of such copy pair can be set to be the same as before the migration, or the current status of the copy pair can be set in the additional storage device 43 so that there will no difference with the data before migration caused by performing the data migration of such copy pair, and load balancing will also be enabled in the foregoing cases.

(3) Second Embodiment (3-1) Outline of Load Balancing Processing According to Second Embodiment In the load balancing processing according to the first load balancing processing sequence RT4 described above with reference to FIG. 24, upon migrating the copy pair in which the pair status is "copy" at step SP32 to the additional storage device 43, time will be wasted since there is a standby period (step SP127 of FIG. 32) until the copy processing of the copy pair is completed.

Further, with the load balancing processing according to the first load balancing processing sequence RT4, upon migrating the copy pair in which the pair status is "split" at step SP33 to the additional storage device 43, since the differential bit information 6 (FIG. 18) is not migrated, there is a slight disadvantage in that the copy volume will increase upon resynchronizing the primary volume and secondary volume additional migrated to the storage device 43.

Thus, by collectively processing the copy pair in which the primary volume and secondary volume are both mapped to the external LDEV 52 and the pair status is "copy" or "split", and the copy pair forming an internal mirror copy pair and in which the primary volume is the internal LDEV 62 and the secondary volume is the virtual LDEV 53 mapped to the external LDEV 52 in the same timing without differentiating such copy pairs, the load balancing processing can be expedited in comparison to the load balancing processing according to the first load balancing processing sequence RT4.

(3-2) Configuration of Storage System According to Present Embodiment

Figure 36:
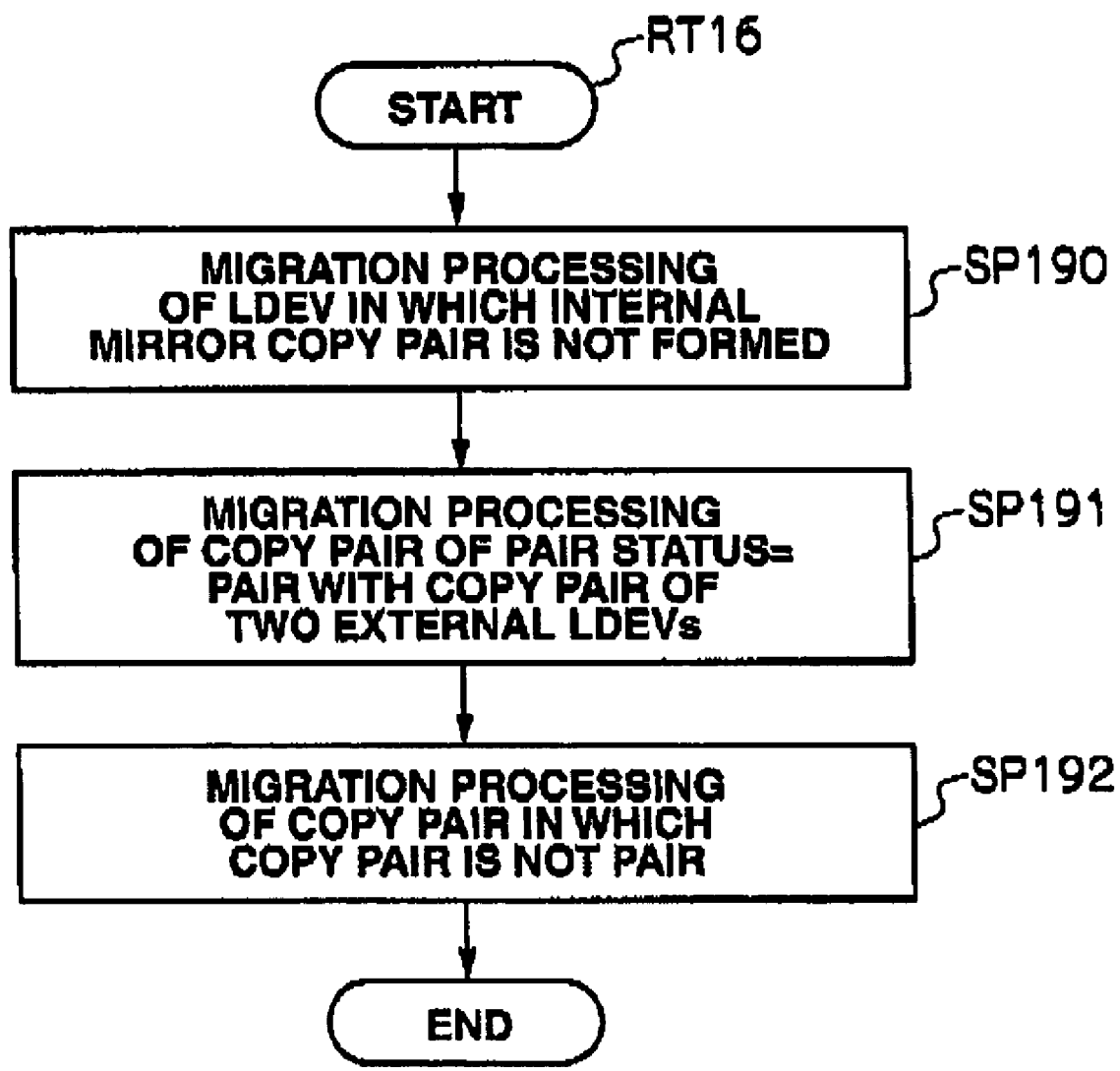
FIG. 36 is a flowchart showing the second load balancing processing sequence.

In FIG. 13, reference numeral 100 represents the overall storage system according to the second embodiment. This storage system 100 is configured the same as the storage system 40 (FIG. 13) according to the first embodiment excluding the point in that the CPU 80 of the management server 101 performs the load balancing processing for balancing the load of the existed storage system 42 with the additional storage device 43 according to the second load balancing processing sequence RT16 shown in FIG. 36 in substitute for the first load balancing processing sequence RT4 described above with reference to FIG. 24 based on the load balancing software 102 stored in the physical storage devices 81.

In actuality, the CPU 80 of the management server 101 periodically executes this second load balancing processing sequence RT16, and, foremost, as with step SP30 of the first load balancing processing sequence RT4 (FIG. 24), migrates the internal LDEV 62 or virtual LDEV 53 in which a copy pair is not formed in the existed storage system 42 to the additional storage device 53 (SP190), and thereafter, as with step SP31 of the first load balancing processing sequence RT4, maps both the primary volume and secondary volume to the external LDEV 52 (FIG. 13), and migrates the copy pair in which the pair status is "pair" to the additional storage device 43 (SP191).

And, the CPU 80 thereafter migrates a copy pair in the existed storage system 42 in which the pair status is not "pair" to the additional storage device 43 (SP192).

Figure 37:
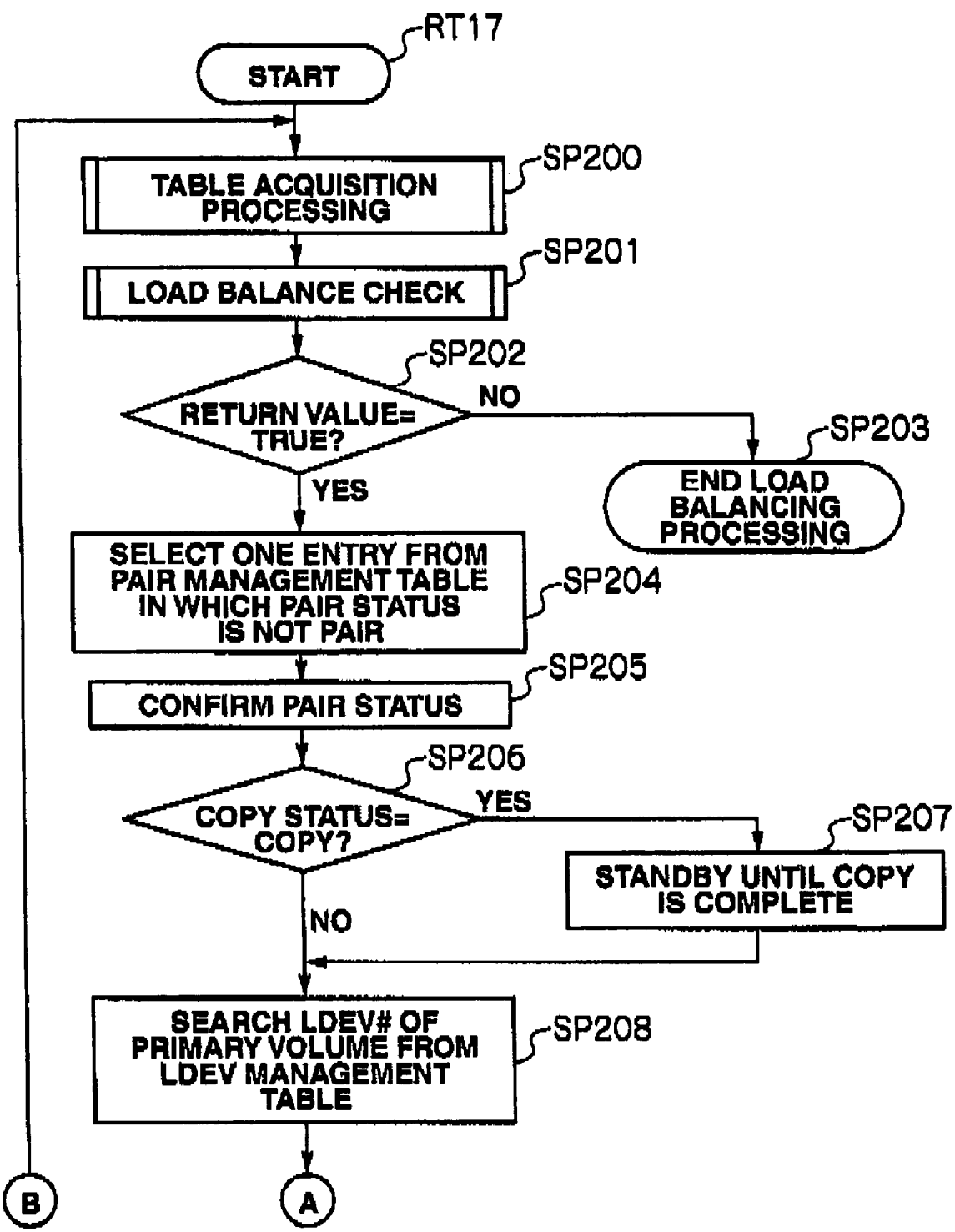
FIG. 37 is a flowchart showing the sixth LDEV migration processing sequence.
Figure 38:
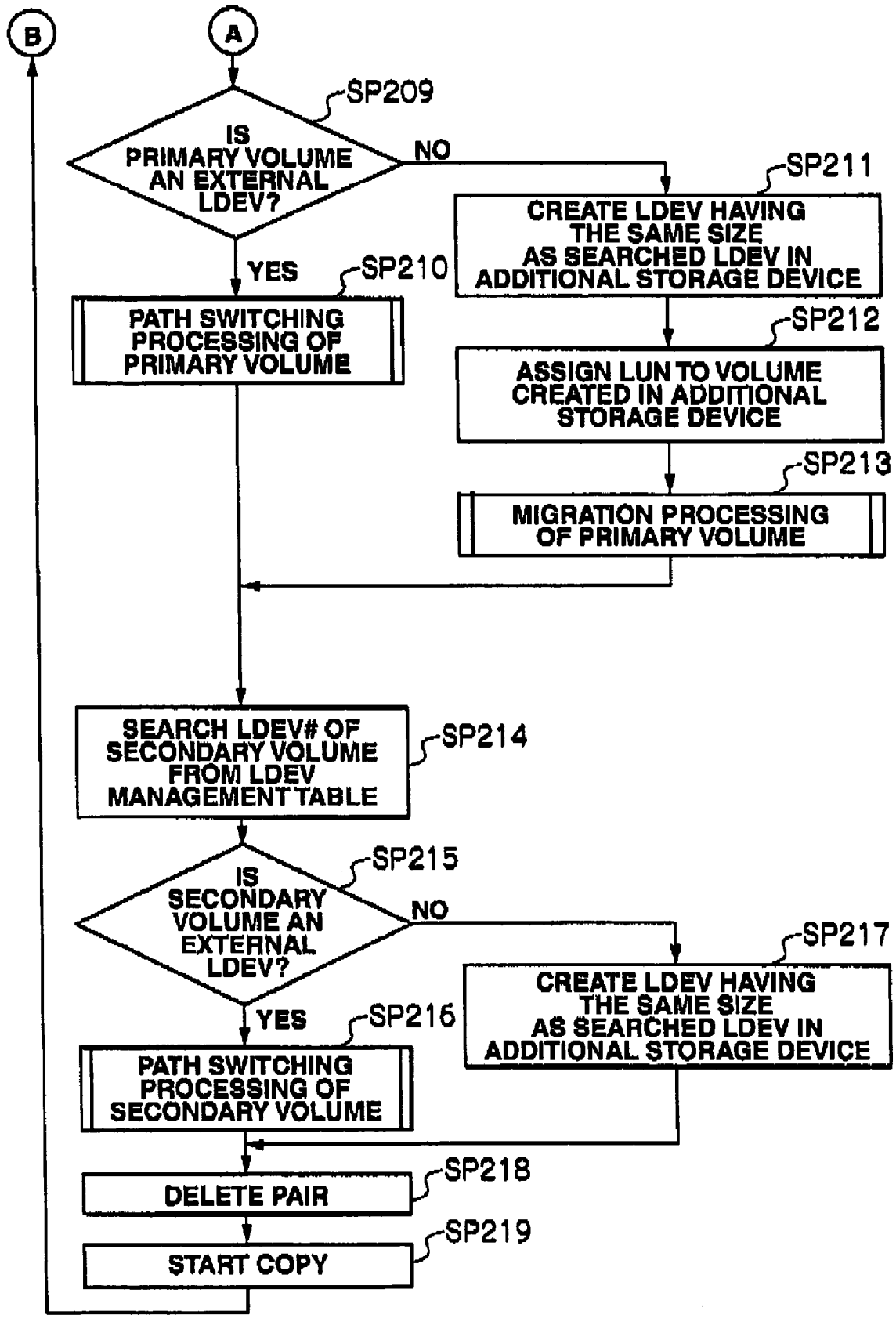
FIG. 38 is a flowchart showing the sixth LDEV migration processing sequence.

FIG. 37 and FIG. 38 are flowcharts showing the specific contents of the migration processing of such a copy pair. The CPU 80, upon proceeding to step SP192 of the second load balancing processing sequence RT16, starts the sixth LDEV migration processing sequence RT17 shown in FIG. 37 and FIG. 38, and foremost acquires the LDEV management table 85 and pair management table 7 of the existed storage system 42 and additional storage device 43 according to the table acquisition processing sequence RT6 described above with reference to FIG. 26 (SP200).

Next, the CPU 80 checks the current load balance between the existed storage system 42 and additional storage device 43 according to the load balance check processing sequence RT7 described above with reference to FIG. 27 (SP201). As a result, if the load of the existed storage system 42 is smaller than the load of the additional storage device 43 (SP202: NO), the CPU 80 ends this load balancing processing (SP203).

Contrarily, if the load of the existed storage system 42 is greater than the load of the additional storage device 43 (SP202: YES), the CPU 80 selects on entry of a copy pair in which the pair status is not "pair" from the pair management table 7 of the existed storage system 42 acquired at step SP200 (SP204).

And, the CPU 80 thereafter confirms the pair status of the copy pair based on this pair management table 7 (SP205), and, when the confirmed pair status is "copy" (SP206: YES), it stands by until the copy processing of this copy pair is completed (SP207).

Meanwhile, when the pair status of the copy pair is not "copy" (SP206: NO), or the pair status of the copy pair is "copy" but the copy processing of such copy pair has been completed, the CPU 80 searches for a LDEV number of the primary volume LDEV forming the copy pair from the LDEV management table 85 of the existed storage system 42 (SP208), and thereafter determines whether the primary volume is the virtual LDEV 53 mapped to the external LDEV 52 based on such search result (SP209).

When the CPU 80 obtains a positive result in this determination (SP209: YES), it executes the processing for migrating this primary volume to the additional storage device 43 according to the path switching processing sequence RT9 described above with reference to FIG. 29 (SP210).

Meanwhile, when the CPU 80 obtains a negative result in the determination at step SP219 (SP209: NO), as with step SP169 to step SP171 of the fifth LDEV migration processing sequence RT14 described above with reference to FIG. 34, it migrates the primary volume to the additional storage device 43 (SP211 to SP213).

Thereafter, the CPU 80 searches for a LDEV number of a secondary volume LDEV forming the copy pair selected at step SP214 from the LDEV management table 85 of the existed storage system 42 (SP214), and determines whether or not the secondary volume is the virtual LDEV 53 mapped to the external LDEV 52 based on this search result (SP215).

When the CPU 80 obtains a positive result in this determination (SP215: YES), it executes processing for migrating this secondary volume to the additional storage device 43 according to the path switching processing sequence RT9 described above with reference to FIG. 29 (SP216).

Meanwhile, when the CPU 80 obtains a negative result in the determination at step SP215 (SP215: NO), it creates a virtual LDEV 76 (FIG. 13) having the same capacity as the secondary volume in the additional storage device 43 by issuing a "createLdev" command to the additional storage device 43 (SP217).

Next, the CPU 80 deletes the entry of the corresponding pair number detected at step SP214 registered in the pair management table 7 of the existed storage system 42 by transmitting a "deletepair" command to the existed storage system 42 (SP218).

Further, the CPU 80 thereafter creates a copy pair formed from a primary volume migrated to the additional storage device 43 with the processing at step SP209 to step SP213 and the secondary volume migrated to the additional storage device 43 with the processing at step SP215 to step SP217 in the additional storage device 43 by issuing a "createpair-nit" command to the additional storage device 43. As a result, the pair status of the copy pair and the differential bit information 6 before migration to the additional storage device 43 can be succeeded by the migrated copy pair, and the data copy between the primary volume and secondary volume is commenced thereafter (SP219).

Further, the CPU 80 thereafter returns to step SP210, and repeats the same processing until the load of the existed storage system 42 becomes smaller than the load of the additional storage device 43 (SP200 to SP219).

According to the load balancing processing according to this kind of second load balancing processing sequence RT16 (FIG. 36), the load balancing processing can be expedited in comparison to the load balancing processing according to the first load balancing processing sequence RT4. As a result, in addition to the effect yielded in the first embodiment, a storage system capable of further expediting the load balancing processing can be realized.

(4) Third Embodiment

In FIG. 13, reference numeral 110 represents the overall storage system according to the third embodiment. This storage system 110 is configured the same as the storage system 40 (FIG. 13) according to the first embodiment excluding the point in that the CPU 80 of the management server 111 performs load balancing processing for balancing the load of the existed storage system 42 with the additional storage device 43 according to the third load balancing processing sequence RT17 in substitute for the first load balancing processing sequence RT4 described above with reference to FIG. 24 based on the load balancing software 112 stored in the physical storage devices 81.

In actuality, the CPU 80 of the management server 101 periodically executes this third load balancing processing sequence RT18, and, as with step SP30 of the first load balancing processing sequence RT4 (FIG. 24), it migrates the internal LDEV 62 or virtual LDEV 53 in which a copy pair is not formed in the existed storage system 42 to the additional storage device 53 (SP220), and thereafter ends this load balancing processing.

According to the load balancing processing of the third embodiment, in comparison to the storage system 110 of the second embodiment, a storage system capable of balancing the load of the existed storage system 42 more expeditiously can be realized.

(5) Fourth Embodiment

Figure 40:
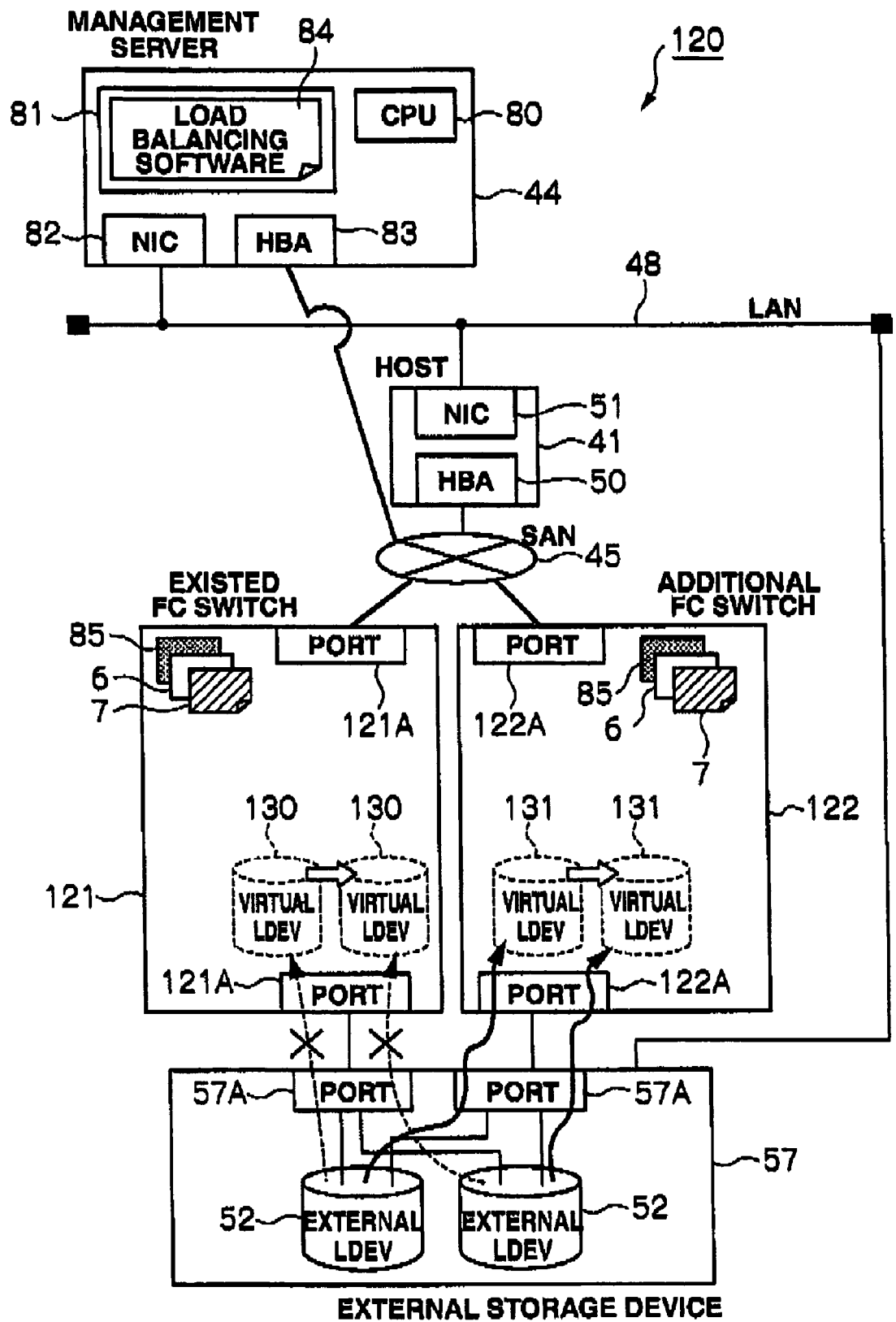
FIG. 40 is a block diagram showing the configuration of the storage system according to the fourth embodiment.

FIG. 40, in which the same reference numerals are given to the same components as those corresponding to FIG. 13, show the storage system 120 according to the fourth embodiment. This storage system 120 is configured the same as the storage system 40 of the first embodiment excluding the point of an installed fibre channel switch 121 and an additional fibre channel switch 122 equipped with the same virtualization function as the internal mirror copying function and external connection function being provided in substitute for the existed storage system 42 and additional storage device 43 of the storage system 40 (FIG. 13) according to the first embodiment, and the point of the external storage device 57 being directly connected to the installed fibre channel switch 121 and additional fibre channel switch 122.

The installed fibre channel switch 121 and additional fibre channel switch 122, as shown in FIG. 41, are respectively configured by having a plurality of ports 121A, 122A retaining a routing table 123, a CPU 124 for controlling the overall operation of the installed fibre channel switch 121 or additional fibre channel switch 122, a memory 125 storing various control programs, and a crossbar switch 126 for connecting these ports 121A, 122A, CPU 124 and memory 125.

The installed fibre channel switch 121 and additional fibre channel switch 122 normally sort the fibre channel packets transmitted from the host system 41 and external storage device 57 by delivering them from the ports 121A, 122A to the corresponding ports 121A, 122A according to the routing table 123 retained in the respective ports 121A, 122A, and, upon executing the virtualization function, virtualize the external LDEV 52 set in the connected external storage device 57.

As a means for achieving the above, the installed fibre channel switch 121 and additional fibre channel switch 122 have a function as a SCSI target for creating the virtual LDEVs 130, 131 and providing these to the host system 41, and an initiator function for re-issuing a data I/O request to the virtual LDEVs 130, 131 as the data I/O request to the external storage device 57 under its control.

And, the installed fibre channel switch 121 and additional fibre channel switch 122, upon executing the virtualization function, interprets the fibre channel packets transmitted from the host system 41 in the CPU 124, and, when this is a data I/O request to the virtual LDEVs 130, 131, it issues the data I/O request to the external LDEV 52 mapped to these virtual LDEVs 130, 131 to the corresponding external storage device 57.

Further, the installed fibre channel switch 121 and additional fibre channel switch 122 retain in the memory 125 the foregoing LDEV management table 85, pair management table 7 and differential bit information 6 of each copy pair, and manages the virtual LDEVs 130, 131 and copy pairs set in the installed fibre channel switch 121 or additional fibre channel switch 122 based on the LDEV management table 85, pair management table 7 and differential bit information 6.

Meanwhile, the management server 111, as with the first embodiment, executes the load balancing processing for balancing the load of the installed fibre channel switch 121 with the additional fibre channel switch 122 according to the first load balancing processing sequence RT4 shown in FIG. 24 based on the LDEV management table 85 and pair management table 7 of the installed fibre channel switch 121 and additional fibre channel switch 122.

However, in the foregoing case, since an internal LDEV will never be set in the installed fibre channel switch 121 and additional fibre channel switch 122, step SP34 of the first load balancing processing sequence RT4 is omitted.

As described above, even in a case where the virtualization means for virtualizing the external LDEV 52 of the external storage device 57 is a fibre channel switch (installed fibre channel switch 121, additional fibre channel switch 122), the load can be balanced as in the case where the virtualization means is a storage device (existed storage system 42, additional storage device 43).

(6) Other Embodiments

Incidentally, in the foregoing first to fourth embodiments, although a case was explained where the present invention is employed in storage systems 40, 100, 110, 120 where the virtualization means for virtualizing the external LDEV 52 of the external storage device 57 is a storage device or fibre channel switch, the present invention is not limited thereto, and may be broadly employed in various storage systems so as long as the storage system uses, as the virtualization means, an apparatus equipped with a first function for copying data of the primary logical device paired in itself to the secondary logical device without going through the host system, and a second function for virtualizing the external logical device and providing it to the host system.

Figure 39:
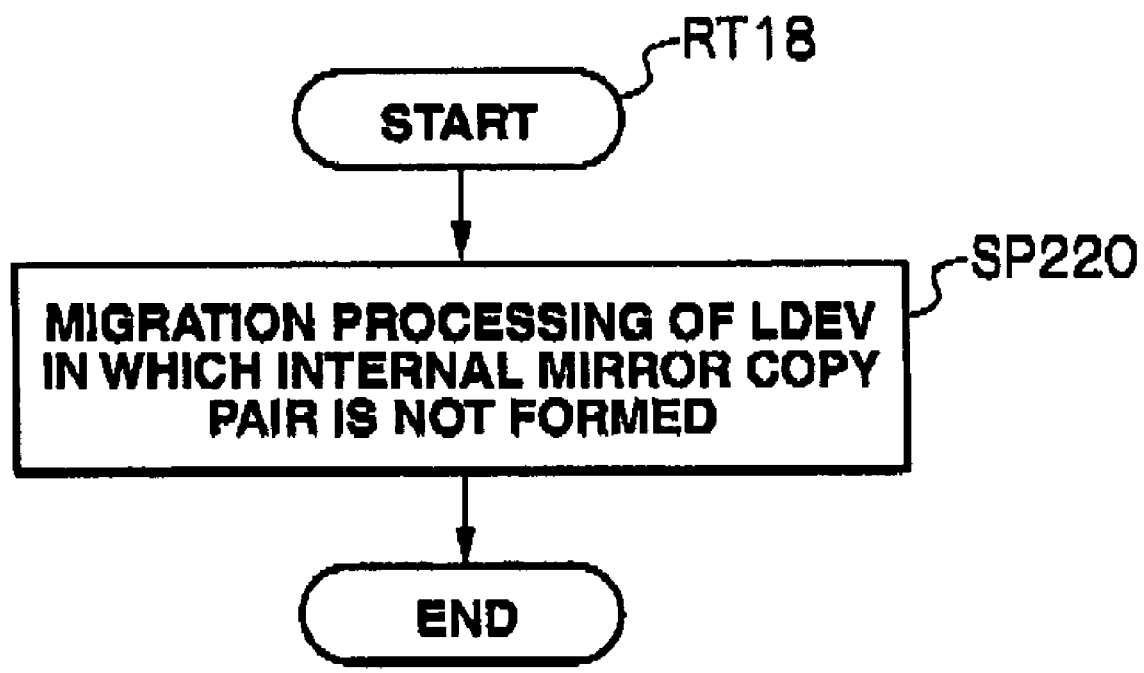
FIG. 39 is a flowchart showing the third load balancing processing sequence.

Further, in the foregoing fourth embodiment, although a case was explained where the management server 44 executes processing for balancing the load of the installed fibre channel switch 121 according to the first load balancing processing sequence RT4 (FIG. 24), the present invention is not limited thereto, and, for instance, the storage system 120 may also be configured to execute the processing for balancing the load of the installed fibre channel switch 121 according to the second load balancing processing sequence RT16 described above with reference to FIG. 36 or the third load balancing processing sequence RT17 described above with reference to FIG. 39.

The present invention may be broadly employed in various storage systems having an apparatus equipped with a first function for copying data of one logical device to another logical device paired among the logical devices set in itself, and a second function of virtualizing the external logical device and providing this to the host system.

I claim:

1. A load balancing system for balancing loads of storage apparatuses therein, comprising:
    a first apparatus equipped with at least one internal logical device and configured to provide a plurality of virtual logical devices accessible for a host system, said virtual logical devices being physically located on an external storage apparatus while virtualized as internal logical devices of the first apparatus to the host system 1, data of at least one virtual logical device being maintained as a mirror-copy pair with another virtual logical device among the virtual logical devices therein;
    a second apparatus equipped with at least one internal logical device and configured to selectively provide a plurality of virtual logical devices accessible for a host system; and
    a management device that periodically detects a load of said first apparatus and a load of said second apparatus, respectively, and migrates a virtual logical device that is not maintained as a mirror-copy pair with any other virtual logical devices in said first apparatus to said second apparatus when the load of said first apparatus is greater than the load of said second apparatus.

2. The load balancing system according to claim 1, wherein said management device, either after migrating said virtual logical device that is not maintained as a mirror-copy pair with said other virtual logical device therein or after detecting there is no virtual logical device that is not maintained as a mirror-copy pair with said other virtual logical device therein, migrates per mirror-copy pair said at least one virtual logical device that is paired together with said another virtual logical device in said first apparatus to said second apparatus to balance the loads.

3. The load balancing system according to claim 2, wherein, upon migrating said mirror-copy pair in said first apparatus to said second apparatus, said management device detects current status of said mirror-copy pair and notifies said second apparatus of control information according to the detection result; and wherein said second apparatus sets the status of said mirror-copy pair migrated from said first apparatus to said second apparatus based on said control information notified from said management device.

4. The load balancing system according to claim 2, wherein the migration of a mirror-copy pair of virtual logical devices includes transmitting pair status differential bit information from said first apparatus to said second apparatus.

5. The load balancing system according to claim 2, wherein the migration of a mirror-copy pair of virtual logical devices includes deleting the mirror-copy pair of virtual logical devices from the first apparatus.

6. The load balancing system according to claim 1, wherein the migration of a virtual logical device includes deleting the virtual logical device from the first apparatus by erasing an entry corresponding to the virtual logical device in a management table in the first apparatus.

7. A load balancing method for balancing loads of storage apparatuses, comprising:

providing a first apparatus equipped with at least one internal logical device and configured to provide a plurality of virtual logical devices accessible for a host system, said virtual logical devices being physically located on an external storage apparatus while virtualized as internal logical devices of the first apparatus to the host system 1, data of at least one virtual logical device being maintained as a mirror-copy pair with another virtual logical device among the virtual logical devices therein;

providing a second apparatus equipped with at least one internal logical device and configured to selectively provide a plurality of virtual logical devices accessible for a host system;

periodically detecting a load of said first apparatus, and a load of said second apparatus, respectively; and migrating a virtual logical device that is not maintained as a mirror-copy pair with any other virtual logical devices in said first apparatus to said second apparatus when the load of said first apparatus is greater than the load of said second apparatus.

8. The load balancing method according to claim 7, wherein the migrating step involves, either after migrating said virtual logical device that is not maintained as a mirror-copy pair with said other virtual logical device therein or after detecting there is no virtual logical device that is not maintained as a mirror-copy pair with said other virtual logical device therein migrating per mirror-copy pair said at least one virtual logical device that is paired together with said another virtual logical device in said first apparatus to said second apparatus to balance the loads.

9. The load balancing method according to claim 8, wherein the migrating step involves detecting current status of said mirror-copy pair and notifying said second apparatus the control information according to the detection result; and wherein said second apparatus sets the status of said mirror-copy pair migrated from said first apparatus to said second apparatus based on said control information notified from said management device.

10. The load balancing method according to claim 8, wherein the migrating step involves transmitting pair status differential bit information from said first apparatus to said second apparatus.

11. The load balancing method according to claim 8, wherein the migrating step involves deleting the mirror-copy pair of virtual logical devices from the first apparatus.

12. The load balancing method according to claim 7, wherein the migrating step involves deleting the virtual logical device from the first apparatus by erasing an entry corresponding to the virtual logical device in a management table in the first apparatus.

* * * * *